US008589611B2

(12) United States Patent
Tanaka

(10) Patent No.: US 8,589,611 B2
(45) Date of Patent: Nov. 19, 2013

(54) ASYNCHRONOUS LOGIC CIRCUIT, SEMICONDUCTOR CIRCUIT, AND PATH CALCULATION METHOD IN ASYNCHRONOUS LOGIC CIRCUIT

(75) Inventor: Katsunori Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 144 days.

(21) Appl. No.: 13/379,614

(22) PCT Filed: Jun. 9, 2010

(86) PCT No.: PCT/JP2010/059768
§ 371 (c)(1),
(2), (4) Date: Dec. 21, 2011

(87) PCT Pub. No.: WO2010/105654
PCT Pub. Date: Dec. 29, 2010

(65) Prior Publication Data
US 2012/0106334 A1    May 3, 2012

(30) Foreign Application Priority Data

Jun. 25, 2009  (JP) ................................ 2009-151351
Nov. 30, 2009  (JP) ................................ 2009-271516

(51) Int. Cl.
*G06F 12/00*    (2006.01)
(52) U.S. Cl.
USPC ......................................... 710/240; 709/221
(58) Field of Classification Search
USPC .................... 709/221, 223–226; 703/1, 6–22;
710/240–243, 316–317
See application file for complete search history.

(56) References Cited

U.S. PATENT DOCUMENTS 7,774,440 B1 *   8/2010   Bagrodia et al. .............. 709/221

FOREIGN PATENT DOCUMENTS

| JP | 5-151147 A | 6/1993 |
| JP | 8-161258 A | 6/1996 |
| JP | 2000172661 A | 6/2000 |

OTHER PUBLICATIONS

International Search Report for PCT/JP2010/059768 mailed Sep. 7, 2010.
J. Sparso et al., "Principles of Asynchronous Circuit Design, A Systems Perspective", Kluwer Academic Publishers, Dec. 31, 2001, pp. 9-11. pp. 76-79.

* cited by examiner

*Primary Examiner* — Clifford Knoll

(57) ABSTRACT

An asynchronous branching module (102) outputs transfer data received in accordance with a handshake protocol to any of branch destinations. An asynchronous arbitration module (101) merges transfer paths of the transfer data. A congestion detection module (111) receives an arbitration result signal from the asynchronous arbitration module (101) and outputs congestion information indicating presence/absence of congestion to a merge source. A congestion avoiding path calculation module (112) receives the congestion information and exclusively performs a process of storing the congestion information into a congestion information storage memory, and a process of making the asynchronous branching module (102) preferentially select, as a transfer branch destination, a branch destination generating no congestion information indicative of the presence of congestion from branch destinations leading to a destination, on the basis of the congestion information and the destination information of the transfer data.

20 Claims, 26 Drawing Sheets

ASYNCHRONOUS LOGIC CIRCUIT, SEMICONDUCTOR CIRCUIT, AND PATH CALCULATION METHOD IN ASYNCHRONOUS LOGIC CIRCUIT

TECHNICAL FIELD

The present invention relates to an asynchronous logic circuit, a congestion avoiding path calculation module, a semiconductor circuit, and a path calculation method in asynchronous logic circuit and, more particularly, to data transfer using handshaking of transmitting/receiving a request signal and an acknowledge signal by predetermined procedure.

BACKGROUND ART

In recent years, as miniaturization of circuit elements and wires mounted on a digital integrated circuit progresses, an integrated circuit comes to have a number of function blocks such as processors and memories called cores. FIG. 15 illustrates an integrated circuit having a number of cores. In FIG. 15, an integrated circuit 1500 has "n" pieces of cores 1501 from core 0 to core n−1. For communications among the cores 1501, an inter-core connecting circuit 1502 is used. The inter-core connecting circuit 1502 is a circuit such as a bus performing data communications among the cores 1501.

The inter-core communication circuit is designed as a synchronous logic circuit that drives an internal element at a rising or trailing transition (clock edge) of a clock signal. However, from the viewpoints of easiness of designing, power consumption and reduction in electromagnetic radiation, attention is being paid to integrated circuit designing using a GALS (Globally Asynchronous, Locally Synchronous) method of constructing the inter-core communication circuit as an asynchronous logic circuit. The asynchronous logic circuit denotes here a logic circuit which controls a storage element in the circuit by using a handshake signal in place of a clock signal.

Also in an asynchronous logic circuit, like in a synchronous logic circuit, a combinational circuit is disposed between flip flops. However, a signal controlling storage of the flip flops is different from that in a synchronous logic circuit. Specifically, in the synchronous logic circuit, a clock signal from the outside is used as a storage control signal to the flip flops. On precondition that the signal reaches all of the flip flops at the same time, a part made by the flip flops and the combinational circuit is designed. A clock signal distributing circuit is designed so that the signal reaches all of the flip flops at the same time. On the other hand, in the asynchronous logic circuit, a storage control circuit generating a storage control signal to flip flops is used. A pair of handshake signals (a request signal and an acknowledge signal) is transmitted/received between the storage control circuits, the storage timing in the flip flops is controlled. The procedure of controlling communications of the handshake signals is called a handshake protocol.

FIG. 16 illustrates a typical configuration example of the asynchronous logic circuit. The asynchronous logic circuit includes three flip flops (FFs) 1610, 1611, and 1612 and three storage control circuits (LCs) 1620, 1621, and 1622 corresponding to the flip flops 1610, 1611, and 1612, respectively. The storage control circuit sends a request signal (R) to the storage control circuit in the posterior stage, and sends an acknowledge signal (A) to the storage control circuit in the anterior stage. The storage control circuit also sends a storage control signal (L) to a corresponding flip flop. In response to the storage control signal (L), the flip flop stores data. In the asynchronous logic circuit, a storage circuit represented by a flip flop and the storage control circuit are dealt as a pair of registers.

FIG. 17 illustrates an example of operation waveforms of the flip flop FF1 (1611) and the storage control circuit LC1 (1621). The flip flop FF1 and the storage control circuit LC1 operate as follows. First, the flip flop FF0 in the anterior stage stores data d0 (D0=d0) and outputs the data d0 to the flip flop FF1. After the flip flop FF0 stores the data d0, the storage control circuit LC0 corresponding to the flip flop FF0 outputs a request signal R0=1 to the storage control circuit LC1 in the next stage.

By receiving the request signal R0=1, the storage control circuit LC1 detects that data has reached the flip flop FF1. The storage control circuit LC1 generates a storage control signal L1=1. The storage control circuit LC1 changes the storage control signal. L1 to L1=1, thereby making the flip flop FF1 store the data d0 (D1=d0). After the flip flop FF1 stores the data d0, the storage control circuit LC1 outputs an acknowledge signal A0=1 to the storage control circuit LC0 in the anterior stage to notify of completion of data storage. The storage control circuit LC0 in the anterior stage receives the notification of completion of data storage (A0=1) and changes the request signal R0 to be output to the storage control circuit LC1 to R0=0 (the request signal is withdrawn). After that, a request to prepare for next data is sent to the flip flop FF1.

After the flip flop FF1 stores the data d0, the storage control circuit LC1 outputs the request signal R1=1 to the storage control circuit LC2 in the next stage to request data storage in the flip flop FF2. The storage control circuit LC2 in the next stage receives the request signal R1=1 from the storage control circuit LC1, generates the storage control signal L2=1, and stores the data d0 into the flip flop FF2. After that, the storage control circuit LC2 outputs the acknowledge signal A1=1 to the storage control circuit LC1 in the anterior stage. The storage control circuit LC1 receives the acknowledge signal A1=1, thereby detecting data storage in the flip flop FF2.

When the storage control circuit LC1 receives the request signal R0=0 from the storage control circuit LC0 in the anterior stage and receives the acknowledge signal A1=1 from the storage control circuit LC2 in the next stage, the storage control circuit LC1 changes the storage control signal L1 to L1=0. When the storage control signal L1 becomes L1=0, the flip flop FF1 enters a state of preparation for the next data. After the flip flop FF1 is prepared for the next data, the storage control circuit LC1 sends the acknowledge signal A0=0 indicative of completion of preparation of the flip flop FF1 to the storage control circuit LC0 in the anterior stage. The storage control circuit LC1 sends the request signal R1=0 requesting preparation for the next data to the storage control circuit LC2 in the next stage.

The storage control circuit LC0 in the anterior stage receives the acknowledge signal A0=0 and stores the next data d1 into the flip flop FF0. The storage control circuit LC2 in the next stage receives the request signal R1=0 and sends the storage control signal L2 to the flip flop FF2 to make the flip flop FF2 prepare for the next data. The storage control circuits LC0 to LC2 perform operation similar to the above also on the data d1 and transfer the data d1 to the flip flops FF1 and FF2. Although the signals shift periodically in the waveform chart of FIG. 17, even when delay occurs at any of the timings in the procedure, the asynchronous logic circuit operates so as to follow the procedure.

In the case of using an asynchronous inter-core communication circuit, it is unnecessary to synchronize clocks among different functional blocks. There is consequently an effect that a clock distribution range can be limited to a narrow range. In addition, the clock frequency of each of the functional blocks can be freely and dynamically set. Therefore, the clock frequency can be lowered to the minimum frequency at which the functional block realizes predetermined operation. When the clock frequency is lowered, the circuit delay can be increased, and the power supply voltage can be also decreased. Since the power consumption is proportional to the product between the square of the power supply voltage and the clock frequency, by using asynchronous inter-core communication circuit among the functional blocks, the power consumption of the integrated circuit can be reduced largely.

Further, in the case of using the asynchronous inter-core communication circuit, timings of driving synchronous cores can be dispersed in time, so that power and electromagnetic radiation can be also reduced. Specifically, since the synchronous cores are driven at the rising or trailing shifts (clock edges) of the clock signal, a large current change occurs immediately after the clock edge. In the case of using the asynchronous logic circuit as the inter-core communication circuit, since the drive timings are different among the cores, the current in the entire integrated circuit can be leveled. As a result, electromagnetic radiation derived from power at the maximum and current change is reduced.

PRIOR ART LITERATURE

Non-Patent Literature

Non-patent literature 1: Jens Sparso, Steve Furber, "Principles of Asynchronous Circuit Design", Kluwer Academic Publishers, Dec. 31, 2001, pp. 9-11, pp. 76-79

DISCLOSURE OF INVENTION

Problem to be Solved by Invention

In designing of an integrated circuit using an inter-core communication circuit, a core on the side of requesting data communication is called a master, and a core operating in response to a request of the master is called a slave. In the case where a plurality of masters requesting communication exist, the inter-core communication circuit gives priority by performing arbitration among the masters, and processes the communication request in order in accordance with the priority. An inter-core connection circuit connecting a number of cores is constructed to perform the arbitration process in a plurality of places. A master on which priority is given in the first arbitration place on a communication path sends data to the next place on a path beyond the arbitration place. In such a manner, by repeating the communication request, arbitration, and data transfer in each of the arbitration places on the path, data is transferred to a target slave.

A network shape (topology) of a communication path of an inter-core connection circuit is constructed so that a plurality of communication paths exist in a part or all of a pair of a master and a slave. A core connection circuit in which a plurality of communication paths exist by master and slave pairs has a configuration of selecting a path preliminarily determined by the master or a configuration of selecting a destination method at each of branches on a transfer path.

In an asynchronous core connection circuit in which a plurality of transfer paths exists between a master and a slave, when a plurality of pairs of masters and slaves perform data transfer, common places each starting an arbitration place exist on a transfer path. When a data transfer between a set of a master and a slave occupies an arbitration place, the data transfer between other masters and slaves passing the arbitration place have to wait for long time. If a transfer path avoiding the arbitration place congested exists between a master and a slave of a data transfer waiting, by performing data transfer path setting in which the presence/absence of congestion is not considered, the communication capacity of the core connection path is not wasted. The problem will be described below.

FIG. 18 illustrates an inter-core connecting circuit in which a plurality of transfer paths exist between a master and a slave. In FIG. 18, as cores (synchronous master-side cores and slave-side cores) connected in an asynchronous core connection circuit 1800, four cores of a mater A 1801, a slave A 1802, a master B 1803, and a slave B 1804 are shown. The asynchronous core connection circuit 1800 includes asynchronous branching circuits 1811, 1813, and 1823 and asynchronous arbitration circuits 1812, 1822, and 1824. As the asynchronous branching circuits 1811, 1813, and 1823 and the asynchronous arbitration circuits 1812, 1822, and 1824, those described in Non-patent literature 1 are used. For data transfer among the master A 1801, the slave A 1802, the master B 1803, the slave B 1804, the asynchronous branching circuits 1811, 1813, 1823, and the asynchronous arbitration circuits 1812, 1822, and 1824, an asynchronous logic circuit illustrated in FIG. 15 is used.

It is assumed that the master A 1801 requests the asynchronous core connection circuit 1800 to transfer a stream of data 1891 to 1894 (data m to data m+3) to the slave A 1802. At this time, the master B 1803 requests the asynchronous core connection circuit 1800 to transfer a stream of data 1881 to 1883 (data n to data n+2) to the slave B 1804. Before the data stream, transfer of a number of data streams has been completed, and a number of data streams subsequent to the data stream are being waited to be transferred in the master B 1803.

In the asynchronous core connection circuit 1800, there are two paths for transferring the data 1891 to 1894 from the master A 1801 to the slave A 1802. One of them is a path of the master A 1801—the asynchronous branching circuit 1811—the asynchronous arbitration circuit 1812—the asynchronous branching circuit 1813—the asynchronous arbitration circuit 1824—the slave A 1802. The other is a path of the master A 1801—the asynchronous branching circuit 1811—the asynchronous arbitration circuit 1822—the asynchronous branching circuit 1823—the asynchronous arbitration circuit 1824—slave A 1802. That is, between the master A 1801 and the slave A 1802, there are two paths which can be used.

At the time of data transfer, the asynchronous branching circuit 1811 selects one of the data output terminals and outputs data. The asynchronous branching circuit 1811 may select any of the two data output terminals for the reason that the data can reach the slave A 1802 as the destination of the data requested to be transferred by the master A 1801. It is assumed here that the asynchronous branching circuit 1811 selects the output terminal toward the asynchronous arbitration circuit 1812 as an output destination of the data 1891.

A storage circuit existing between the asynchronous branching circuit 1811 and the asynchronous arbitration circuit 1812 sequentially transfers the data 1891 and 1892 toward the asynchronous arbitration circuit 1812. However, the asynchronous arbitration circuit 1812 exclusively transfer the preceding data, the data 1881 to 1883, and the subsequent data from the master B 1803 to the slave B 1804. Consequently, the asynchronous arbitration circuit 1812 operates to make transfer of the data 1891 wait.

If the asynchronous branching circuit 1811 selects the data output terminal toward the asynchronous arbitration circuit 1822, not the asynchronous arbitration circuit 1812, since the asynchronous arbitration circuit 1822 does not transfer other data, the asynchronous arbitration circuit 1822 can immediately output the data 1891 to the asynchronous branching circuit 1823. The subsequent data 1892 to 1894 can be also sequentially transferred. However, the data output terminal in the asynchronous branching circuit 1811 is toward the asynchronous arbitration circuit 1812, so that the data transfer is made wait. Since the data output terminal in the asynchronous branching circuit 1811 is toward the asynchronous arbitration circuit 1812, the communication capacity of the data transfer path via the asynchronous arbitration circuit 1822 is wasted.

Handshaking used in the asynchronous logic circuit is constructed only by a signal transmitting a request of data storage from a resister on the data transmission side to a register on the data reception side and a signal transmitting acknowledge of completion of data storage from the register on the data reception side to the register on the data transmission side. In the asynchronous logic circuit, a signal indicative of congestion information is not used, and detection of congestion and generation of congestion information cannot be performed. Therefore, data transfer avoiding a congested part cannot be performed in the asynchronous logic circuit.

An object of the present invention is to provide an asynchronous logic circuit and a congestion avoiding path calculation module capable of suppressing waste of communication capacity of a data transfer path even when there is a congested part.

Means for Solving Problems

To achieve the object, an asynchronous logic circuit according to the present invention includes:

an asynchronous branching module outputting transfer data received according to a handshake protocol of performing data transfer by transmitting/receiving a data request signal and a data acknowledge signal in a predetermined procedure, to any of a plurality of branch destinations;

an asynchronous arbitration module merging transfer paths of the transfer data and sequentially outputting transfer data received from at least one of a plurality of merge sources, in a predetermined procedure without contradicting the procedure;

a congestion detection module disposed corresponding to the asynchronous arbitration module, receiving an arbitration result signal indicating a merge source from which data is being transferred from the asynchronous arbitration module, and outputting congestion information indicative of presence or absence of congestion to the plurality of merge sources of the asynchronous arbitration module; and a congestion avoiding path calculation module disposed corresponding to the asynchronous branching module, and exclusively performing a process of receiving the congestion information from a congestion detection module corresponding to an asynchronous arbitration module existing in a branch destination of the asynchronous branching module, and storing congestion information on the plurality of branch destinations of the asynchronous branching module into a congestion information storage memory, and a process of making the asynchronous branching module preferentially select, as a transfer branch destination, a branch destination which does not generate congestion information indicative of the presence of congestion among branch destinations leading to a destination on the basis of the congestion information and destination information of the transfer data.

A semiconductor circuit according to the present invention has the asynchronous logic circuit of the present invention.

A congestion avoiding path calculation module according to the present invention includes:

a data congestion information arbitration circuit performing arbitration between a data request signal and a congestion information storage request signal, the data request signal being for an asynchronous branching module which outputs transfer data received in accordance with a handshake protocol of transferring data by transmitting/receiving a data request signal and a data acknowledge signal by a predetermined procedure to any of a plurality of branch destinations, and the congestion information storage request signal requesting storage of congestion information indicative of the presence/absence of congestion, received from a branch destination of the asynchronous branching module, allowing passage of one of the signals to mediate handshaking, and making the other signal wait until completion of a process according to the passed signal;

a memory storage control circuit, when the data congestion information arbitration circuit allows passage of the congestion information storage request signal, storing the congestion information received from a branch destination of the asynchronous branching module into a congestion information storage memory storing congestion information on the branch destination; and a path calculation circuit, when the data congestion information arbitration circuit makes the data request signal pass, making the asynchronous branching module preferentially select, as a transfer branch destination, a branch destination generating no congestion information indicative of presence of congestion among branch destinations leading to a destination on the basis of the congestion information and destination information of transfer data which is supplied to the asynchronous branching module.

A path calculation method in an asynchronous logic circuit according to the present invention includes:

a step of performing arbitration between a data request signal and a congestion information storage request signal, the data request signal being for an asynchronous branching module outputting transfer data received according to a handshake protocol performing data transfer by transmitting/receiving a data request signal and a data acknowledge signal in a predetermined procedure, to any of a plurality of branch destinations, and the congestion information storage request signal requesting for storage of congestion information indicative of the presence/absence of congestion, received from a branch destination of the asynchronous branching module;

a step of performing a process of mediating handshaking by making one of the signals pass, making the other signal wait until a process according to the passed signal is completed and, when the congestion information storage request signal passes, storing the congestion information received from a branch destination of the asynchronous branching module into a congestion information storage memory storing congestion information of the branch destination; and a step, when the data request signal is passed, of performing a process of making the asynchronous branching module preferentially select, as a transfer branch destination, a branch destination which does not generate congestion information indicative of presence of congestion among branch destinations leading to a destination on the basis of the congestion information and destination information of transfer data supplied to the asynchronous branching module.

Effect of Invention

The asynchronous logic circuit and the congestion avoiding path calculation module of the present invention can suppress wasting of communication capacity of a data transfer path even when there is a congested part.

BEST MODE FOR CARRYING OUT THE INVENTION

Figure 1:
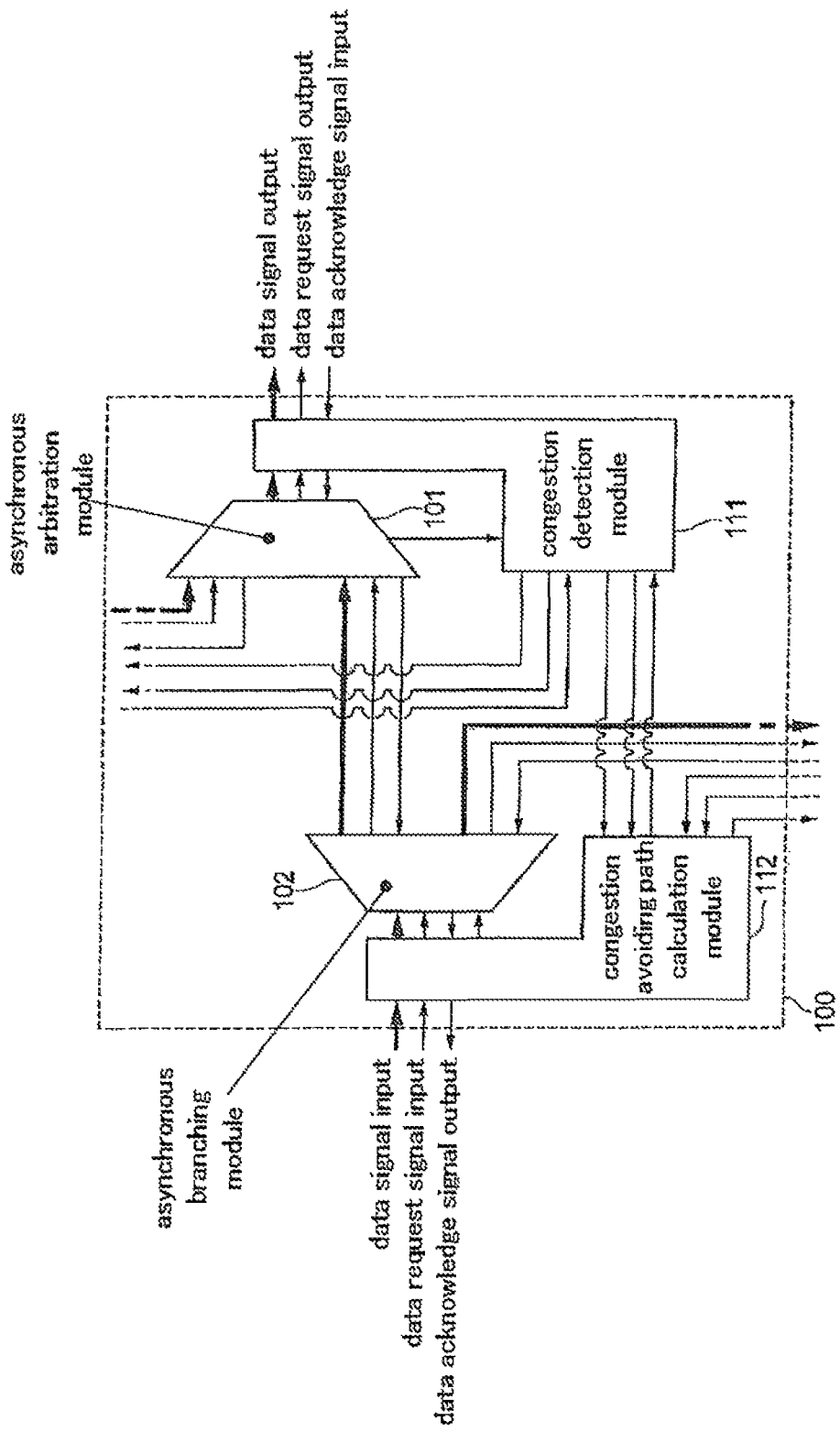
FIG. 1 is a block diagram illustrating an asynchronous logic circuit of an embodiment of the present invention.

Embodiments of the present invention will be described in detail below with reference to the drawings. FIG. 1 illustrates an asynchronous logic circuit of a first embodiment of the present invention. An asynchronous logic circuit (asynchronous inter-core connection circuit) 100 has an asynchronous arbitration module 101, an asynchronous branching module 102, a congestion detection module 111, and a congestion avoiding path calculation module 112. The asynchronous inter-core connection circuit 100 transfers data by using the handshake technique of transmitting/receiving a request signal and an acknowledge signal. The form of connecting the circuits shown in FIG. 1 is just an example, and the invention is not limited to the connection of the circuits.

The asynchronous arbitration module 101 is a module of merging data transfer paths. The asynchronous arbitration module 101 performs arbitration, selects one of merge sources requesting data transfer, performs predetermined handshaking between the selected merge source and a merge destination, and transfers data. The asynchronous arbitration module 101 sequentially outputs transfer data supplied from at least one of a plurality of merge sources by a predetermined procedure without contradiction of the procedure of the handshake protocol.

The asynchronous branching module 102 is a module of branching a data transfer path. The asynchronous branching module 102 transfers data to a branch destination toward a destination while performing the handshaking in accordance with the procedure determined in the predetermined handshake protocol between a branch source and a branch destination. In FIG. 1, each of the number of merge sources of the asynchronous arbitration module 101 and the number of branch destinations of the asynchronous branching module 102 is two. However, the number of merge sources and branch sources is not limited to two. The number of each of the merge sources of the asynchronous arbitration module 101 and the number of branch destinations of the asynchronous branching module 102 may be an arbitrary number which is two or larger.

The congestion detection module 111 is disposed corresponding to the asynchronous arbitration module 101. The congestion detection module 111 refers to an arbitration result in the asynchronous arbitration module 101 and generates congestion information indicative of the presence or absence of congestion to the merge source of the asynchronous arbitration module. The congestion detection module 111 sends the generated congestion information signal to the merge source of the asynchronous arbitration module 101. According to the arbitration result, the congestion detection module 111 sends a congestion information signal indicative of "absence of congestion" to a merge source transferring data to a merge destination and sends a congestion information signal indicative of "presence of congestion" to a merge source which does not transfer data to a merge destination.

The congestion avoiding path calculation module 112 is disposed corresponding to the asynchronous branching module 102. The congestion avoiding path calculation module 112 receives congestion information in the branch destination from the congestion detection module 111 in the branch destination of the asynchronous branching module 102. The congestion avoiding path calculation module 112 has a congestion information storage memory (not shown) storing congestion information on the branch destination of the asynchronous branch module 102. The congestion avoiding path calculation module 112 receives the congestion information from the branch destination and updates the congestion information of the corresponding branch destination.

The congestion avoiding path calculation module 112 determines a transfer destination of the asynchronous branching module 102 on the basis of the congestion information and the destination information of the transfer data. The congestion avoiding path calculation module 112 makes the asynchronous branching module 102 preferentially select, as a transfer branch destination, a branch destination generating no congestion information indicative of "presence of congestion" among branch destinations via which data can reach the destination. The congestion avoiding path calculation module 112 exclusively perform a process of storing congestion information and a process of making a transfer branch destination selected.

The asynchronous arbitration module 101 has two sets each made of a data input terminal, a data request input terminal, and a data acknowledge output terminal. The asynchronous arbitration module 101 has a set of a data output terminal, a data request output terminal, and a data acknowledge input terminal. Further, the asynchronous arbitration module 101 has an arbitration result output terminal.

The asynchronous arbitration module 101 receives a data request signal from one or both of the data request input terminals. The asynchronous arbitration module 101 selects one of the received data request signals and outputs the selected one to the data request output terminal. The asynchronous arbitration module 101 outputs the selection result as an arbitration result from the arbitration result output terminal and holds the data request signal from the data request input terminal on the side of the signal which is not selected.

The asynchronous arbitration module 101 receives a data acknowledge signal to the output data request signal from the data acknowledge input terminal. When the data acknowledge signal is received, the asynchronous arbitration module 101 outputs the data acknowledge signal from the data acknowledge output terminal in the set to which the data request input terminal selected at the time of outputting the data request signal belongs. That is, the asynchronous arbitration module 101 outputs the data acknowledge signal to the merge source during the data transfer.

The asynchronous branching module 102 has a set of a data input terminal, a data request input terminal, and a data acknowledge output terminal. The asynchronous branching module 102 also has two sets each made of a data output terminal, a data request output terminal, and a data acknowledge input terminal. Further, the asynchronous branching module 102 has a selection signal input terminal for receiving a selection signal designating one of the data output terminals.

The asynchronous branching module 102 receives transfer data and the data request signal from the data input terminal and the data request input terminal. The asynchronous branching module 102 receives a selection signal generated by the congestion avoiding path calculation module 112 from the selection signal input terminal. According to the selection signal, the asynchronous branching module 102 outputs data from the designated data output terminal. The asynchronous branching module 102 outputs the data request signal from the data request output terminal in the set to which the data output terminal for outputting the data belongs.

After outputting the data, the asynchronous branching module 102 receives a data acknowledge signal corresponding to the data request signal from the data acknowledge input terminal in the set to which the data request output terminal for outputting the data request signal belongs. That is, the asynchronous branching module 102 receives the data acknowledge signal from the branch destination during the data transfer. When the data acknowledge signal is received from the branch destination, the asynchronous branching module 102 outputs the data acknowledge signal from the data acknowledge output terminal to the branch source.

The congestion detection module 111 has a set of a data input terminal, a data reqluest input terminal, and a data acknowledge output terminal. The congestion detection module 111 also has a set of a data output terminal, a data request output terminal, and a data acknowledge input terminal. Further, the congestion detection module 111 has an arbitration result input terminal, and sets each made of a congestion information output terminal, a congestion process request output terminal, and a congestion process acknowledge input terminal. The number of sets is equal to the number of the data input terminals of the asynchronous arbitration module 101. Each set of the congestion information output terminal, the congestion process request output terminal, and the congestion process acknowledge input terminal is associated with each set of the data input terminal, the data request input terminal, and the data acknowledge output terminal of the asynchronous arbitration module in a one-to-one corresponding manner.

The congestion detection module 111 supplies transfer data and the data request signal from the asynchronous arbitration module 101 via the data signal input terminal and the data request input terminal. The congestion detection module 111 outputs the transfer data and the data request signal from the data output terminal and the data request output terminal, respectively. The congestion detection module 111 receives an arbitration result from the asynchronous arbitration module 101 via the arbitration result input terminal. The congestion detection module 111 generates a congestion information signal on the basis of the input arbitration result.

The congestion detection module 111 outputs a congestion information signal and a congestion process request signal (congestion information storage request signal) from the congestion information output terminal and the congestion process request output terminal, respectively, of each of the sets. Specifically, the congestion detection module 111 outputs the congestion information and the congestion process request signal to each of the merge sources of the asynchronous arbitration module 101. The congestion detection module 111 waits for both the data acknowledge signal and the congestion process acknowledge signal to the congestion process request signal (congestion information storage acknowledge signal). When the data acknowledge signal from the merge destination is supplied to the data acknowledge input terminal and the congestion process acknowledge signal from the merge source is supplied to the congestion process acknowledge input terminal of each set, the congestion detection module 111 outputs a data acknowledge signal from the data acknowledge output terminal to the asynchronous arbitration module 101.

The congestion avoiding path calculation module 112 has a set of a data input terminal, a data request input terminal, and a data acknowledge output terminal. The congestion avoiding calculation module 112 has a set of a data output terminal, a data request output terminal, and a data acknowledge input terminal. Further, the congestion avoiding path calculation module 112 has an arbitration result input terminal, and sets each made of a congestion information input terminal, a congestion process request input terminal, and a congestion process acknowledge output terminal. The number of sets is equal to the number of the data output terminals of the asynchronous branching module. Each set of the congestion information input terminal, the congestion process request input terminal, and the congestion process acknowledge output terminal is associated with each set of the data output terminal, the data request output terminal, and the data acknowledge input terminal of the asynchronous branching module 102 in a one-to-one corresponding manner.

The congestion avoiding path calculation module 112 waits for arrival of the data request signal and the congestion process request signal. When there is no reception of the data request signal and the congestion process request signal is received from one or more congestion process request input terminals, the congestion avoiding path calculation module 112 performs arbitration among the congestion process request signals and selects one of the signals by a predetermined method. The congestion avoiding path calculation module 112 receives the congestion information signal via the congestion information input terminal in the set to which the selected congestion process request input terminal belongs. That is, from a branch destination which outputs the congestion information storage request, the congestion avoiding path calculation module 112 receives the congestion information signal of the branch destination. The congestion avoiding path calculation module 112 updates the congestion information of the branch destination stored in the congestion information storage memory with the received congestion information signal. After that, the congestion avoiding path calculation module 112 outputs the congestion process acknowledge signal from the congestion process acknowledge output terminal in the set to which the selected congestion process request input terminal belongs.

When the data request signal is received from the data request input terminal, the congestion avoiding path calculation module 112 finds out the destination from the transfer data received from the data input terminal. From the destination information, the congestion avoiding path calculation module 112 obtains, as selectable branch destinations, branch destinations existing on paths which can reach the core at the destination among a plurality of branch destinations of the asynchronous branching module 102. The congestion avoiding path calculation module 112 refers to the congestion information of the selectable branch destinations and preferentially selects, as a transfer branch destination, a branch destination indicating absence of congestion from the selectable branch destinations.

After selection of the transfer branch destination, the congestion avoiding path calculation module 112 outputs a selection signal indicative of the selected transfer branch destination from the selection signal output terminal to the asynchronous branching module 102. From the data output terminal and the data request output terminal, it also outputs the data and the data request signal received from the data input terminal and the data request input terminal. The asynchronous branching module 102 selects an output branch destination of the data and the data request signal in accordance with the selection signal output from the congestion avoiding path calculation module 112. The congestion avoiding path calculation module 112 receives a data acknowledge signal output from the asynchronous branching module 102 from the data acknowledge input terminal. When the data acknowledge signal is received, the congestion avoiding path calculation module 112 outputs the data acknowledge signal from the data acknowledge output terminal.

The operation of the asynchronous inter-core connection circuit will be described below. The asynchronous arbitration module 101, the asynchronous branching module 102, the congestion detection module 111, and the congestion avoiding path calculation module 112 operate in parallel. In the modules, the initial states of the data request signal, the data acknowledge signal, the congestion process request signal, and the congestion process acknowledge signal are that there are no (no signal) data request, no data acknowledge, no congestion process request, and no congestion process acknowledgement. Numbers are designated to the two merge sources of the asynchronous arbitration module 101. One of the two merge sources is set to the merge source No. 0, and the other is set to the merge source No. 1. Numbers are also designated to the two branch destinations of the asynchronous branching module 102. One of them is set to the branch destination No. 0, and the other is set to the branch destination No. 1.

Figure 2:
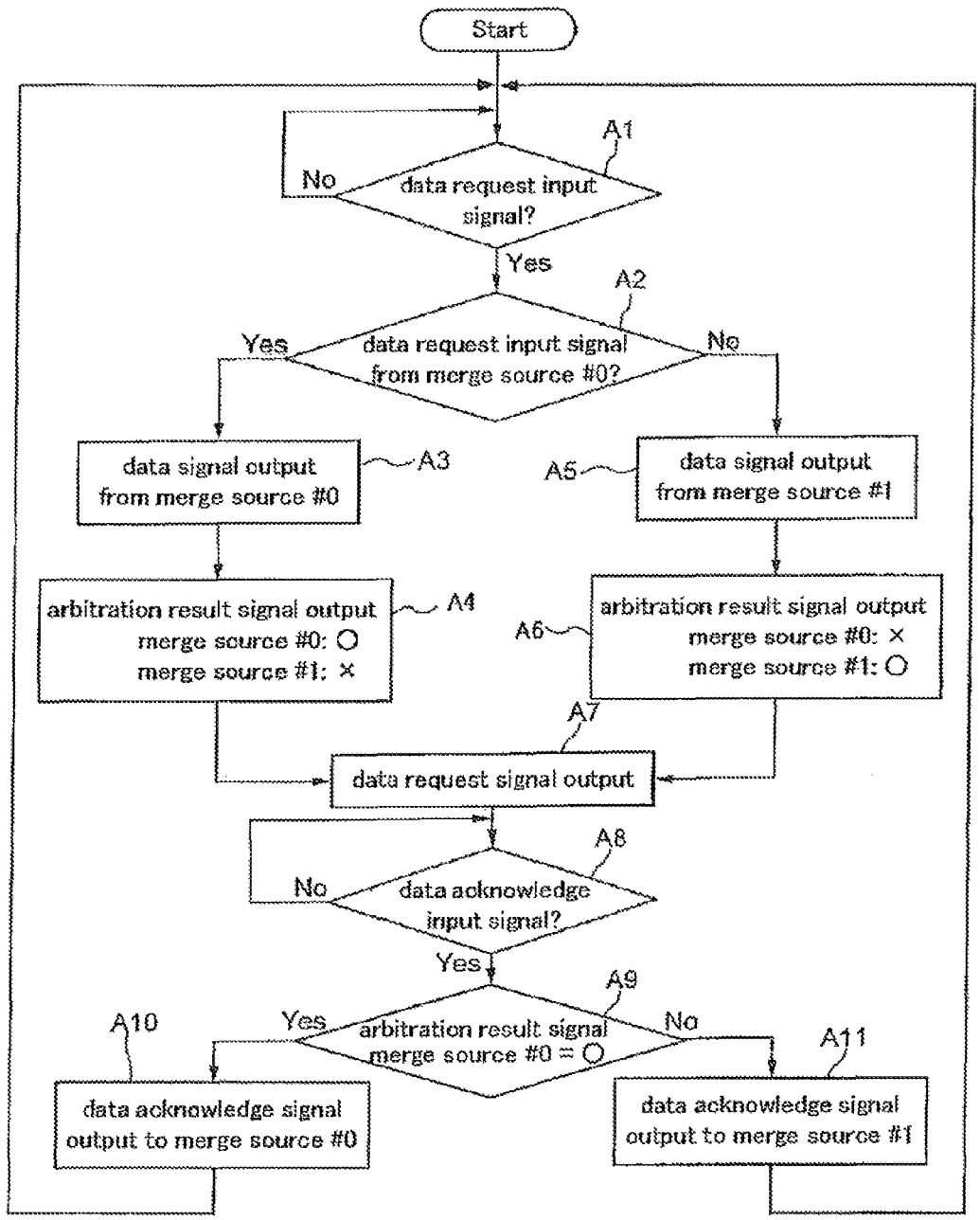
FIG. 2 is a flowchart showing operation procedure of an asynchronous arbitration module.

FIG. 2 illustrates the procedure of operation of the asynchronous arbitration module 101. First, the asynchronous arbitration module 101 is in the initial state. The asynchronous arbitration module 101 determines whether the data request input signal is supplied to the data request input terminal or not (step A1). When the data request input signal is not received, the asynchronous arbitration module 101 repeatedly executes the step A1 and waits until the data request input signal is received.

When the data request signal is received, the asynchronous arbitration module 101 determines whether or not the data request input terminal to which the data request signal is supplied is the data request input terminal on the side of the merge source No. 0 (step A2). When the data request input terminal to which the data request signal is supplied is the data request input terminal on the side of the merge source No. 0, the asynchronous arbitration module 101 outputs transfer data supplied from the data input terminal on the side of the merge source No. 0 from the data output terminal to the merge destination (step A3). From the arbitration result output terminal, the asynchronous arbitration module 101 outputs an arbitration result signal indicating that transfer data from the merge source No. 0 is being output from the data output terminal, to the congestion detection module 111 (step A4).

When the data request input terminal to which the data request signal is supplied is the data request input terminal of the merge source No. 1 in step A2, the asynchronous arbitration module 101 outputs the transfer data supplied from the data input terminal of the merge source No. 1 from the data output terminal to the merge destination (step A5). The asynchronous arbitration module 101 outputs the arbitration result signal indicating that the transfer data from the merge source No. 1 is being output from the data output terminal, from the arbitration result output terminal to the congestion detection module 111 (step A6).

When the data request signal is received from both of the merge source No. 0 and the merge source No. 1, the asynchronous arbitration module 101 selects one of them. The asynchronous arbitration module 101 selects, for example, the data request signal which arrives first among the two data request signals. When the data request signal from the merge source No. 0 is selected, the asynchronous arbitration module 101 advances from step A2 to step A3 and outputs the transfer data from the merge source No. 0. On the other hand, when the data request signal from the merge source No. 1 is selected, the asynchronous arbitration module 101 advances from step A2 to step A5 and outputs the transfer data from the merge source No. 1. The asynchronous arbitration module 101 retains the data request signal which is not selected until transfer of the selected data is completed.

After the arbitration result is output in step A4 or A6, the asynchronous arbitration module 101 outputs the data request signal from the data request output terminal to the congestion detection module 111 (step A7). After the data request signal is output, the asynchronous arbitration module 101 determines whether the data acknowledge signal is received by the data acknowledge input terminal or not (step A8). When the data acknowledge signal is not received, the asynchronous arbitration module 101 repeatedly performs step A8 and waits until the data acknowledge signal is received.

When the data acknowledge signal is received, the asynchronous arbitration module 101 determines whether the arbitration result signal which is output in step A4 or A6 indicates that the transfer data from the merge source No. 0 is being output from the data output terminal or not (step A9). When the arbitration result signal indicates that the transfer data from the merge source No. 0 is being output from the data output terminal, the asynchronous arbitration module 101 outputs the data acknowledge signal from the data acknowledge output terminal corresponding to the merge source No. 0 (step A10). When the arbitration result signal indicates that the transfer data from the merge source No. 1 is being output from the data output terminal, the asynchronous arbitration module 101 outputs the data acknowledge signal from the data acknowledge output terminal corresponding to the merge source No. 1 (step A11). After output of the data acknowledge signal, the asynchronous arbitration module 101 withdraws the input data request signal and the data acknowledge signal to be output and returns to step A1 (initial state).

Figure 3:
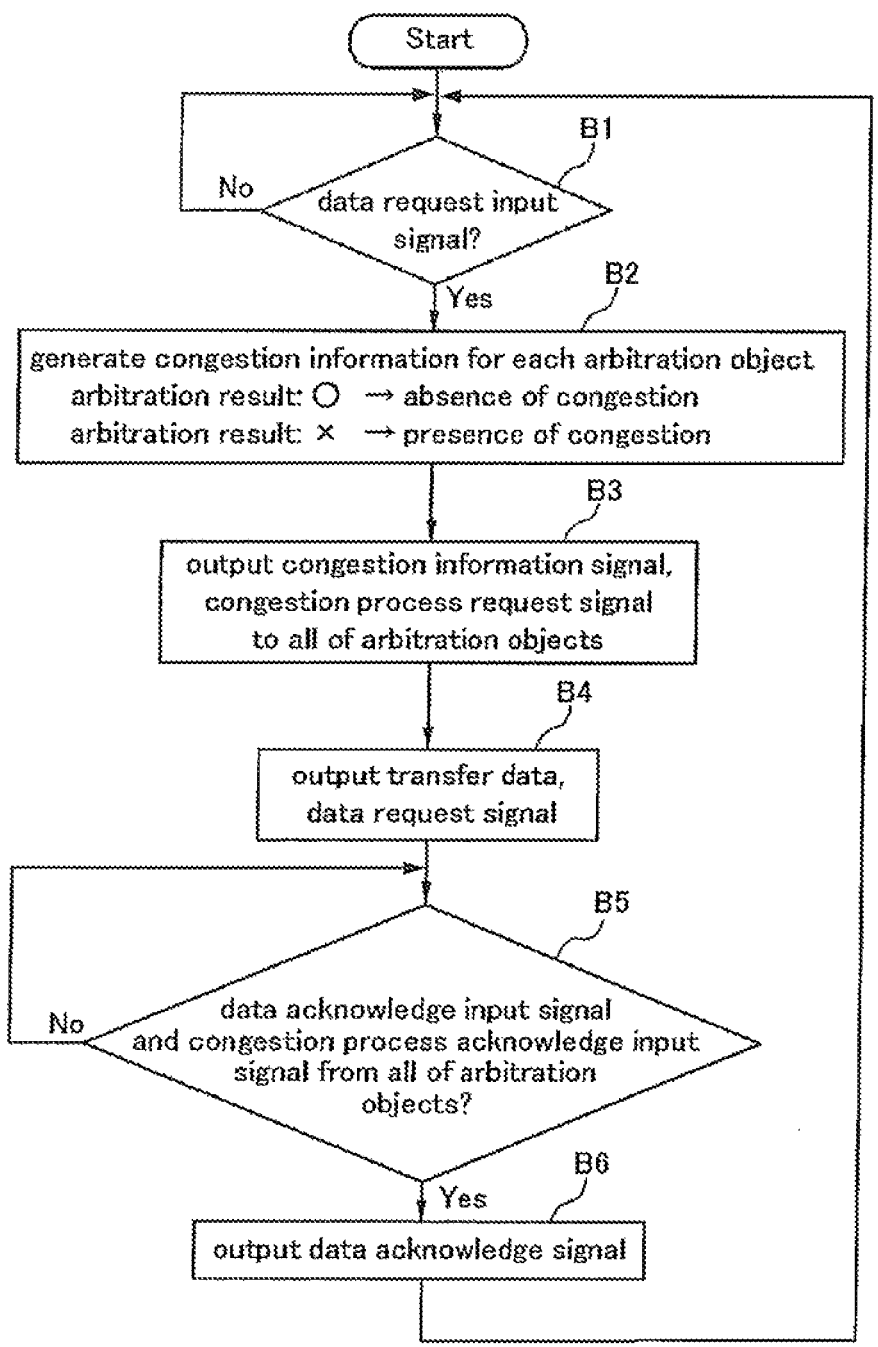
FIG. 3 is a flowchart showing operation procedure of a congestion detection module.

FIG. 3 illustrates the procedure of operations of the congestion detection module 111. First, the congestion detection module 111 is in the initial state. The congestion detection module 111 determines whether the data request signal is supplied from the asynchronous arbitration module 101 to the data request input terminal or not (step B1). When no data request signal is received, the congestion detection module 111 repeatedly executes step B1 and waits until the data request signal is received.

When the data request signal is received, the congestion detection module 111 generates a congestion information signal to each object of arbitration on the basis of the arbitration result signal received from the asynchronous arbitration module 101 via the arbitration result input terminal (step B2). The each object of arbitration denotes each of the merge sources of the asynchronous arbitration module 101. For example, when the arbitration result signal indicates that data of the merge source No. 0 is being output from the data output terminal, the congestion detection module 111 generates a congestion information signal indicative of "absence of congestion" to the merge source No. 0 and generates a congestion information signal indicative of "presence of congestion" to the merge source No. 1. On the contrary, when the arbitration result signal indicates that data of the merge source No. 1 is being output from the data output terminal, the congestion detection module 111 generates a congestion information signal indicative of "presence of congestion" to the merge source No. 0 and generates a congestion information signal indicative, of "absence of congestion" to the merge source No. 1.

The congestion detection module 111 outputs the generated congestion information signal and the congestion process request signal to each of the objects of arbitration (step B3). In step B3, the congestion detection module 111 outputs the congestion information signal and the congestion process request signal corresponding to the merge source No. 0 from the congestion information output terminal and the congestion process request output terminal corresponding to the merge source No. 0. The congestion detection module 111 outputs the congestion information signal and the congestion process request signal corresponding to the merge source No. 1 from the congestion information output terminal and the congestion process request output terminal corresponding to the merge source No. 1.

The congestion detection module 111 outputs the data received via the data input terminal from the asynchronous arbitration module 101 and the data request signal received via the data request input terminal, from the data output terminal and the data request output terminal, respectively (step B4). When the asynchronous arbitration module 101 outputs the transfer data from the merge source No. 0 in step A3, the congestion detection module 111 outputs the transfer data from the merge source No. 0 from the data output terminal. When the asynchronous arbitration module 101 outputs the transfer data from the merge source No. 1 in step A5, the congestion detection module 111 outputs the transfer data from the merge source No. 1 from the data output terminal.

The congestion detection module 111 waits for both the data acknowledge signal for the data request signal output in step B4 and the congestion process acknowledge signal to the congestion process request signal output to each of the merge sources in step B3 (step B5). The congestion detection module 111 determines whether or not the congestion process acknowledge signal to the congestion process request signal output in step B3 is supplied to the congestion process acknowledge input terminal corresponding to each merge source. The congestion detection module 111 determines whether the data acknowledge signal to the data request signal output in step B4 is received by the data acknowledge input terminal or not. When it is determined that the congestion process acknowledge signal is not received from all of the merge sources or the data acknowledge signal is not received, the congestion detection module 111 repeatedly executes step B5. By the operation, the congestion detection module 111 waits until the congestion process acknowledge signal and the data acknowledge signal are received.

When the congestion process acknowledge signal is received from all of the merge sources and the data acknowledge signal is received, the congestion detection module 111 outputs the data acknowledge signal from the data acknowledge output terminal to the asynchronous arbitration module 101 (step B6). After that, the congestion detection module 111 withdraws the data request signal to be received and the data acknowledge signal to be output and returns to step B1 (initial state).

Figure 4:
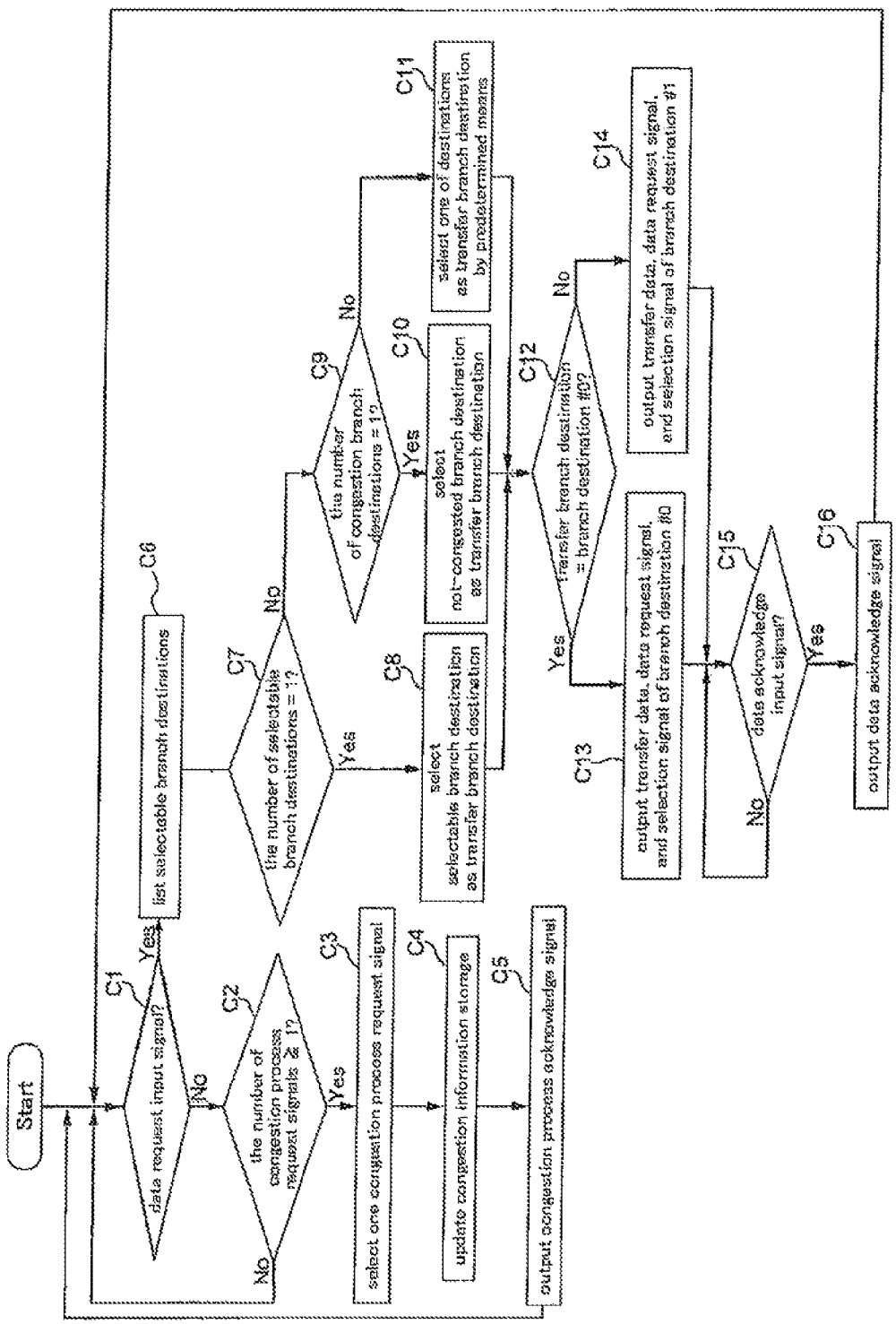
FIG. 4 is a flowchart showing operation procedure of a congestion avoiding path calculation module.

FIG. 4 illustrates the procedure of operation of the congestion avoiding path calculation module 112. First, the congestion avoiding path calculation module 112 is in the initial state. The congestion avoiding path calculation module 112 determines whether the data request signal is received by the data request input terminal or not (step C1). When no data request signal is received, the congestion avoiding path calculation module 112 determines whether one or more congestion process request signals are received in the congestion process request input terminal or not (step C2). When the congestion process request signals are not received, the congestion avoiding path calculation module 112 returns to step C1 and waits until the data request signal or the congestion process request signal is received.

When there is no data request signal and the congestion process request signals are received by one or more congestion process request input terminals, the congestion avoiding path calculation module 112 selects one of the signals (step C3). The congestion avoiding path calculation module 112 updates congestion information of a branch destination corresponding to the congestion process request input terminal to which the congestion process request signal is supplied, among the congestion information stored in the congestion information storage memory (step C4). The value to be updated is the value of the congestion information signal supplied to the congestion information input terminal in the set to which the congestion process request input terminal also belongs. After updating the congestion information, the congestion avoiding path calculation module 112 outputs the congestion process acknowledge signal from the congestion process acknowledge output terminal in the set to which the congestion process request input terminal also belongs (step C5). After that, the congestion avoiding path calculation module 112 withdraws the congestion process request signal to be received and the congestion process acknowledge signal to be output and returns to step C1 (initial state).

When it is determined that the data request signal is received in step C1, the congestion avoiding path calculation module 112 extracts destination information from the transfer data received in the data input terminal. On the basis of the information, whether there is the possibility that each of the branch destinations of the asynchronous branching module 102 connected reaches the destination or not. The congestion avoiding path calculation module 112 lists a branch destination having the possibility of reaching the destination as a selectable branch destination (step C6). The congestion avoiding path calculation module 112 determines whether the number of selectable branches is one or not (step C7). That is, the congestion avoiding path calculation module 112 determines whether only one of the two branches of the asynchronous branching module can reach the destination or not. When the number of selectable branch destinations is one, the congestion avoiding path calculation module 112 selects the branch destination as a transfer branch destination (step C8).

When the number of selectable branch destinations is not one, the congestion avoiding path calculation module 112 refers to the congestion information and examines whether the selectable branch destinations are congested or not. The congestion avoiding path calculation module 112 determines whether the number of branch destinations which are not congested is one or not (step C9). That is, the congestion avoiding path calculation module 112 determines whether or not one of the two selectable branch destinations is congested and the other is not congested. When the number of congested branch destinations is one, the congestion avoiding path calculation module 112 selects the branch destination which is not congested (uncongested branch destination) as a transfer branch destination (step C10). In the case where the number of congested branch destinations is not one, that is, both of the two selectable branch destinations are congested or uncongested, the congestion avoiding path calculation module 112 selects one of the branch destinations as a transfer branch destination by a predetermined method (step C11).

The congestion avoiding path calculation module 112 determines whether the branch destination selected as the transfer branch destination is the branch destination No. 0 or not (step C12). When the transfer branch destination is the branch destination No. 0, the congestion avoiding path calculation module 112 sends a selection signal indicative of the branch destination No. 0 to the asynchronous branching module 102. The congestion avoiding path calculation module 112 outputs the transfer data received by the data input terminal and the data request signal received by the data request input terminal to the asynchronous branching module 102 from the data output terminal and the data request output terminal, respectively (step C13).

When the transfer branch destination is not the branch destination No. 0, that is, the transfer branch destination is the branch destination No. 1, the congestion avoiding path calculation module 112 sends a selection signal indicative of the branch destination No. 1 to the asynchronous branching module 102. The congestion avoiding path calculation module 112 outputs the transfer data received by the data input terminal and the data request signal received by the data request input terminal to the asynchronous branching module 102 from the data output terminal and the data request output terminal, respectively (step C14).

The congestion circuit avoiding path calculation module 112 determines whether the data acknowledge signal to the data request signal output in step S13 or C14 is received by the data acknowledge input terminal (step C15). When the data acknowledge signal is not received, the congestion circuit avoiding path calculation module 12 repeatedly executes step C15 and waits until the data acknowledge signal is received. When the data acknowledge signal is received by the data acknowledge input terminal, the congestion avoiding path calculation module 112 outputs the data acknowledge signal from the data acknowledge output terminal (step C16). After that, the congestion avoiding path calculation module 112 withdraws the data request signal received and the data acknowledge signal to be output and returns to step C1 (initial state).

Figure 5:
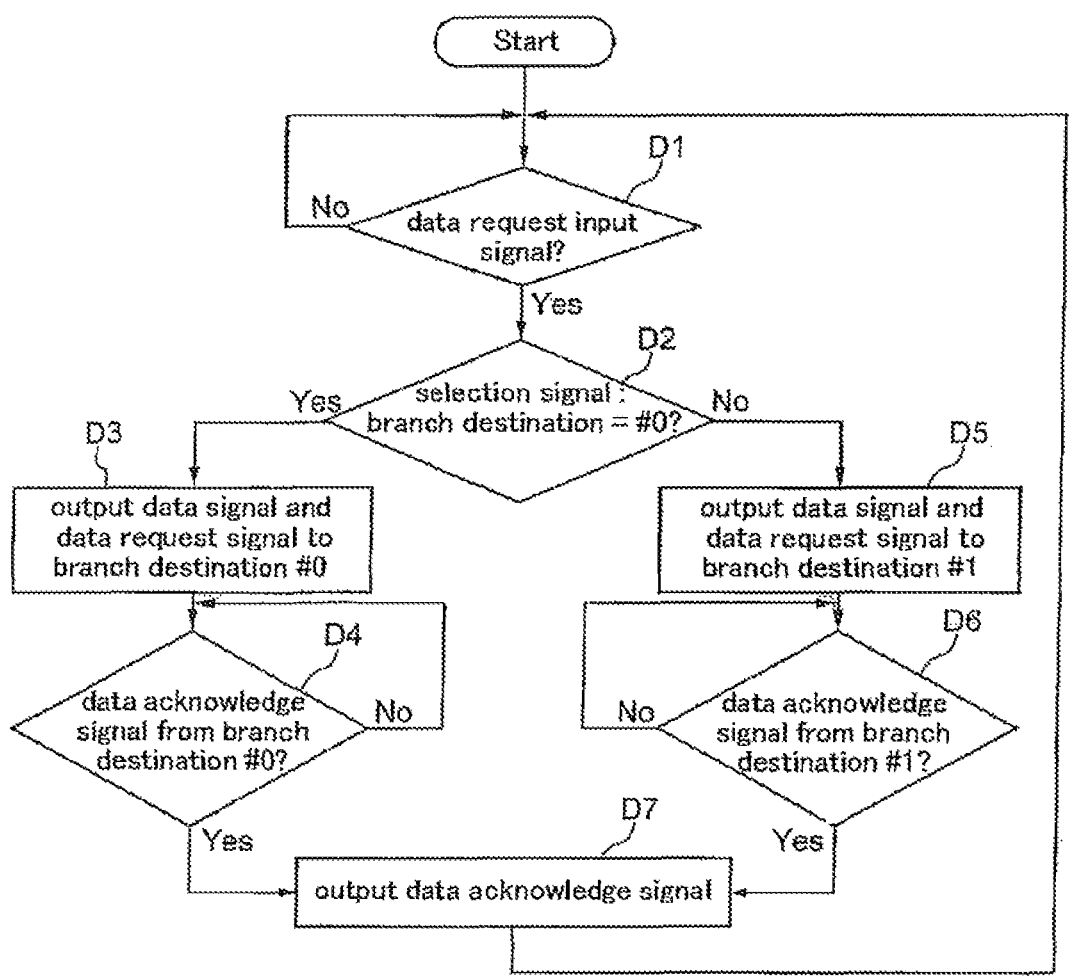
FIG. 5 is a flowchart showing operation procedure of an asynchronous branching module.

FIG. 5 illustrates the procedure of operation of the asynchronous branching module 102. First, the asynchronous branching module 102 is in the initial state. The asynchronous branching module 102 determines whether the data request signal is received by the data request input terminal from the congestion avoiding path calculation module 112 or not (step D1). When the data request signal is not received, the asynchronous branching module 102 repeatedly executes the step D1 and waits until the data request signal is received.

When the data request signal is received, the asynchronous branching module 102 determines whether or not the selection signal which is received from the congestion avoiding path calculation module 112 via the selection signal input terminal indicates the branch destination No. 0 or not (step D2). When the selection signal indicates the branch destination No. 0, the asynchronous branching module 102 outputs transfer data received by the data input terminal and the data request signal received by the data request input terminal, from the data output terminal and the data request output terminal corresponding to the branch destination Number 0 (step D3).

When the transfer data and the data request signal is transmitted in step D3, the asynchronous branching module 102 determines whether or not the data acknowledge signal to the data request signal which is output is received by the data acknowledge input terminal corresponding to the branch destination No. 0 (step D4). When the data acknowledge signal is not received by the data acknowledge input terminal corresponding to the branch destination No. 0, the asynchronous branching module 102 repeatedly executes step D4 and waits until the data acknowledge signal is received.

When it is determined that the selection signal indicates the branch destination No. 1 in step D2, the asynchronous branching module 102 outputs the transfer data and the data request signal from the data output terminal and the data request output terminal, respectively, corresponding to the branch destination No. 1 (step D5). After that, the asynchronous branching module 102 determines whether or not the data acknowledge signal corresponding to the data request signal which is output is received by the data acknowledge input terminal corresponding to the branch destination No. 1 (step D6). When the data acknowledge signal is not received by the data acknowledge input terminal corresponding to the branch destination No. 1, the asynchronous branching module 102 repeatedly executes step D6 and waits until the data acknowledge signal is received.

When the data acknowledge signal is received by the data acknowledge input terminal of the branch destination No. 0 or No. 1 in step D4 or D6, the asynchronous branching module 102 outputs the data acknowledge signal from the data acknowledge output terminal (step D7). After outputting the data acknowledge signal, the asynchronous branching module 102 withdraws the data request signal which is received and the data acknowledge signal which is output and returns to step D1 (initial state).

In the asynchronous inter-core connection circuit, congestion occurs in the asynchronous arbitration module 101 in which a plurality of data transfer paths merge. Whether transfer data from any of the plurality of merge sources in the asynchronous arbitration module 101 is retained or not depends on an arbitration result. That is, the presence or absence of congestion for the merge source depends on the arbitration result. In the embodiment, the congestion detection module 111 receives an arbitration result from the asynchronous arbitration module 101 and generates congestion information on the basis of the arbitration result. The congestion detection module 111 generates congestion information on the basis of the arbitration result, so that detection of congestion and generation of congestion information can be achieved for the merge source of the asynchronous arbitration module 101. On the basis of the congestion information and the destination information of the transfer data, the congestion avoiding path calculation module 112 preferentially determines, as a transfer branch destination, a branch destination indicating the absence of congestion among the branch destinations of the asynchronous branching module 101. In such a manner, waste of the communication capacity of the data transfer path can be suppressed.

In the embodiment, the congestion avoiding path calculation module 112 performs arbitration between the data request signal and the congestion process request signal. When the data request signal is passed as a result of the arbitration, the congestion process request signal is retained until completion of the handshaking of the data request signal. On the other hand, when the congestion process request signal is passed, the data request signal is retained until completion of the handshaking of the congestion process request signal. In such a manner, the congestion information is updated while avoiding timings of data transfer, and data can be transferred while avoiding timings at which the congestion information is updated. Consequently, the congestion avoiding path calculation module 112 can obtain a result of the path setting calculation for avoiding congestion places by using signals indicative of congestion information. In addition, without causing a change in selection of the data output terminal of the asynchronous branching module 102 during data transfer handshaking, the asynchronous branching module 102 can perform normal operation based on the asynchronous branching module 102.

In the asynchronous inter-core connection circuit, different from a synchronous circuit, a timing of receiving the data request signal and a timing of receiving the congestion process request signal are arbitrary. That is, a change in a signal indicative of congestion information is received at a timing independent of data transfer. Consequently, in the case of simply using the congestion information, when the congestion information changes during the handshaking in the asynchronous branching module and a result of selection of the data output terminal accordingly changes, in some cases, a branch destination changes before completion of data transfer. When the branch destination changes before completion of data transfer, the asynchronous branching module cannot operate according to the handshake protocol and operates erroneously. In the embodiment, storage of congestion information and determination of a data transfer destination are performed exclusively, so that such a problem does not occur.

Figure 6:
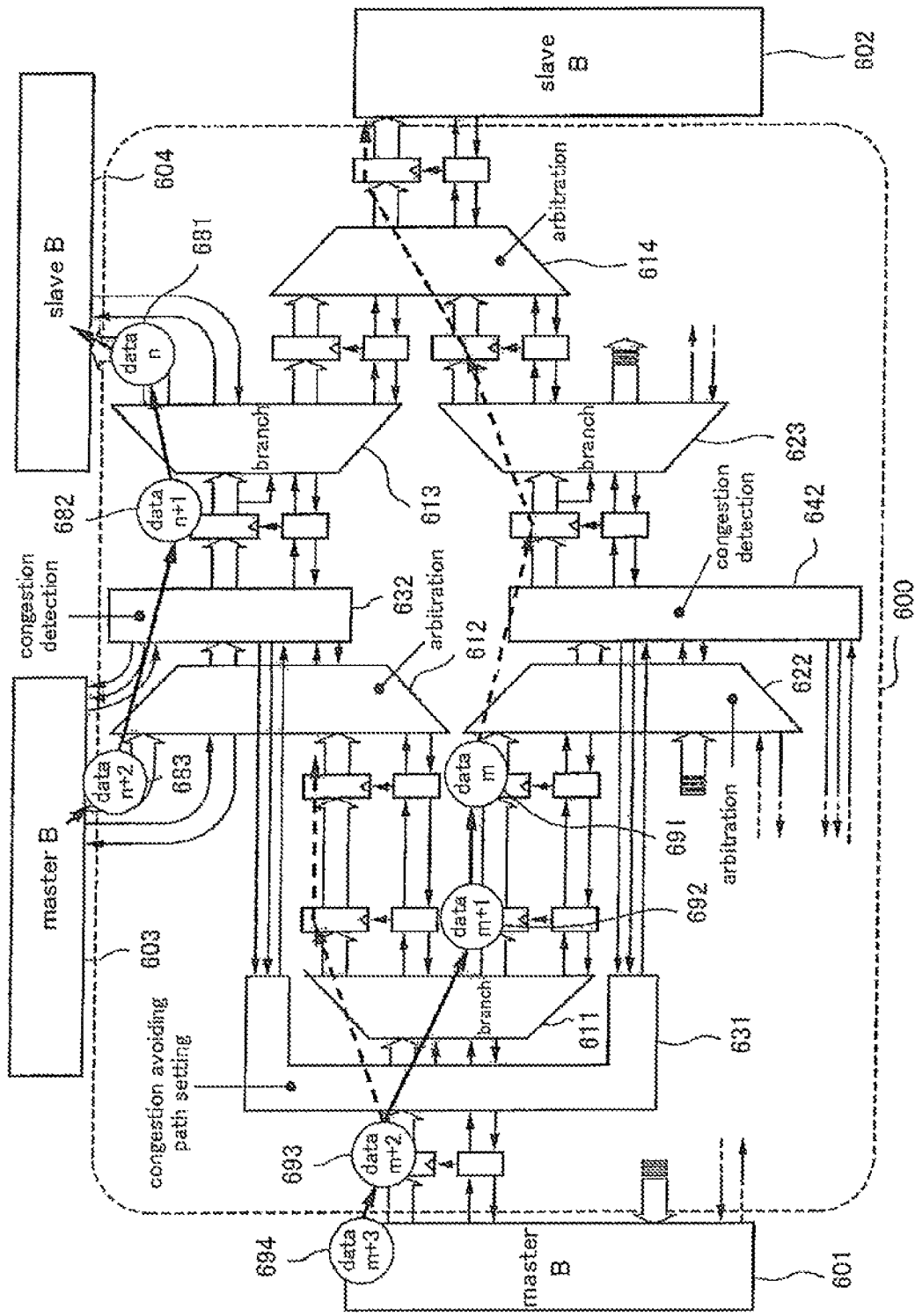
FIG. 6 is a block diagram illustrating a semiconductor circuit including the asynchronous logic circuit.

A concrete example will be described below. FIG. 6 illustrates a semiconductor circuit including the asynchronous inter-core connection circuit of a first example. The semiconductor circuit has an asynchronous inter-core connection circuit 600, a master A 601, a slave A 602, a master B 603, and a slave B 604. The asynchronous inter-core connection circuit 600 connects four cores (synchronous mater-side cores and slave-side cores): the master A 601, the slave A 602, the master B 603, and the slave B 604. The asynchronous inter-core connection circuit 600 includes asynchronous branching modules 611, 613, and 623, asynchronous arbitration modules 612, 614, and 622, congestion detection modules 632 and 642, and a congestion avoiding path calculation module 631.

Figure 16:
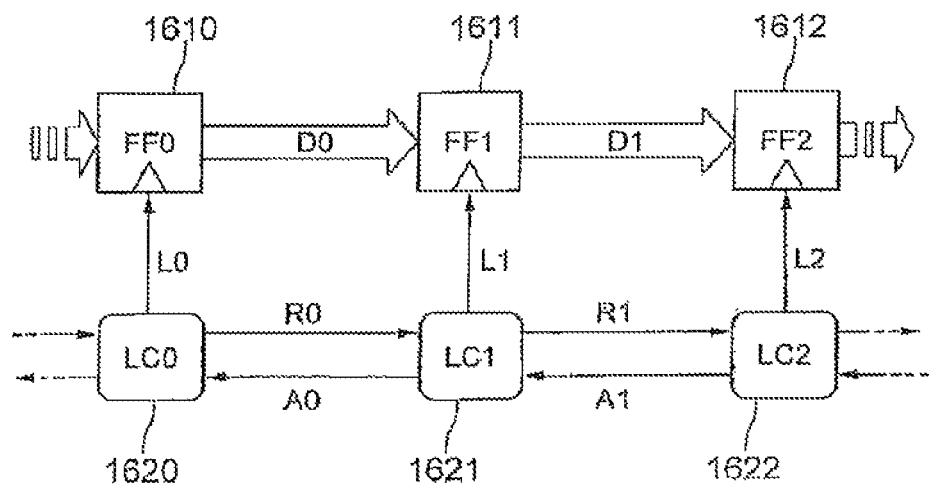
FIG. 16 is a block diagram showing a typical configuration example of an asynchronous logic circuit.
Figure 17:
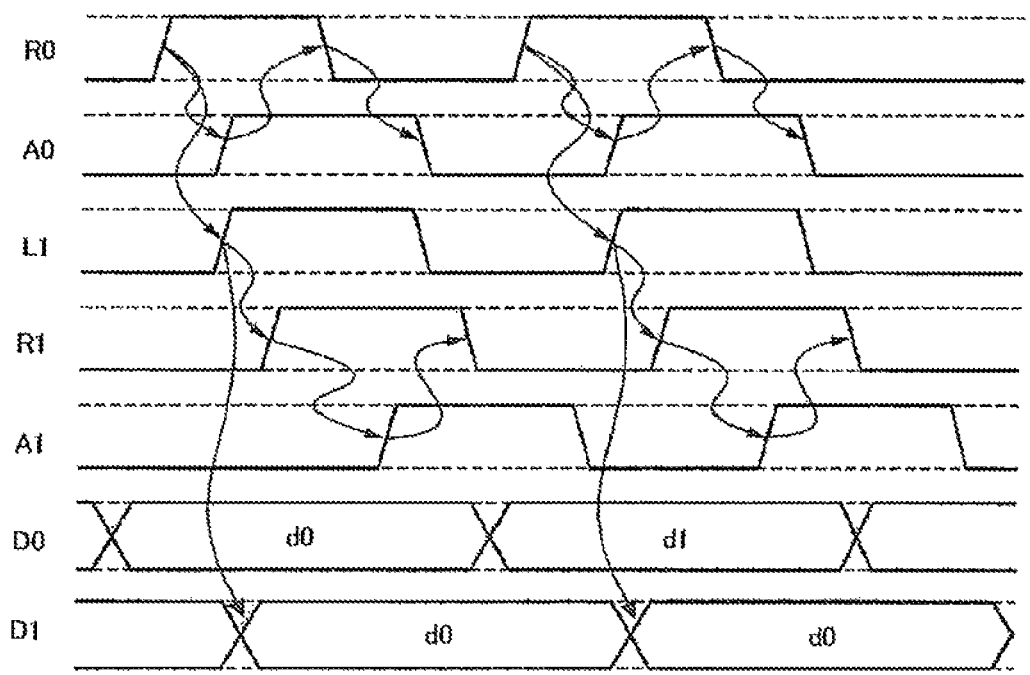
FIG. 17 is a waveform chart showing an operation waveform example of the asynchronous logic circuit of FIG. 16.
Figure 18:
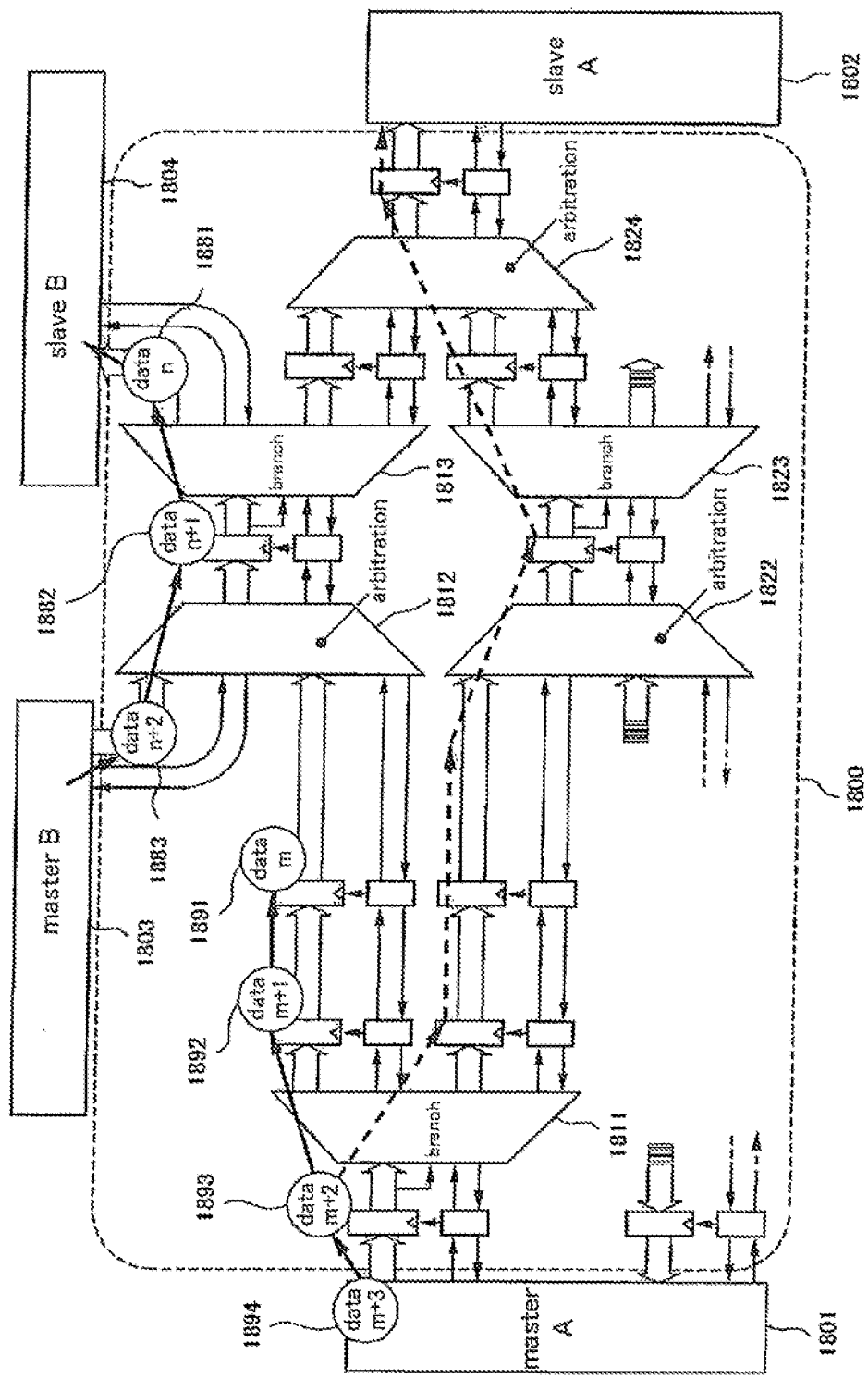
FIG. 18 is a block diagram illustrating a semiconductor circuit including the asynchronous logic circuit.

The congestion avoiding path calculation module 631 is disposed corresponding to the asynchronous branching module 611. The congestion avoiding path calculation module 631 receives transfer data from the master A 601 via a register (storage element). The congestion avoiding path calculation module 631 transmits/receives a request signal and an acknowledge signal to/from a storage control circuit (LC in FIG. 16) of the register. The asynchronous branching module 611 has two branch destinations. One of the branch destinations is connected to the asynchronous arbitration module 612 via the register, and the other branch destination is connected to the asynchronous arbitration module 622 via the register.

The congestion detection modules 632 and 642 are disposed in correspondence with the asynchronous arbitration modules 612 and 622, respectively. The congestion detection module 632 outputs the transfer data which is output from the asynchronous arbitration module 612 to the asynchronous branching module 613 via the register, and transmits/receives a request signal and an acknowledge signal to/from a storage control circuit of the register. The congestion detection module 632 transmits/receives a congestion process request signal, a congestion information signal, and a congestion process acknowledge signal to/from the congestion avoiding path calculation module 631 corresponding to the merge source of the asynchronous arbitration module 612.

The congestion detection module 642 outputs transfer data which is output from the asynchronous arbitration module 622 to the asynchronous branching module 623 via the register, and transmits/receives a request signal and an acknowledge signal to/from a storage control circuit of the register. The congestion detection module 642 transmits/receives a congestion process request signal, a congestion information signal, and a congestion process acknowledge signal to/from the congestion avoiding path calculation module 631 corresponding to the merge source of the asynchronous arbitration module 622.

The asynchronous branching module 613 has two branch destinations. One of the branch destinations of the asynchronous branching module 613 is the asynchronous arbitration module 614. The asynchronous branching module 623 has two branch destinations. One of the branch destinations of the asynchronous branching module 623 is the asynchronous arbitration module 614. The asynchronous arbitration module 614 receives the transfer data which is output from the congestion detection modules 632 and 642 via the register, and outputs the transfer data to the slave A 602 via the register.

For communication from the master A 601 to the slave A 602, two paths can be used. One of them is a path passing the asynchronous branching module 611, the asynchronous arbitration module 612, the asynchronous branching module 613, and the asynchronous arbitration module 614. The other is a path passing the asynchronous branching module 611, the asynchronous arbitration module 622, the asynchronous branching module 623, and the asynchronous arbitration module 614. For communication from the master B 603 to the slave B 604, a path including the asynchronous arbitration module 612 and the asynchronous branching module 613 can be used.

Figure 7:
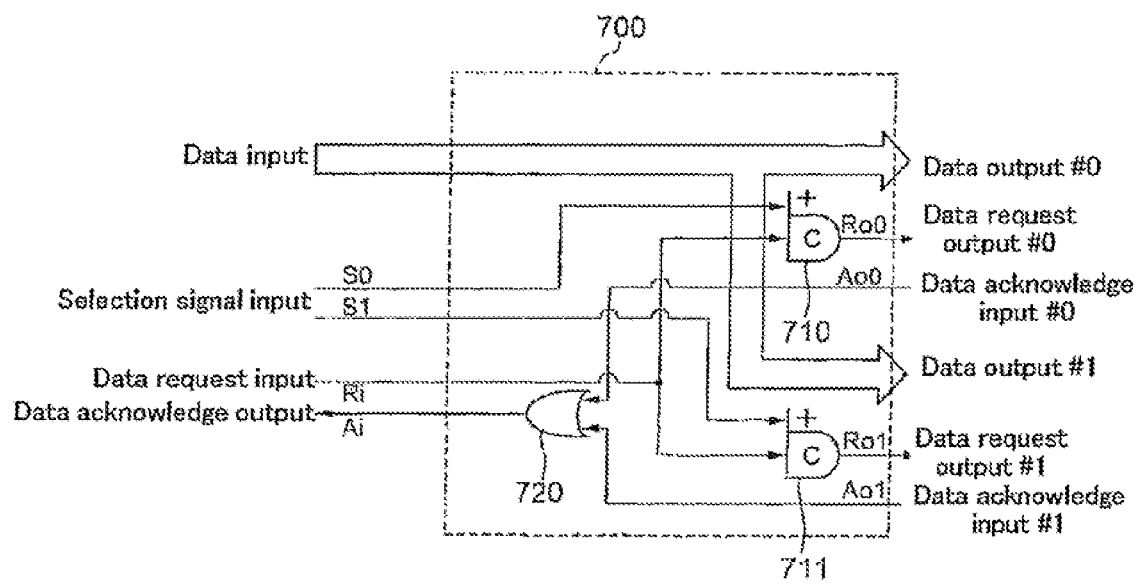
FIG. 7 is a block diagram illustrating an example of the circuit configuration of the asynchronous branching module.

FIG. 7 illustrates an example of the circuit configuration of the asynchronous branching module. The asynchronous branching module 611 in FIG. 6 can be constructed by an asynchronous branching circuit 700 having a circuit configuration shown in FIG. 7. The asynchronous branching circuit 700 has asymmetric 2-input C elements 710 and 711 and an OR element 720. Transfer data is supplied to the data input terminal of the asynchronous branching circuit 700. A data request signal Ri is supplied to the data request input terminal of the asynchronous branching circuit 700. The asynchronous branching module 700 outputs the input transfer data from the data output terminal corresponding to the branch destination (branch destination No. 0) as one of the branch destinations and from the data output terminal corresponding to the other branch destination (branch destination No. 1).

Figure 8:
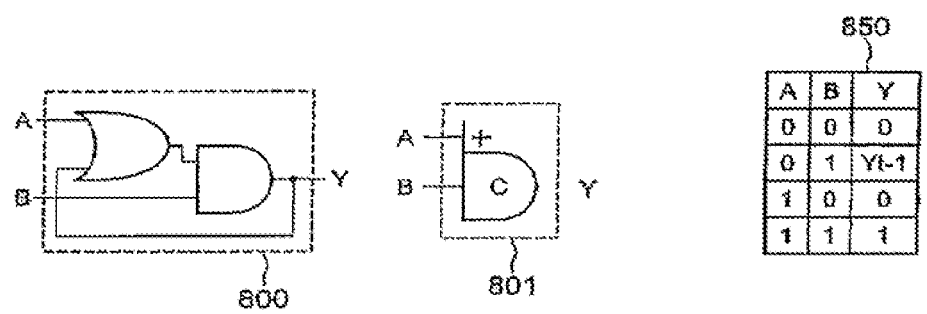
FIG. 8 is a block diagram illustrating an asymmetric 2-input C element.

FIG. 8 shows the logic circuit of the asymmetric 2-input C element. Each of the asymmetric 2-input C elements 710 and 711 shown in FIG. 7 can be constructed by a logic circuit (asymmetric 2-input C element) 800 obtained by combining an OR element and an AND element illustrated in FIG. 8. The asymmetric 2-input C element 800 will be expressed as reference numeral 801. The relations among input terminals A and B and an output terminal Y of the asymmetric 2-input C element 800 are as shown by a truth table 850. Specifically, when inputs (A, B)=(1, 1), the asymmetric 2-input C element 800 outputs Y=1. When B=0, regardless of the input value of A, the asymmetric 2-input C element 800 outputs Y=0. When inputs (A, B)=(1, 0), the asymmetric 2-input C element 800 maintains the value of the output Y. That is, once the output becomes 1 (Y=1) when (A, B)=(1, 1), even if A becomes 0, the asymmetric 2-input C element 800 maintains the output Y=1 until B becomes 0.

Referring again to FIG. 7, selection signals S0 and S1 output from the congestion avoiding path calculation module are supplied from selection signal input terminals to the asynchronous branching circuit 700. The selection signals (S0, S1) are in the state of either (0, 1) or (1, 0). The selection signal S0 is supplied to the terminal A of the asymmetric 2-input C element 710. The selection signal S1 is supplied to the terminal A of the asymmetric 2-input C element 711. A data request signal Ri is supplied to the terminal B of each of the asymmetric 2-input C elements 710 and 711. The asymmetric 2-input C element 710 outputs a data request signal Ro0 corresponding to the branch destination No. 0. The asymmetric 2-input C element 711 outputs a data request signal Ro1 corresponding to the branch destination No. 1.

When the selection signal S0=1 and the data request signal Ri=1, the asymmetric 2-input C element 710 outputs the data request signal Ro0=1. When the asymmetric 2-input C element 710 outputs the data request signal Ro0=1, transfer data which is output from the data output terminal corresponding to the branch destination No. 0 is transferred to the branch destination No. 0. When the selection signal S1=1 and the data request signal Ri=1, the asymmetric 2-input C element 711 outputs the data request signal Ro0=1. When the asymmetric 2-input C element 711 outputs the data request signal Ro0=1, transfer data which is output from the data output terminal corresponding to the branch destination No. 1 is transferred to the branch destination No. 1.

In the asynchronous branching circuit 700, a data acknowledge signal Ao0 is supplied from a register of the data transfer destination to a data acknowledge input terminal corresponding to the branch destination No. 0, and a data acknowledge signal Ao1 is supplied from a register of the data transfer destination to a data acknowledge input terminal corresponding to the branch destination. No. 1. The OR element 720 obtains OR between the data acknowledge signals Ao0 and Ao1 and outputs the resultant as a data acknowledge signal Ai from a data acknowledge output terminal. That is, when the data acknowledge signal Ao0 becomes 1 or the data acknowledge signal Ao1 becomes 1, the OR element 720 outputs the data acknowledge signal Ai=1.

In the initial state, the signals supplied to the asynchronous branching circuit 700 are the data request signal Ri=0 and the data acknowledge signals Ao0=0 and Ao1=0. The signals output from the asynchronous branching circuit 700 are the data request signals Ro0=0 and Ro1=0 and the data acknowledge signal Ai=0. The selection signals (S0, S1) are either (1,0) or (0,1). During the state where there is no data request signal (R1=0), the asynchronous branching circuit 700 waits (step D1 in FIG. 5).

When the data request signal Ri becomes 1, the asynchronous branching circuit 700 advances to step D2 and selects an output destination of the data request signal in accordance with the selection signals S0 and S1. When the selection signals (S0, S1) are (1,0) and the input data request signal Ri changes to 1, the asymmetric 2-input C element 710 changes the data request signal Ro0 to be output to 1. Since the selection signal S1 is 0 at this time, the output Ro1 of the asymmetric 2-input C element 711 remains 0. In this case, the asymmetric branching circuit 700 advances to step D3 and outputs transfer data which is supplied in parallel with the data request signal Ri from the data output terminal corresponding to the branch destination No. 0. The asymmetric branching circuit 700 outputs the data request signal Ro0=1 from the data request output terminal corresponding to the branch destination No. 1.

After outputting the data request signal to the branch destination No. 0, in step D4, the asynchronous branching circuit 700 waits for the data acknowledge signal to the output data request signal Ro0=1. The register connected to the branch destination No. 0 receives the transfer data and the data request signal Ro0=1 and, after that, outputs the data acknowledge signal. When the register outputs the data acknowledge signal, the data acknowledge signal Ao0 supplied to the asynchronous branching circuit 700 changes to 1. At this time, with respect to the branch destination No. 1, since the data request signal Ro1 remains 0, the register connected to the branch destination No. 1 does not output the data acknowledge signal, and the data acknowledge signal Ao1 of the branch destination No. 1 remains 0.

On the other hand, when the selection signals (S0, S1) are (0,1) and the input data request signal Ri changes to 1, the asymmetric 2-input C element 711 changes the data request signal Ro1 to be output to 1. Since the selection signal S0 is 0 at this time, the output Ro1 of the asymmetric 2-input C element 710 remains 0. In this case, the asymmetric branching circuit 700 advances to step D5 and outputs transfer data which is supplied in parallel with the data request signal Ri from the data output terminal corresponding to the branch destination No. 1. The asymmetric branching circuit 700 outputs the data request signal Ro0=1 from the data request output terminal corresponding to the branch destination No. 1.

After outputting the data request signal to the branch destination No. 1, in step D6, the asynchronous branching circuit 700 waits for input of the data acknowledge signal to the output data request signal Ro1=1. The register connected to the branch destination No. 1 receives the transfer data and the data request signal Ro1=1 and, after that, outputs the data acknowledge signal. When the register outputs the data acknowledge signal, the data acknowledge signal Ao1 supplied to the asynchronous branching circuit 700 changes to 1. At this time, with respect to the branch destination No. 0, since the data request signal Ro0 remains 0, the register connected to the branch destination No. 0 does not output the data acknowledge signal, and the data acknowledge signal Ao0 of the branch destination No. 0 remains 0.

When the data acknowledge signal Ao0 from the branch destination No. 0 or the data acknowledge signal Ao1 from the branch destination No. 1 changes to 1, the output of the OR element 720 changes. That is, in step D7, the asynchronous branching circuit 700 outputs the data acknowledge signal Ai=1 to the branch source. When the data acknowledge signal Ai becomes 1, the register in the branch source withdraws the data request signal and sets Ri=0. Since the data request signal supplied to the asynchronous branching circuit 700 becomes 0, the data request signals Ro0 and Ro1 as outputs of the asymmetric 2-input C elements 710 and 711 become 0. That is, the asynchronous branching circuit 700 withdraws the data request signal.

When the asynchronous branching circuit 700 withdraws the data request signal, the register of the branch destination receiving the data request signal withdraws the data acknowledge signal which is output. When the register of the branch destination No. 0 or the register of the branch destination No. 1 withdraws the data acknowledge signal to set Ao0=0 or Ao1=0, an output of the OR element 720 changes. That is, the data acknowledge signal Ai which is output to the branch source from the asynchronous branching circuit 700 becomes 0. The asynchronous branching circuit 700 is reset to the initial state.

Figure 9:
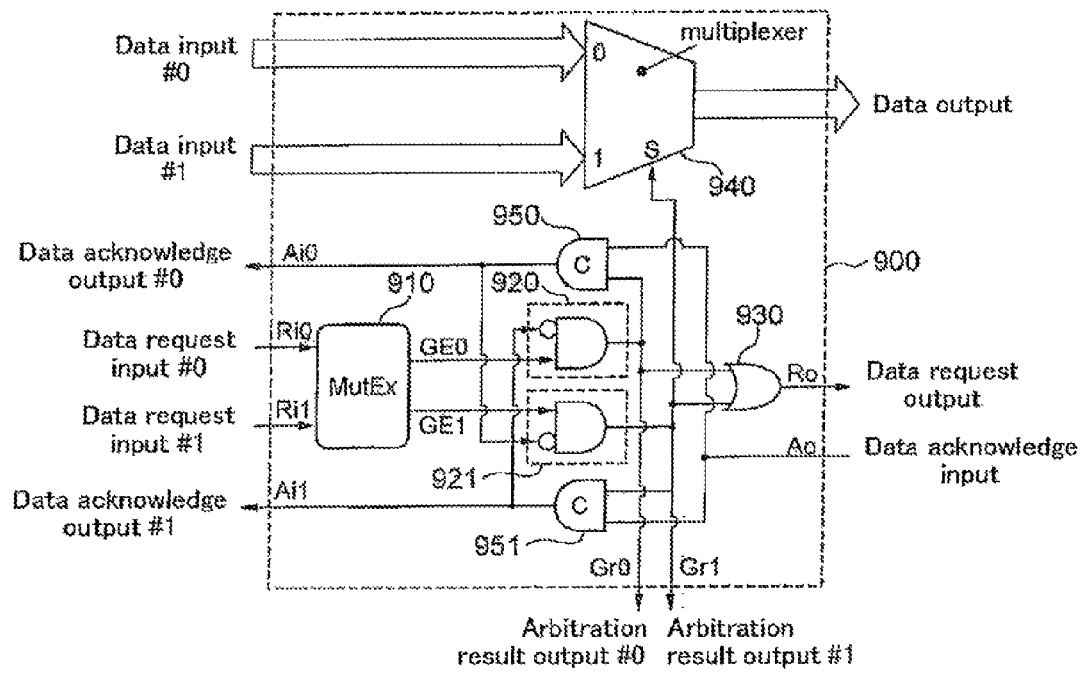
FIG. 9 is a block diagram illustrating an example of the circuit configuration of the asynchronous arbitration module.

FIG. 9 illustrates an example of the circuit configuration of the asynchronous arbitration module. Each of the asynchronous arbitration modules 612 and 622 in FIG. 6 can be constructed by an asynchronous arbitration circuit 900 illustrated in FIG. 9. The asynchronous arbitration circuit 900 has a mutually-exclusive circuit (MutEx) 910, handshaking recognizing circuits 920 and 921, an OR element 930, a multiplexer 940, and symmetric 2-input C elements 950 and 951.

To the asynchronous arbitration circuit 900, transfer data from two merge sources (merge source No. 0 and merge source No. 1), data request signals Ri0 and Ri1 from the two merge sources, and a data acknowledge signal Ro from a merge destination are supplied. The asynchronous arbitration circuit 900 outputs the transfer data, the data request signal Ro, data acknowledge signals Ai0 and Ai1 for the two merge sources, and arbitration result signals Gr0 and Gr1 to the congestion detection modules.

Figure 10:
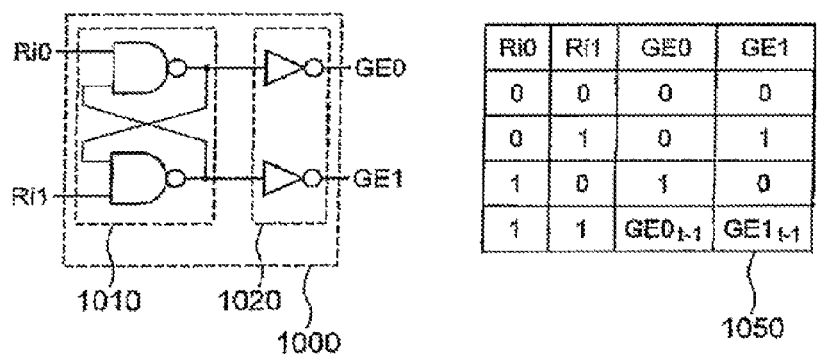
FIG. 10 is a block diagram illustrating a mutually-exclusive circuit.

FIG. 10 illustrates a logic circuit of a mutually-exclusive circuit. The mutually-exclusive circuit 910 illustrated in FIG. 9 can be constructed by a logic circuit (mutually-exclusive circuit) 1000 having a circuit configuration shown in FIG. 10. The mutually-exclusive circuit 1000 includes two NAND elements each having two input terminals to one of which Ri0 or Ri1 is supplied and the other of which is connected to the output terminal of the other NAND element and inverters connected to the output terminals of the two NAND elements. The relations among the inputs (Ri0, Ri1) of the mutually-exclusive circuit 910 and outputs GE0 and GE1 are as shown by a truth table 1050. Specifically, when inputs (Ri0, Ri1)=(0, 0), (Ri0, Ri1)=(1,0), or (Ri0, Ri1)=(0, 1), outputs are unconditionally determined. The outputs (GE0, GE1) of the mutually-exclusive circuit 1000 are equal to (Ri0, Ri1). When the inputs (Ri0, Ri1)=(1, 1), the mutually-exclusive circuit 1000 maintains the outputs in the previous state. However, when the inputs (Ri0, Ri1) change from (0,0) to (1,1), the inputs (Ri0, Ri1) temporarily change to (1,0) or (0,1) and then become the outputs in the previous state.

The operation can be realized by a partial circuit (arbitration partial circuit) 1010 constructed by the NAND elements of the mutually-excusive circuit 1000. However, only by the partial circuit 1010, when Ri0 and Ri1 change from 0 to 1 almost simultaneously, the outputs of the partial circuit 1010 enter a state, called a metastable state where the outputs are not changed to the voltage corresponding to the logic value 0 or 1. A partial circuit (metastable state filter circuit) 1020 constructed by the inverters on the output side of the partial circuit 1010 functions to prevent the state.

Figure 11:
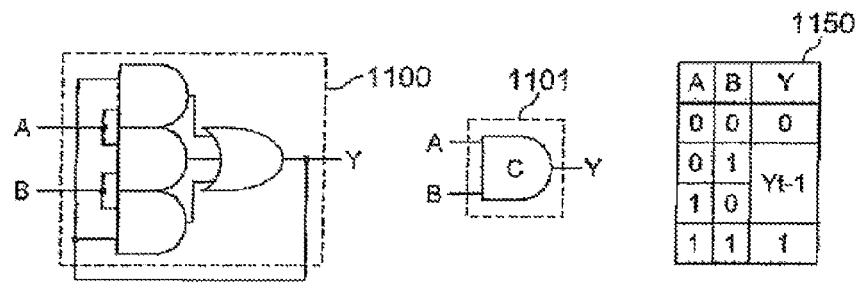
FIG. 11 is a block diagram illustrating a symmetric 2-input C element.

FIG. 11 illustrates a logic circuit of a symmetric 2-input C element. Each of the symmetric 2-input C elements 950 and 951 in FIG. 9 can be constructed by a logic circuit (symmetric 2-input C element) 1100 shown in FIG. 11. The symmetric 2-input C element 1100 is constructed by three AND elements and one OR element and is a logic circuit realizing a 3-input majority decision logic function in which one of input terminals and an output terminal are connected. The relations among inputs (A, B) of the symmetric 2-input C element 1100 and an output (Y) are as shown in a truth table 1150. Specifically, when the inputs (A, B)=(1, 1), the symmetric 2-input C element 1100 outputs Y=1. When the inputs (A, B)=(0, 0), the symmetric 2-input C element 1100 outputs Y=0. When the inputs (A, B)=(1, 0) or (0, 1), the symmetric 2-input C element 1100 maintains the value of the output Y.

Referring again to FIG. 9, the data request signals Ri0 and R11 from two merge sources are supplied to the mutually-exclusive circuit 910. When the data request signal Ri0 from the merge source No. 0 is 1 and the data request signal Ri1 from the merge source No. 1 is 0, the data request signal from the merge source No. 0 is passed, and (GE0, GE1)=(1, 0) are output. When the data request signal Ri0 from the merge source No. 0 is 0 and the data request signal from the merge source No. 1 is 1, the mutually-exclusive circuit 910 makes the data request signal from the merge source No. 1 pass and outputs (GE0, GE1)=(0, 1). When the data request signal Ri0 from the merge source No. 0 is 1 and the data request signal from the merge source No. 1 is also 1, that is, when the data request signals are received from both of the merge sources, the mutually-exclusive circuit 910 makes the data request signal from the merge source which arrived first pass.

Each of the handshaking recognizing circuits 920 and 921 includes an AND element having two input terminals one of which is connected to the data request signal passed through the mutually-exclusive circuit 910, and the other connected to the data acknowledge signals Ai0 and Ai1 via inverters. The handshaking recognizing circuit 920 obtains AND between the output GE0 of the mutually-exclusive circuit 910 and an inversion signal of the output of the symmetric 2-input C element 951. The handshaking recognizing circuit 921 obtains AND between the output GE1 of the mutually-exclusive circuit 910 and an inversion signal of the output of the symmetric 2-input C element 950. The OR element 930 obtains OR between an output of the handshaking recognizing circuit 920 and an output of the handshaking recognizing circuit 921. The asynchronous arbitration circuit 900 sends outputs of the handshaking recognizing circuits 920 and 921 as the arbitration result signals (Gr0, Gr1). The asynchronous arbitration circuit 900 outputs the output of the OR element 930 as the data request signal Ro to the merge destination.

To the symmetric 2-input C element 950, the data acknowledge signal Ao from the merge destination which is supplied to the asynchronous arbitration circuit 900 and the output Gr0 of the handshaking recognizing circuit 920 are supplied. To the symmetric 2-input C element 951, the data acknowledge signal Ao and the output Gr1 of the handshaking recognizing circuit 921 are supplied. The asynchronous arbitration circuit 900 outputs the output of the symmetric 2-input C element 950 as the data acknowledge signal Ai0 to the merge source No. 0. When the output Gr0 of the handshaking recognizing circuit 920 becomes 1 and the data acknowledge signal Ao from the merge destination becomes 1, the asynchronous arbitration circuit 900 outputs the data acknowledge signal Ai0=1 to the merge source No. 0. The asynchronous arbitration circuit 900 sends the output of the symmetric 2-input C element 951 as the data acknowledge signal Ai1 to the merge source No. 1. When the output Gr1 of the handshaking recognizing circuit 921 becomes 1 and the data acknowledge signal Ao from the merge destination becomes 1, the asynchronous arbitration circuit 900 outputs the data acknowledge signal Ai1=1 to the merge source No. 1.

When there is no handshaking being mediated by the asynchronous arbitration circuit 900, the handshaking recognizing circuits 920 and 921 make the data request signal passed through the mutually-exclusive circuit 910 pass. On the other hand, when there is handshaking being mediated, the handshaking recognizing circuits 920 and 921 make the data request signal passed through the mutually-exclusive circuit 910 wait until completion of the handshaking mediated. One of the input terminals of the handshaking recognizing circuit 920 is connected to the data request signal (GE0) from the branch destination No. 0 passed through the mutually-exclusive circuit 910, and the other input terminal is connected to the data acknowledge signal Ai1 from the branch destination No. 1 via the inverter. Consequently, when the asynchronous arbitration circuit 900 is arbitrating the handshake of the branch destination No. 1 and the data acknowledge signal Ai1 of the branch destination No. 1 is 1, that is, when the data acknowledge signal is not withdrawn yet, the data request signal from the branch destination No. 0 is not passed until the data acknowledge signal is withdrawn. Similarly, when the asynchronous arbitration circuit 900 is arbitrating the handshake of the branch destination No. 0, the data request signal from the branch destination No. 1 passed through the mutually-exclusive circuit 910 is not passed until the data acknowledge signal to the branch destination No. 0 is withdrawn.

The symmetric 2-input C elements 950 and 951 correspond to waiting modules for waiting for both data request signals passed through the handshaking recognizing circuits 920 and 921 and the data acknowledge signal for the data request signal. The symmetric 2-input C elements 950 and 951 output the data acknowledge signal to the merge source to which the data request signal passed through the handshaking recognizing circuits 920 and 921 are supplied. That is, after the data request signal from the merge source No. 1 passes and the output Gr0 of the handshaking recognizing circuit 920 becomes 1, the symmetric 2-input C element 950 waits until the data acknowledge signal Ao becomes 1. When Ao becomes 1, the symmetric 2-input C element 950 outputs the data acknowledge signal Ao0=1 to the merge source No. 0. After the data request signal from the merge source No. 1 passes and the output Gr1 of the handshaking recognizing circuit 921 becomes 1, the symmetric 2-input C element 951 waits until the data acknowledge signal Ao becomes 1. When Ao becomes 1, the symmetric 2-input C element 951 outputs the data acknowledge signal Ao0=1 to the merge source No. 1.

The multiplexer 940 receives the transfer data from the merge source No. 0 and the transfer data from the merge source No. 1. To a selection signal terminal S of the multiplexer 940, the output Gr1 of the handshaking recognizing circuit 921 is supplied. When the output Gr1 of the handshaking recognizing circuit 921 is 1, that is, when the handshaking recognizing circuit 921 passes the data request signal from the merge source No. 1, the multiplexer 940 outputs the transfer data from the merge source No. 1. When the output Gr1 of the handshaking recognizing circuit 921 is 0, that is, when the handshaking recognizing circuit 920 passes the data request signal from the merge source No. 0, the multiplexer 940 outputs the transfer data from the merge source No. 0.

In the initial state, the signals supplied to the asynchronous arbitration circuit 900 are the data request signals Ri0=0 and Ri1=0 and the data acknowledge signal Ao=0. The signals output from the asynchronous arbitration circuit 900 are the data request signal Ro=0 and the data acknowledge signals Ai0=0 and Ai1=0. The internal signals of the asynchronous arbitration circuit 900 are the GE0=0, GE1=0, Gr0=0, and Gr1=0. In a state where there is no data request signal from any of the two merge sources (Ri0=0, Ri1=1), the asynchronous arbitration circuit 900 waits until the data request signal is received from at least one of them (step A1 in FIG. 2).

When the data request signal Ri0=1 or Ri1=1 is received from one or both of the merge sources, the asynchronous arbitration circuit 900 advances to step A2 where the merge source from which the data request signal is output is determined. When the data request signal Ri0 from the merge source No. 0 becomes 1, the mutually-exclusive circuit 910 passes the data request signal from the merge source No. 0, and outputs the internal signals (GE0, GE1)=(1,0). When the data request signal Ri1 from the merge source No. 1 becomes 1, the mutually-exclusive circuit 910 makes the data request signal from the merge source No. 1 pass and outputs the internal signals (GE0, GE1)=(0,1). In the case where the data request signals from both of the merge sources are received (Ri0=1, Ri1=1), the mutually-exclusive circuit 910 makes the data request signal which arrives first pass and outputs (GE0, GE1)=(1,0) or (GE0, GE1)=(0,1).

When the asynchronous arbitration circuit 900 receives the data request signal from the merge source No. 0 or when the data request signal from the merge source No. 0 arrives first, the mutually-exclusive circuit 910 outputs the internal signals (GE0, GE1)=(1,0). Accordingly, the output Gr0 of the handshaking recognizing circuit 920 becomes 1, and the output Gr1 of the handshaking recognizing circuit 921 becomes 0. Since the output of the handshaking recognizing circuit 921 which is received as the selection signal S becomes 0, the multiplexer 940 selects transfer data of the merge source No. 0. The asynchronous arbitration circuit 900 outputs the transfer data from the merge source No. 0 which is received together with the data request signal Ri0=1 to the data output terminal (step A3). The asynchronous arbitration circuit 900 outputs the arbitration result signals (Gr0, Gr1)=(1, 0) (step A4).

When the asynchronous arbitration circuit 900 receives the data request signal from the merge source No. 0 or the data request signal from the merge source No. 0 arrives first, the Gr1=1 is supplied to one of the input terminals of the symmetric 2-input C element 950. However, since the data acknowledge signal Ao from the merge source at the other input terminal is 0, the symmetric 2-input C element 950 does not change the output, and the data acknowledge signal Ai0 which is output from the asynchronous arbitration circuit 900 to the merge source No. 000 remains 0. With respect to the merge source No. 1, since the signals supplied to the symmetric 2-input C element 951 are Gr1=0 and Ao=0, the data acknowledge signal output to the merge source No. 1 of the asynchronous arbitration circuit 900 remains as Ai1=0.

On the other hand, when the asynchronous arbitration circuit 900 receives the data request signal from the merge source No. 1 or the data request signal from the merge source No. 1 arrives first, the mutually-exclusive circuit 910 outputs the internal signals (GE0, GE1)=(0,1), so that the output Gr0 of the handshaking recognizing circuit 920 becomes 0, and the output Gr1 of the handshaking recognizing circuit 921 becomes 1. When the output Gr1 of the handshaking recognizing circuit 921 which is received as the selection signal S becomes 1, the multiplexer 940 selects the transfer data of the merge source No. 1. The asynchronous arbitration circuit 900 outputs the transfer data from the merge source No. 1 which is supplied together with the data request signal Ri1=1 to the data output terminal (step A5). The asynchronous arbitration circuit 900 outputs the arbitration result (Gr0, Gr1)=(0,1) (step A6).

When the asynchronous arbitration circuit 900 receives the data request signal from the merge source No. 1 or the data request signal from the merge source No. 1 arrives first, Gr1=1 is supplied to one of the input terminals of the symmetric 2-input C element 951. However, the data acknowledge signal Ao from the merge source at the other input is 0, the symmetric 2-input C element 951 does not change the output, and the data acknowledge signal Ai1 output to the merge source No. 1 from the asynchronous arbitration circuit 900 remains 0. With respect to the merge source No. 0, the signals supplied to the symmetric 2-input C element 950 are Gr0=0 and Ao=0, so that the data acknowledge signal output to the merge source No. 0 from the asynchronous arbitration circuit 900 remains Ai0=0.

When the arbitration result signals (Gr0, Gr1) becomes (1,0) or (0,1), the output Ro of the OR element 930 becomes 1, and the asynchronous arbitration circuit 900 outputs the data request signal Ro=1 to the merge destination (step A7). In step A8, the asynchronous arbitration circuit 900 waits for the data acknowledge signal from the merge destination. When the data acknowledge signal Ao=1 is received, according to the arbitration result signals (Gr0, Gr1), that is, according to whether the data request signal from any of the merge sources is passed or not, the asynchronous arbitration circuit 900 advances from step A9 to step A10 or A11. The asynchronous arbitration circuit 900 outputs the data acknowledge signal to the merge source which passed the data request signal.

In the case where the asynchronous arbitration circuit 900 outputs the transfer data from the merge source No. 0, that is, in the case where (Gr0, Gr1)=(1,0), when the data acknowledge signal Ao=1 is received from the merge destination, both of the inputs of the symmetric 2-input C element 950 become 1. Accordingly, the output Ai0 of the symmetric 2-input C element 950 changes to 1, and the asynchronous arbitration circuit 900 outputs the data acknowledge signal Ai0=1 to the merge source No. 0 (step A10). At this time, since one of the inputs of the symmetric 2-input C element 951 is 0, even when the data acknowledge signal Ao becomes 1, the data acknowledge signal Ao1=1 which is output to the merge source No. 1 from the asynchronous arbitration circuit 900 does not change.

When the asynchronous arbitration circuit 900 outputs the data acknowledge signal Ai0=1 to the merge source No. 0, the register of the merge source No. 0 withdraws the data request signal (Ro0=0). When the merge source No. 0 withdraws the data request signal, the internal signals (GE0, GE1) output from the mutually-exclusive circuit 910 become (0, 0), so that the outputs Gr0 and Gr1 of the handshaking recognizing circuits 920 and 921 become 0 and 0. At this time, even if the mutually-exclusive circuit 910 passes the data request signal from the merge source No. 1 waited and the internal signals (GE0, GE0 become (0, 1), since the data acknowledge signal to the merge source No. 0 is not withdrawn, the output Gr1=0 of the handshaking recognizing circuit 921 does not change. When both of inputs of the OR element 930 become 0, the asynchronous arbitration circuit 900 withdraws the data request signal (Ro=0). When the data request signal is withdrawn, the register in the merge destination withdraws the data acknowledge signal (Ao=0). When the data acknowledge signal Ao becomes 0, the output of the symmetric 2-input C element 950 changes to 0, and the asynchronous arbitration circuit 900 withdraws the data acknowledge signal which is output to the merge source No. 0 and sets Ai0=0. After that, the asynchronous arbitration circuit 900 returns to the initial state.

In the case where the asynchronous arbitration circuit 900 outputs the transfer data from the merge source No. 1, that is, in the case where (Gr0, Gr1)=(0,1), when the data acknowledge signal Ao=1 is supplied from the merge destination, both of the inputs of the symmetric 2-input C element 951 become 1. Accordingly, the output of the symmetric 2-input C element 951 changes to 1, and the asynchronous arbitration circuit 900 outputs the data acknowledge signal Ai1=1 to the merge source No. 1 (step A11). Since one of the inputs of the symmetric 2-input C element 9520 is Gr0=0 at this time, even when the data acknowledge signal Ao becomes 1, the data acknowledge signal Ao0 which is output to the merge source No. 0 from the asynchronous arbitration circuit 900 does not change from 0.

When the asynchronous arbitration circuit 900 outputs the data acknowledge signal Ai1=1 to the merge source No. 1, the register of the merge source No. 1 withdraws the data request signal to set Ro1=0. When the merge source No. 1 withdraws the data request signal, the internal signals (GE0, GE1) output from the mutually-exclusive circuit 910 become (0, 0), and outputs of the handshaking recognizing circuits 920 and 921 become Gr0=0 and Gr1=0. At this time, even if the data request signal from the merge source No. 0 waited by the mutually-exclusive circuit 910 is passed and the internal signals (GE0, GE1) become (1,0), since the data acknowledge signal to the merge source No. 1 is not withdrawn, the output Gr0=0 of the handshaking recognizing circuit 920 does not change. When both of the inputs of the OR element 930 become 0, the asynchronous arbitration circuit 900 withdraws the data request signal to set Ro=0. When the data request signal is withdrawn, the register in the merge destination withdraws the data acknowledge signal to set Ao=0. When the data acknowledge signal becomes Ao=0, the output of the symmetric 2-input C element 951 changes to 0, and the asynchronous arbitration circuit 900 withdraws the data acknowledge signal which is output to the merge source No. 1 to set Ai1=0. After that, the asynchronous arbitration circuit 900 returns to the initial state.

Figure 12:
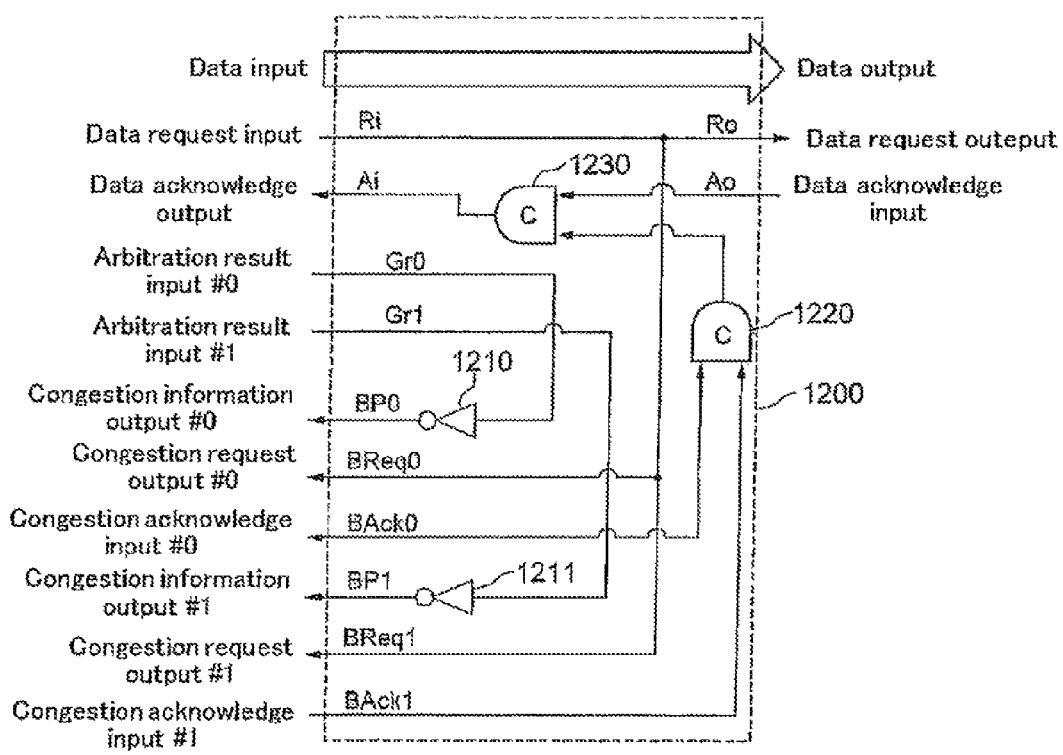
FIG. 12 is a block diagram illustrating an example of the circuit configuration of the congestion detection module.

FIG. 12 illustrates an example of the circuit configuration of the congestion detection module. Each of the congestion detection modules 632 and 642 in FIG. 6 can be constructed by a congestion detection circuit 1200 shown in FIG. 12. The congestion detection circuit 1200 has inverters 1210 and 1211 and symmetric 2-input C elements 1220 and 1230. The congestion detection circuit 1200 outputs the transfer data and the data request signal Ri output from the asynchronous arbitration module to the merge destination of the asynchronous arbitration module. The congestion detection circuit 1200 branches the data request signal Ri output from the asynchronous arbitration module and outputs the branched signals as congestion process request signals BReq0 and BReq1 to the merge source No. 0 and the merge source No. 1 of the asynchronous arbitration module. The inverters 1210 and 1211 invert the arbitration result signals Gr0 and Gr1 output from the asynchronous arbitration module and output the resultant signals as congestion information BP0 and BP1.

The symmetric 2-input C elements 1220 and 1230 are used to wait for the data acknowledge signal Ao from the merge destination and congestion process acknowledge signals BAck0 and BAck1 from the merge source. The configuration of the symmetric 2-input C elements 1220 and 1230 and the truth table are the same as those illustrated in FIG. 11. When the congestion process acknowledge signal BAck0=1 is received from the merge source No. 0 and the congestion process acknowledge signal BAck1=1 is received from the merge source No. 1, the symmetric 2-input C element 1220 outputs 1. When the symmetric 2-input C element 1220 outputs 1 and the data acknowledge signal Ao=1 is received from the merge destination, the symmetric 2-input C element 1230 outputs the data acknowledge signal Ai=1 to the asynchronous arbitration module.

In the circuit configuration of the congestion detection circuit 1200, a part outputting the data request signal received from the asynchronous arbitration module to the merge destination of the asynchronous arbitration module and a part branching the data request signal to the congestion process request signals, inverting the arbitration result signals by the inverters 1210 and 1211, and outputting the inverted signals as the congestion information signals correspond to a request output module. When the asynchronous arbitration module outputs the data request signal, the parts output the data request signal to the merge destination and output the congestion information and the congestion process request signal to the congestion avoiding path calculation module existing in the merge source. After outputting the data request signal and the congestion information storage request signal, the symmetric 2-input C elements 1220 and 1230 wait both the data acknowledge signal from the merge destination and the congestion process acknowledge signal from the congestion avoiding path calculation module. When the data acknowledge signal and the congestion information storage acknowledge signal are received, the symmetric 2-input C elements 1220 and 1230 output the data acknowledge signal to the asynchronous arbitration module. That is, the symmetric 2-input C elements 1220 and 1230 correspond to the acknowledge waiting modules.

In the initial state, the signals supplied to the congestion detection circuit 1200 are the data request signal Ri=0, the data acknowledge signal Ao0=0, and the congestion process acknowledge signals BAck0=0 and BAck1=0. The signals output from the congestion detection circuit 1200 are the data request signal Ro0=0, the data acknowledge signal Ai=0, and the congestion process request signals BReq0=0 and BReq1=0. The state of the arbitration result signals Gr1 and Gr2 and the congestion information signal BP0 are arbitrary. When the data request signal Ri=0, the congestion detection circuit 1200 waits until the data request signal Ri=1 is received from the asynchronous arbitration module (step B1 in FIG. 3).

When the data request signal Ri becomes 1, the congestion detection circuit 1200 generates congestion information signals BP0 and BP1 in step B2. By receiving the arbitration result signals Gr0 and Gr1 from the asynchronous arbitration module, the congestion detection circuit 1200 determines the merge source from which the transfer data is output by the asynchronous arbitration module. When the asynchronous arbitration module outputs the transfer data from the merge source No. 0, the data of the merge source No. 0 is not retained but is transferred, so that the congestion information of the merge source No. 0 indicates the absence of congestion. The data of the merge source No. 1 is retained, so that the congestion information of the merge source No. 1 indicates the presence of congestion. On the contrary, when the asynchronous arbitration module outputs the transfer data from the merge source No. 1, the merge source No. 0 indicates the presence of congestion, and the merge source No. 1 indicates the absence of congestion.

When the arbitration result signals (Gr0, Gr1)=(1,0), that is, when the asynchronous arbitration module outputs the transfer data received from the merge source No. 0, the congestion detection circuit 1200 sets the signal BP0=1 (absence of congestion) obtained by inverting Gr0 by the inverter 1210 as the congestion information signal corresponding to the merge source No. 0, and sets the signal BP1=0 (presence of congestion) obtained by inverting Gr1 by the inverter 1211 as the congestion information signal corresponding to the merge source No. 1. When the asynchronous arbitration module outputs the transfer data received from the merge source No. 1, that is, when the arbitration result signals (Gr0, Gr1)=(0, 1), the congestion detection circuit 1200 sets the signal BP0=0 (presence of congestion) obtained by inverting Gr0 by the inverter 1210 as the congestion information signal corresponding to the merge source No. 0, and sets the signal BP1=1 (absence of congestion) obtained by inverting Gr1 by the inverter 1211 as the congestion information signal corresponding to the merge source No. 1.

The congestion detection circuit 1200 outputs the congestion information signals BP0 and BP1 to the merge sources Nos. 0 and 1, respectively. The congestion detection circuit 1200 branches the data request signal Ri=1 and outputs the congestion process request signals BReq0=1 and BReq1=1 to the merge sources Nos. 0 and 1, respectively (step B3). In parallel with outputting of the congestion information signal and the congestion process request signal, the congestion detection circuit 1200 outputs the transfer data and the data request signal Ro=1 to the merge destination of the asynchronous arbitration module (step B4).

After outputting the data request signal Ri=1 and the congestion process request signals BReq0=1 and BReq1=1, the congestion detection circuit 1200 waits until the data acknowledge signal Ao=1 and the congestion process acknowledge signals BAck0=1 and BAck1=1 are received (step B5). The congestion detection circuit 1200 uses the symmetric 2-input C elements 1220 and 1230. When the data acknowledge signal Ao=1 is received from the merge destination of the asynchronous arbitration module and the congestion process acknowledge signals BAck0=1 and BAck1=1 are received from the merge sources Nos. 0 and 1, the data acknowledge signal Ai=1 is output from the symmetric 2-input C element 1230 (step B6).

When the congestion detection circuit 1200 outputs the data acknowledge signal Ai=1 to the asynchronous arbitration module, the data request signal Ri received from the asynchronous arbitration module is withdrawn and becomes 0. When the data request signal Ri becomes 0, the congestion detection circuit 1200 withdraws the congestion process request signals which are output to the merge sources Nos. 0 and 1, and sets BReq0=0 and BReq1=0. Using the symmetric 2-input C elements 1220 and 1230, the congestion detection circuit 1200 waits for the data acknowledge signal Ao=0 from the merge destination of the asynchronous arbitration module and the congestion process acknowledge signals BAck0=1 and BAck1=0 from the merge sources Nos. 0 and 1. And outputs the data acknowledge signal Ai to the asynchronous arbitration module. After that, the congestion detection circuit 1200 returns to the initial state.

Figure 13:
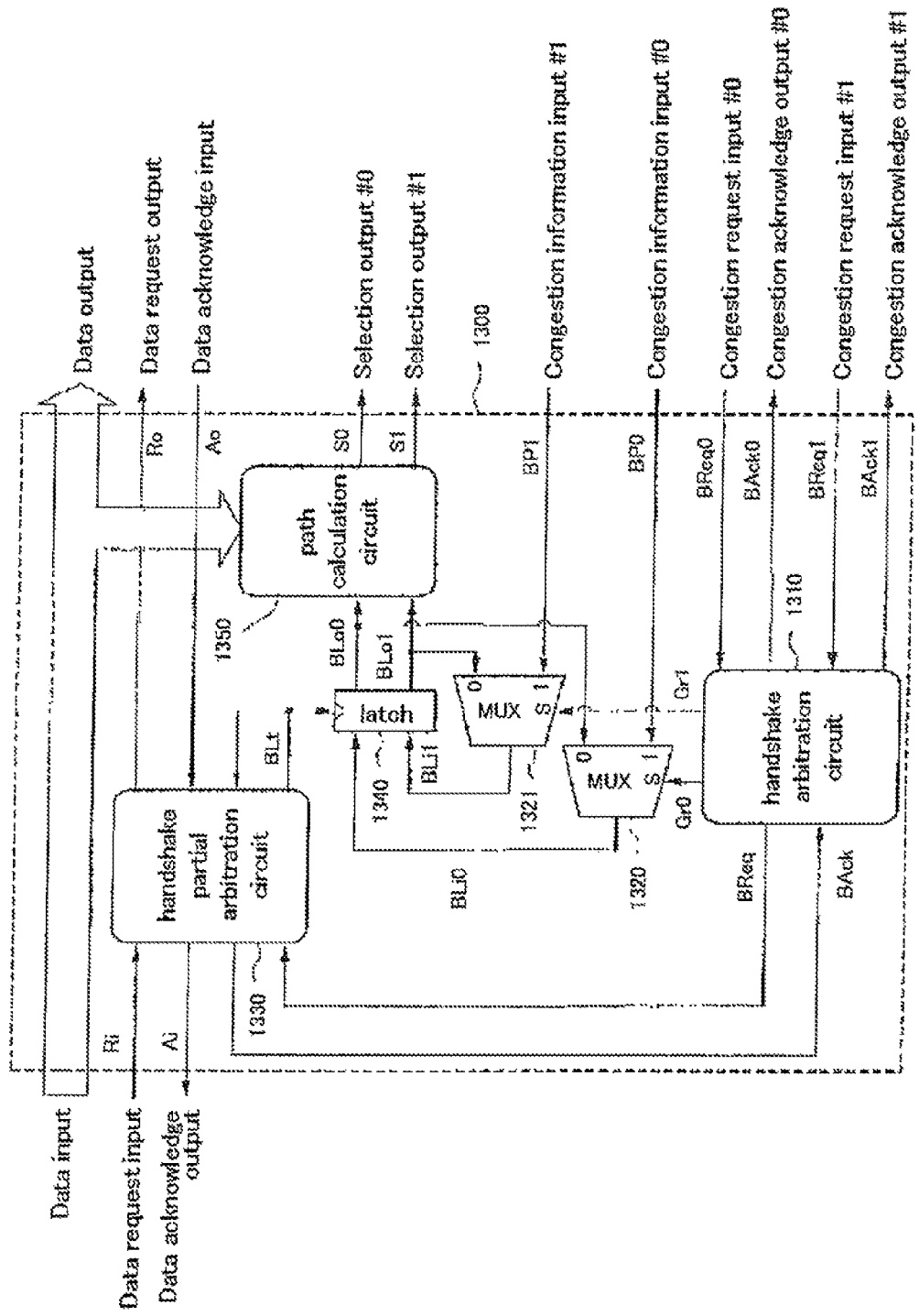
FIG. 13 is a block diagram illustrating an example of the circuit configuration of the congestion avoiding path calculation module.

FIG. 13 illustrates an example of the circuit configuration of the congestion avoiding path calculation module. The congestion avoiding path calculation module 631 in FIG. 6 can be constructed by a congestion avoiding path calculation module 1300 illustrated in FIG. 13. The congestion avoiding path calculation module 1300 has a handshake arbitration circuit 1310, multiplexers 1320 and 1321, a handshake partial arbitration circuit 1330, a congestion information storage latch 1340, and a path calculation circuit 1350.

The handshake arbitration circuit 1310 is a circuit achieving arbitration between the congestion information signal and the congestion process request signal from two branch destinations. The handshake arbitration circuit 1310 corresponds to an inter-branch destination congestion information storage/request/arbitration module. The handshake arbitration circuit 1310 merges the congestion process request signals received from the branch destinations of the asynchronous branching modulation and performs arbitration, thereby selecting one of the congestion process request signals from the two branch destinations. The handshake arbitration circuit 131 mediates a handshake caused by the selected congestion information storage/request signal between the handshake partial arbitration circuit 1330 and the congestion detection module.

The handshake arbitration circuit 1310 can be constructed by a partial circuit obtained by eliminating the multiplexer 940 from the configuration of the asynchronous arbitration circuit 900 shown in FIG. 9. That is, the handshake arbitration circuit 1310 includes circuits corresponding to the mutually-exclusive circuit 910, the handshake recognizing circuits 920 and 921, the symmetric 2-input C elements 950 and 951, and the OR element 930.

The operation of the handshake arbitration circuit 1310 is the same as that in the partial circuit obtained by eliminating the multiplexer 940 from the asynchronous arbitration circuit 900 except for the point that input/output signals are changed from the data acknowledge signals to a congestion process request signal and a congestion process acknowledge signal. To the handshake arbitration circuit 1310, the congestion process request signals from two branch destinations and the congestion process acknowledge signal BAck from the handshake partial arbitration circuit 1330 are supplied. The handshake arbitration circuit 1310 outputs the congestion process request signal BReq, the congestion process acknowledge signals BAck0 and BAck1, and the arbitration result signals Gr0 and Gr1.

To the mutually-exclusive circuit (corresponding to the mutually-exclusive circuit 910 in FIG. 9) of the handshake arbitration circuit 1310, congestion information storage request signals (BReq0 and BReq1) from a plurality of branch destinations are supplied. The mutually-exclusive circuit makes one of the congestion information storage request signals pass and makes the other one wait until the passed congestion information storage request signal is withdrawn. The circuit configuration of the mutually-exclusive circuit is similar to the configuration shown in FIG. 10. The mutually-exclusive circuit includes two AND elements each having two input terminals to one of which the congestion information storage request signal is supplied and the other of which is connected to the output terminal of the other AND element, and inverters connected to the outputs of the two AND elements.

The handshake recognizing circuits (corresponding to the handshake recognizing circuits 920 and 921 in FIG. 9) of the handshake arbitration circuit 1310 makes the congestion process request signal which passed through the mutually-exclusive circuit pass when there is no handshake being mediated by the handshake arbitration circuit 1310. On the other hand, when there is a handshake being mediated, the handshake recognizing circuit makes the congestion process request signal passed through the mutually-exclusive circuit wait until completion of the handshake being mediated. The handshake recognizing circuit is disposed in correspondence with each of the branch destinations. Each of the handshake recognizing circuits includes an AND element having two input terminals one of which is connected to the congestion process request signal passed through the mutually-exclusive circuit and the other of which is connected to the congestion process acknowledge signals (BAck0, BAck1) from a branch destination different from a branch destination to which the circuit itself corresponds via an inverter.

When the congestion process request signal from the branch destination No. 0 is passed, the handshake recognizing circuit outputs the arbitration result signals (Gr0, Gr1)= (1,0). On the other hand, when the congestion process request signal from the branch destination No. 1 is passed, the handshake recognizing circuit outputs the arbitration result signals (Gr0, Gr1)=(0,1). The output of the handshake recognizing circuit is connected to an OR element (corresponding to the OR element 930 in FIG. 9), and the OR element outputs the congestion process request signal (BReq) passed through the handshake recognizing circuit to the handshake partial arbitration circuit 1330.

One of the input terminals of each of the symmetric 2-input C elements (corresponding to the symmetric 2-input C elements 950 and 951) of the handshake arbitration circuit 1310 is connected to the output (Gr0 or Gr1) of the AND element of the handshake recognizing circuit. The other input terminal is connected to the data acknowledge signal (BAck) which is supplied to the handshake arbitration circuit 1300. The symmetric 2-input C element waits for both the congestion process request signal passed through the handshake recognizing circuit and the congestion process acknowledge signal (BAck) responding to the congestion process request signal. The symmetric 2-input C element outputs the congestion process acknowledge signals (BAck0, BAck1) to the branch destination to which the congestion process request signal passed through the handshake recognizing circuit is supplied. That is, the symmetric 2-input C element corresponds to a waiting module.

Figure 14:
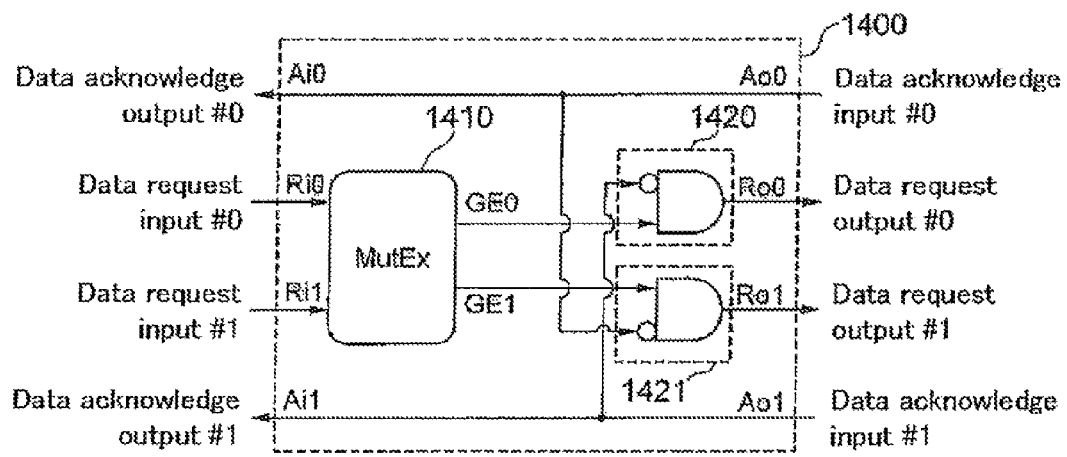
FIG. 14 is a block diagram illustrating a handshake partial arbitration circuit.
Figure 15:
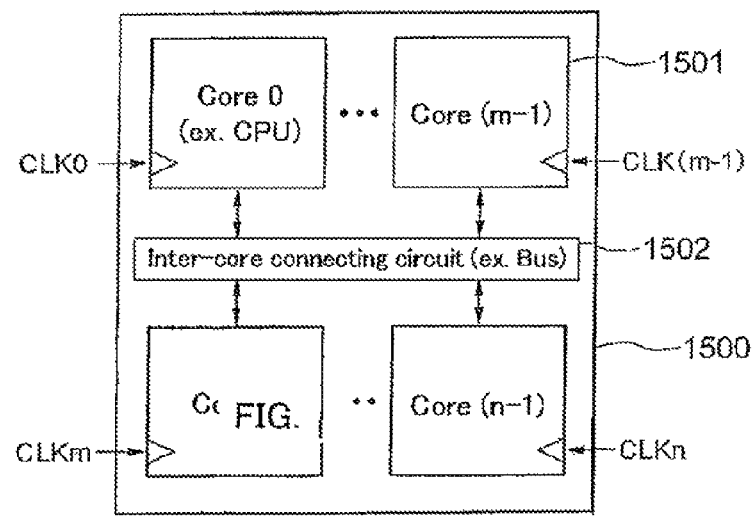
FIG. 15 is a block diagram illustrating a semiconductor circuit including a number of cores.

FIG. 14 illustrates an example of the circuit configuration of the handshake partial arbitration circuit. The handshake partial arbitration circuit 1330 in FIG. 13 can be constructed by a handshake partial arbitration circuit 1400 shown in FIG. 14. The handshake partial arbitration circuit 1400 has a mutually-exclusive circuit 1410 and handshake recognizing circuits 1420 and 1421. The handshake partial arbitration circuit 1400 is equivalent to a partial circuit obtained by eliminating the multiplexer 940, the OR element 930, and the symmetric 2-input C elements 950 and 951 from the asymmetric arbitration circuit 900 shown in FIG. 9. To the handshake partial arbitration circuit 1400, the request signals Ri0 and Ri1 and the acknowledge signals Ao0 and Ao1 are supplied. The handshake partial arbitration circuit 1400 outputs the request signals Ro0 and Ro1 and the acknowledge signals Ai0 and Ai1.

The request signals Ri0 and Ro0 in FIG. 14 correspond to the data acknowledge signals Ai and Ao in FIG. 13, respectively. The request signals Ri1 and Ro1 correspond to the congestion process request signal BReq and the storage control signal BLt, respectively, and the acknowledge signals Ai1 and Ao1 respond to the congestion process acknowledge signal BAck and the storage control signal BLt in FIG. 13, respectively. In FIG. 13, the request signal output (Ro1) and the acknowledge signal input (Ao1) in FIG. 14 are short-circuited, and the request signal Ro1 is used as it is as the storage control signal BLt of the congestion information storage latch 1340 and as the acknowledge signal Ao1. Instead, a storage control circuit (LC) may be provided between the handshake partially arbitration circuit 1330 and the congestion information storage latch 1340. The storage control circuit (LC) receives the request signal Ro1 in FIG. 14, outputs the storage control signal BLt to the congestion information storage latch 1340 and, after that, outputs the acknowledge signal Ao1 to the handshake partial arbitration circuit 1330.

The handshake arbitration circuit 1310 in FIG. 13 arbitrates handshakes at the time of merging congestion process request signals from two branch destinations to one signal. On the other hand, the handshake partial arbitration circuit 1330 (the handshake partial arbitration circuit 1400 in FIG. 14) arbitrates handshakes in a state where the data request signal and the congestion process request signal are in parallel without merging the data request signal and the congestion process request signal. The handshake partial arbitration circuit 1400 corresponds to a data congestion information arbitration module and performs arbitration between a data request signal to an asynchronous branching module supplied together with transfer data and a congestion process request signal. According to the result of the arbitration, one of the signals is passed to mediate handshaking, and the other signal is held until completion of the process according to the passed signal.

The handshake partial arbitration circuit 1400 performs operation of when there is either the data request signal or the congestion process request signal, retaining the other request and, after completion of handshaking on the one of the requests, outputting the retained request. When the data request signal is received before the process of storing congestion information which is performed on receipt of the congestion process request signal is completed, the handshake partial arbitration circuit 1400 holds output of the data request signal to the asynchronous branching module until storage of the congestion information is completed. After completion of storage of the congestion information, that is, after completion of handshaking between the congestion process request signal and the congestion process acknowledge signal, the handshake partial arbitration circuit 1400 outputs the held data request signal. When the congestion process request signal is received during the asynchronous branching module transfers transfer data in response to the data request signal, the handshake partial arbitration circuit 1400 holds the congestion process request signal until handshaking on the transfer data is completed.

The mutually-exclusive circuit 1410 receives the data request signal (Ri0) and the congestion process request signal (Ri1), makes one of the input signals pass, and makes the other signal wait until the passed signal is withdrawn. The mutually-exclusive circuit 1410 can be constructed by the mutually-exclusive circuit 1000 illustrated in FIG. 10. When both the congestion process request signal and the data request signals are received, the mutually-exclusive circuit 1410 makes a signal which arrives first pass and makes the other signal which arrives late wait until the signal which arrived first is withdrawn. The mutually-exclusive circuit 1410 outputs the internal signals (GE0, GE1)=(1, 0) when the data request signal Ri0=1 arrives first, and outputs the internal signals (GE0, GE1)=(0, 1) when the congestion process request signal arrives first.

The handshake recognizing circuit 1420 includes an AND element having two input terminals one of which is connected to the data request signal (GE0) passed through the mutually-exclusive circuit 1410 and the other of which is connected to the congestion process acknowledge signal (Ao1) via an inverter. The handshake recognizing circuit 1421 includes an AND element having two input terminals one of which is connected to the congestion process request signal (GE1) passed through the mutually-exclusive circuit 1410 and the other of which is connected to the data acknowledge signal (Ao0) via an inverter. When there is no handshaking being mediated by the handshake partial arbitration circuit 1400, the handshake recognizing circuits 1420 and 1421 make the congestion process request signal or the data request signal passed through the mutually-exclusive circuit pass. When there is handshaking being mediated, the handshake recognizing circuits 1420 and 1421 make the congestion process request signal or the data request signal passed through the mutually-exclusive circuit 1410 wait until completion of the handshaking being mediated.

Referring again to FIG. 13, the congestion information storage latch 1340 is a congestion information storage memory storing congestion information on a branch destination of the asynchronous branching module. The congestion information storage latch 1340 stores information indicative of the presence or absence of congestion on each of two branch destinations. When the handshake partial arbitration circuit 1330 makes the congestion process request signal pass, that is, when the storage control signal BLt output from the handshake partial arbitration circuit 1330 becomes 1, the congestion information storage latch 1340 updates congestion information stored.

A memory storage control module is made by the multiplexers 1320 and 1321. When the handshake partial arbitration circuit 1330 makes the congestion process request signal pass, the memory storage control module stores the congestion information received from the branch destination into the congestion information storage latch 1340. The memory storage control module updates the congestion information corresponding to a branch destination to which the congestion process request signal passed through the handshake arbitration circuit 1310 is output, in the congestion information storage latch 1340 with the congestion information (BP0, BP1) supplied from the branch destination. The memory storage control module operates so as to hold the congestion information corresponding to the other branch destination as the congestion information (BLo0, BLo1) stored in the congestion information recording latch 1340.

The multiplexer 1320 corresponds to the branch destination No. 0. The multiplexer 1320 selectively outputs either the congestion information signal BP0 from the congestion detection module of the branch destination No. 0 or the congestion information signal (BLo0) of the branch destination No. 0 stored in the congestion information storage latch 1340. The multiplexer 1321 corresponds to the branch destination No. 1. The multiplexer 1321 selectively outputs either the congestion information signal BP1 from the congestion detection module of the branch destination No. 1 or the congestion information signal BLo1 of the branch destination No. 1 stored in the congestion information storage latch 1340.

The multiplexers 1320 and 1321 determine which one of the two inputs is output on the basis of the arbitration result signals Gr0 and Gr1 output from the handshake arbitration circuit 1310. When Gr0=1, that is, when the handshake arbitration circuit 1310 outputs the congestion process request signal from the branch destination No. 0 to the handshake partial arbitration circuit 1330, the multiplexer 1320 outputs the congestion information signal from the branch destination No. 0 to the congestion information storage latch 1340. When Gr0=0, the multiplexer 1320 outputs the congestion information signal of the branch destination No. 0 stored in the congestion information storage latch 1340 to the congestion information storage latch 1340. When Gr1=1, that is, when the handshake arbitration circuit 1310 outputs the congestion process request signal from the branch destination No. 1 to the handshake partial arbitration circuit 1330, the multiplexer 1321 outputs the congestion information signal from the branch destination No. 1 to the congestion information storage latch 1340. When Gr1=0, the multiplexer 1321 outputs the congestion information signal of the branch destination No. 1 stored in the congestion information storage latch 1340 to the congestion information storage latch 1340.

The path calculation circuit 1350 determines as an output destination of transfer data a branch destination leading to a core of a transfer destination of the transfer data among the branch destinations of the asynchronous branching module. When there are a plurality of branch destinations leading to the core of the transfer destination, the path calculation circuit 1350 preferentially selects a branch destination where no congestion occurs as the transfer data output destination with reference to the congestion information stored in the congestion information storage latch 1340. For example, the path calculation circuit 1350 outputs the selection signals S0=1 and S1=0 when the branch destination No. 0 is determined as an output destination of transfer data, and outputs the selection signals S0=0 and S1=1 when the branch destination No. 1 is determined as an output destination of the transfer data. According to the selection signals, the asynchronous branching module outputs the transfer data and the data request signal to any of the branch destinations.

In the initial state, the signals supplied to the congestion avoiding path calculation circuit 1300 are the data request signal Ri=0, the data acknowledge signal Ao=0, and the congestion process request signals BReq0=0 and BReq1=0. The signals output from the congestion avoiding path calculation circuit 1300 are the data request signal Ro=0, the data acknowledge signal Ai=0, and the congestion process acknowledge signals BAck0=0 and BAck1=0. The storage control signal supplied to the congestion information storage latch 1340 is BLt=0. It is assumed that the congestion information storage latch 1340 stores information indicative of the absence of congestion on the branch destination Nos. 0 and 1 of the asynchronous branching module to which the congestion avoiding path calculation circuit 1300 is connected (BLo0=0, BLo1=0). The other signals are arbitrary. In the initial state, while waiting that the data request signal Ri becomes 1, the congestion avoiding path circuit 1300 waits at least one oldie congestion process request signals from the branch destinations becomes 1 (steps C1 and C2 in FIG. 4).

It is assumed that, when the data request signal Ri is 0, the congestion process request signal BReq0 from the branch destination No. 0 becomes 1 or the congestion process request signal BReq1 from the branch destination No. 1 becomes 1. In this case, the congestion avoiding path calculation module 1300 advances from step C2 to step C3. In step C3, the handshake arbitration circuit 1310 arbitrates the congestion process request signals and selects one of the congestion process request signals BReq0=1 and BReq1=1. When the congestion process request signals are supplied from both of the branch destinations, that is, when the information BReq0=1 and BReq1=1, the handshake arbitration circuit 1310 selects the branch destination at which BReq=1 arrives first from the two branch destinations.

According to a result of the arbitration of the congestion process request signals, the handshake arbitration circuit 1310 outputs the arbitration result signals (Gr0, Gr1)=(1, 0) or (0, 1). When the arbitration result signals (Gr0, Gr1)=(1, 0), the multiplexer 1320 selects the congestion information signal BP0 from the branch destination No. 0, and the multiplexer 1321 selects the congestion information BLo1 stored in the congestion information storage latch 1340. At this time, the input signals to the congestion information storage latch 1340 are (BLi0, BLi1)=(BP0, BLo1). When the arbitration result signals (GR0, Gr1)=(0, 1), the multiplexer 1320 selects the congestion information signal BLo0 stored in the congestion information storage latch 1340, and the multiplexer 1321 selects the congestion information signal BP1 from the branch destination No. 1. At this time, the input signals to the congestion information storage latch 1340 are (BLi0, BLi1) =(BLo0, BP1).

When the congestion process request signal BReq0 or Breq1 becomes 1, the handshake arbitration circuit 1310 outputs the congestion process request signal BReq=1 to the handshake partial arbitration circuit 1330. Since the data request signal has not arrived yet (Ri=0), the handshake partial arbitration circuit 1330 makes the congestion process request signal pass and outputs the storage control signal BLt=1 to the congestion information storage latch 1340. When the storage control signal BLt becomes 1, the congestion information storage latch 1340 stores the congestion information signals output from the multiplexers 1320 and 1321 (step C4).

In the case where the congestion process request signal from the branch destination No. 0 is selected by the handshake arbitration circuit 1310, that is, in the case where the arbitration result signals (Gr0, Gr1)=(1, 0), the value of the congestion information signal BP0 from the branch destination No. 0 is stored as congestion information corresponding to the branch destination No. 0, and the value of the congestion information BLo1 stored in the congestion information storage latch is stored as the congestion information corresponding to the branch destination No. 1. That is, the congestion information storage latch 1340 updates the congestion information corresponding to the branch destination No. 1 to the value of the congestion information signal BP0 from the branch destination No. 0, and does not update the congestion information corresponding to the branch destination No. 0.

In the case where the congestion process request signal from the branch destination No. 1 is selected by the handshake arbitration circuit 1310, that is, in the case where the arbitration result signals (Gr0, Gr1)=(0, 1), the congestion information recording latch 1340 stores the value of the congestion information signal BP1 from the branch destination No. 1 as the congestion information corresponding to the branch destination No. 1, and stores the value of the congestion information BLo0 stored in the congestion information storage latch 1340 as congestion information corresponding to the branch destination No. 0. That is, the congestion information storage latch 1340 updates the congestion information corresponding to the branch destination No. 1 to the value of the congestion information signal BP1 from the branch destination No. 1 without updating the congestion information corresponding to the branch destination No. 0.

The handshake partial arbitration circuit 1330 receives the storage control signal BLt as the acknowledge signal Ao1 (FIG. 14) and, when the storage control signal BLt becomes 1, outputs the congestion process acknowledge signal BAck=1 to the handshake arbitration circuit 1310. The handshake arbitration circuit 1310 outputs the congestion process acknowledge signal to the branch destination selected in step C3 (step C5). When the congestion process request signal BReq0 from the branch destination No. 0 is selected in step C3, the handshake arbitration circuit 1310 outputs the congestion process acknowledge signal BAck01 to the branch destination No. 0. When the congestion process request signal BReq1=1 from the branch destination No. 1 is selected in step C3, the handshake arbitration circuit 1310 outputs the congestion process acknowledge signal BAck1=1 to the branch destination No. 1.

When the congestion avoiding path calculation circuit 1300 outputs the congestion process acknowledge signal BAck0=1 or BAck1=1 in step C5, the congestion detection module which receives the congestion process acknowledge signal waits for the congestion process request signal and the data acknowledge signal and withdraws the congestion process request signal. When the congestion process request signal is withdrawn and the congestion process request signal supplied to the congestion avoiding path calculation circuit 1300 becomes BReq=0 or BReq=0, the handshake arbitration circuit 1310 outputs the arbitration result signals (Gr0, Gr1) =(0, 0). Simultaneously, the handshake arbitration circuit 1310 withdraws the request signal to the congestion information storage latch 1340 and outputs BReq=0.

When the congestion process request signal BReq becomes 0, the handshake partial arbitration circuit 1330 withdraws the storage control signal which is output to the congestion information storage latch 1340 (BLt=0). Simultaneously with drawal of the storage control signal, the handshake partial arbitration circuit 1330 withdraws the congestion process acknowledge signal which is output to the handshake arbitration circuit 1310 and sets BAck to 0. When the handshake partial arbitration circuit 1330 withdraws the congestion process acknowledge signal (BAck=0), the handshake arbitration circuit 1310 withdraws the congestion process acknowledge signal which is output to the branch destination No. 0 or 1 (BAck0=0 or BAck1=0). As a result, the congestion avoiding path calculation circuit 1300 returns to the initial state.

When the data request signal Ri=1 is supplied to the handshake partial arbitration circuit 1330, the congestion avoiding path calculation circuit 1300 advances from step C2 to step C6. The congestion avoiding path calculation circuit 1300 determines the transfer destination of the transfer data in step C6 and performs a process of outputting the transfer data and the data request signal Ro=1 to the asynchronous branching module. However, there is a case that, even when the data request signal Ri becomes 1, prior to it, the congestion process request signal BReq=1 is supplied to the handshake partial arbitration circuit 1330. In this case, the congestion avoiding path calculation circuit 1300 holds output of the data request signal Ro=1 until the handshake partial arbitration circuit 1330 withdraws the congestion process acknowledge signal.

The path calculation circuit 1350 determines, as a transfer branch destination, any of the branch destinations of the asynchronous branching module on the basis of the congestion information stored in the congestion information storage latch 1340 and the destination information of the transfer data supplied to the data input terminal. First, in step C6, the path calculation circuit 1350 lists, as selectable branch destinations, branch destinations existing on paths to the destination. The path calculation circuit 1350 stores, for example, information indicating of a core reached by each branch destination and lists, as selectable branch destinations, branch destinations leading to a core as the destination. Subsequently, the path calculation circuit 1350 determines whether the number of the selectable branch destinations is one or not in step C7. When the number of the selectable branch destinations is one, the path calculation circuit 1350 advances to step C8 and determines as the selectable branch destination as a transfer branch destination.

When there are a plurality of selectable branch destinations, that is, when both of the two branch destinations of the asynchronous branch destination module are selectable branch destinations, the path calculation circuit 1350 refers to the congestion information recording latch 1340 and preferentially selects the branch destination having no congestion as the transfer branch destination. The path calculation circuit 1350 checks the presence/absence of congestion of the selectable branch destinations and, in step S9, determines whether or not one of the selectable branch destinations is congested and the other has no congestion. When one of the selectable branch destinations indicates no congestion, the path calculation circuit 1350 advances to step C10 and determines the branch destination having no congestion as the transfer branch destination. When both of the selectable branch destinations indicate the absence of congestion or the presence of congestion, the path calculation circuit 1350 advances from step C9 to step C11 and determines an arbitrary branch destination in the selectable branch destinations as the transfer branch destination.

When the transfer branch destination determined in step C8, C10, or C11 is the branch destination No. 0 of the asynchronous branching module, the path calculation circuit 1350 advances from step C12 to step C13. In step C13, the path calculation circuit 1350 outputs the selection signals (S0, S1)=(1, 0) to the asynchronous branching module. At this time, the congestion avoiding path calculation circuit 1300 outputs, together with the selection signal, transfer data supplied to the data input terminal and the data transfer request Ro=1 passed through the handshake partial arbitration circuit 1330 to the asynchronous branching module.

When the transfer branch destination is the branch destination No. 1 of the asynchronous branching module, the path calculation circuit 1350 advances from step C12 to step C14 and outputs the selection signals (S0, S1)=(0, 1) to the asynchronous branching module. At this time, the congestion avoiding path calculation circuit 1300 outputs, together with the selection signal, transfer data supplied to the data input terminal and the data transfer request Ro=1 passed through the handshake partial arbitration circuit 1330 to the asynchronous branching module.

The congestion avoiding path calculation circuit 1300 waits until the data acknowledge signal Ao=1 to the data request signal Ro=1 is received from the asynchronous branching module in step C15. When the data acknowledge signal Ao=1 is received, the handshake partial arbitration circuit 1330 outputs the data acknowledge signal Ai=1 in step C16. When the data request signal is withdrawn (Ri=0) in response to the output data acknowledge signal Ai=1, the handshake partial arbitration circuit 1330 withdraws the data request signal which is output (Ro=0). After that, when the data acknowledge signal received is withdrawn (Ao=0) in response to the withdrawal of the data request signal (Ro=0), the handshake partial arbitration circuit 1330 withdraws the data acknowledge signal which is output (Ai=0). As a result, the congestion avoiding path calculation circuit 1300 returns to the initial state.

Referring again to FIG. 6, a case where the asynchronous inter-core connection circuit 600 transfers a data stream including data 681 to 683 from the master B 603 to the slave B 604 will be examined. It is assumed that the data stream includes data preceding to the data 681 and data subsequent to the data 683 and that, in the asynchronous inter-core connection circuit 600, the asynchronous arbitration circuit 612 is occupied and data is transferred from the master B 603 to the slave B 604.

The congestion detection circuit 632 connected to the asynchronous arbitration circuit 612 outputs the congestion process request signal and the congestion information signal indicative of the absence of congestion to the master B 603 which is transferring data. The congestion detection circuit 632 outputs the congestion process request signal and the congestion information signal indicating the presence of congestion to the congestion avoiding path calculation circuit 631 connected to the asynchronous branching circuit 611 which is to wait for data transfer. The congestion avoiding path calculation circuit 631 receives the congestion information signal indicating the presence of congestion from the congestion detection circuit 632 connected to the asynchronous arbitration circuit 612 as one of the branch destinations of the corresponding asynchronous branching circuit 611. At this time, the congestion avoiding path calculation circuit 631 stores the congestion information indicative of the presence of congestion on the branch destination toward the asynchronous arbitration circuit 612.

It is assumed that the asynchronous arbitration circuit 622 as the other one of the branch destinations of the asynchronous branching circuit 611 does not transfer data. At this time, the congestion detection circuit 642 connected to the asynchronous arbitration circuit 622 does not output the congestion process request signal to the congestion avoiding path calculation circuit 631. The congestion avoiding path calculation circuit 631 stores the congestion information indicative of the absence of congestion on the branch destination toward the asynchronous arbitration circuit 642. The congestion avoiding path calculation circuit 631 continues storing the congestion information indicative of the absence of congestion on the branch destination toward the asynchronous arbitration circuit 642 until the congestion process request signal and the congestion information indicative of the presence of congestion are received from the congestion detection circuit 642.

It is assumed that a data stream (data 691 to 694) whose destination is the slave A 602 reaches the congestion avoiding path calculation circuit 631 from the master A 601. In a state where no process is performed on the congestion information, the congestion avoiding path calculation circuit 631 determines the transfer branch destination of the transfer data. In FIG. 6, even when the asynchronous branching circuit 611 outputs the transfer data to any of the two branch destinations of the asynchronous branching circuit 611, that is, the asynchronous arbitration circuits 612 and 622, the transfer data can reach the slave A 602 as the destination of the transfer data.

The congestion avoiding path calculation circuit 631 examines the congestion information of the branch destination toward the asynchronous arbitration circuit 612 and the congestion information of the branch destination toward the asynchronous arbitration circuit 622. Since the congestion information of the branch destination toward the asynchronous arbitration circuit 612 indicates the presence of congestion and the congestion information of the branch destination toward the asynchronous arbitration circuit 622 indicates the absence of congestion, the congestion avoiding path calculation circuit 631 determines the branch destination toward the asynchronous arbitration circuit 622 as the transfer branch destination. The congestion avoiding path calculation circuit 631 outputs a selection signal indicating that the branch destination toward the asynchronous arbitration circuit 622 is selected to the asynchronous branching circuit 611. The asynchronous branching circuit 611 sequentially outputs the data 691 to 694 toward the asynchronous branching circuit 622 in accordance with the selection signal. The asynchronous inter-core connection circuit 600 produces the effect of detecting congestion and capable of setting a path avoiding the congestion.

When it is assumed that during the transfer of the data 691 to 694, transfer of the data 681 to 683 and the data preceding and subsequent to the data 681 to 683 continues, the congestion avoiding path calculation circuit 631 intermittently receives the congestion information signal and the congestion process request signal from the congestion detection circuit 632. The congestion avoiding path calculation circuit 631 has the configuration including the handshake partial arbitration circuit 1330 (FIG. 13). The handshake partial arbitration circuit 1330 retains and holds the congestion process request signal until completion of the handshake of the transfer data, so that the congestion circuit path calculation circuit 631 does not update the congestion information storage latch 1340 at the time of transfer of each of the data 691 to 694. Therefore, the asynchronous inter-core connection circuit 600 has the effect of preventing a timing violation caused by a data change due to improper latch input at a timing of storing the data 691 to 694 by a pipeline latch connected directly to the asynchronous branching circuit 631.

Inputs and outputs of the asynchronous inter-core connection circuit 600 can be connected to an arbitrary logic circuit mounted on the same semiconductor circuit or a different semiconductor circuit. The asynchronous inter-core connection circuit 600 has an effect that at the time of connection, the presence or absence of clock synchronization of a logic circuit to be connected or, in the case where there is clock synchronization, consideration of the clock frequency and the phase is unnecessary.

Subsequently, a second embodiment of the present invention will be described. In the data transfer method used in the first embodiment and the first example, each piece of transfer data includes destination information. In the following, such a data transfer method will be called a first data transfer method. In the first data transfer method, since each piece of transfer data includes destination information, the efficiency of use of the bandwidth of a data transfer path is low. On the other hand, there is a method of dividing data generated by adding destination information to data to the same destination on a transmission side, making the destination information included in the head of a series of unit data streams obtained by the division, and transferring all of the divided data in the unit data stream in the same path. For higher use efficiency of the bandwidth, this method is preferable. In the following, such a data transfer method will be called a second data transfer method.

Also from the viewpoint of simplicity of processors of transmission/reception, the second data transfer method is preferable. That is, considering the case of transferring large amount of data to the same destination, in the first data transfer method, transfer data is divided in accordance with the bandwidth of the data transfer path, destination information is added to all of the divided data, and the resultant data is transferred. Since there is the possibility that the divided data is transferred by different paths in the first data transfer method, order information is added to each of the divided data pieces by a transmission processor, arrived divided data is temporarily stored in a reception processor and, after that, a mechanism of rearranging the divided data in accordance with the order information is necessary. On the other hand, in the second data transfer method, all of the divided data is transferred simply in a data stream in the same path. Consequently, it is unnecessary to include the order information in the divided data and rearrange the data on the reception side. As described above, also from the viewpoint of simplicity of the processors of transmission/reception, the second data transfer method is preferable.

However, although the asynchronous inter-core connection circuit (FIG. 6) of the first example functions correct to data transferred in the first data transfer method, the circuit cannot realize the second data transfer method. One of the reasons is the possibility that the asynchronous arbitration circuit 900 in FIG. 9 changes an arbitration result each time divided data in a data stream is transferred. Another reason that the asynchronous logic circuit of the first example cannot realize the second data transfer method is that a transfer branch destination after the second divided data cannot be correctly selected.

First, the possibility that the asynchronous arbitration circuit 900 changes an arbitration result each time divided data in a data stream is transferred will be described. The case of transferring data by using the second data transfer method in the asynchronous logic circuit of the first example will be examined. Assuming that when the asynchronous arbitration circuit 900 is in the initial state, a data stream and a data request signal arrive from the merge source No. 0 and the merge source No. 1, respectively, and the head divided data of the merge source No. 0 is transferred first to the merge destination.

In the above case, in handshaking for transferring the head divided data from the merge source No. 0, after the head divided data is output to the merge destination, the data request for the head divided data output from the merge source No. 0 side is withdrawn. Since the data request for the head divided data from the merge source No. 1 is supplied to the mutually-exclusive circuit 910 at this time, the mutually-exclusive circuit 910 changes the outputs (Ge0, GE1) to (0, 1). When the data request from the merge source No. 1 passes through the mutually-exclusive circuit 910, the asynchronous arbitration circuit 900 prepares for starting the handshaking of the head divided data transfer from the merge source No. 1. Until completion of the handshake of the head divided data transfer from the merge source No. 0 is confirmed, the handshake recognizing circuit 921 makes the handshaking of the head divided data transfer from the merge source No. 1 wait.

Immediately after confirmation of completion of the handshaking of the head divided data transfer from the merge source No. 0, the handshake recognizing circuit 921 restarts the handshake of the head divided data transfer from the merge source No. 1. Therefore, even if the data request signal for the second divided data transfer from the merge source No. 0 arrives, the handshake of the second divided data transfer from the merge source No. 0 has to wait. As described above, the asynchronous logic circuit of the first example using the asynchronous arbitration circuit 900 cannot realize the second data transfer method.

Next, the reason why a transfer branch destination after the second divided data and subsequent data cannot be selected correctly will be described. The path calculation circuit 1350 of the asynchronous logic circuit (FIG. 13) used in the first example selects the transfer branch destination of the asynchronous branching module from the congestion information stored in the congestion information storage latch 1340 and the destination information included in the transfer data. However, in the second data transfer method, the destination information is included in only the head divided data of a unit data stream. Consequently, the path calculation circuit 1350 cannot select the transfer branch destination which leads to the destination for the second and subsequent divided data. Therefore, the second embodiment provides an asynchronous logic circuit capable of transferring data by the second data transfer method.

The configuration of the asynchronous logic circuit of the embodiment is similar to that of the asynchronous logic circuit of the first embodiment illustrated in FIG. 1. However, the operations of the asynchronous arbitration module 101 and the congestion avoiding path calculation module 112 are different from those of the asynchronous arbitration module 101 and the congestion avoiding path calculation module 112 in the asynchronous logic circuit of the first embodiment. The other points are similar to those of the first embodiment.

In the second embodiment, a data stream head signal line and a data stream termination signal line are provided in parallel with the transfer data signal line. To the data stream head signal line, a head signal indicating whether the divided data at the head of the data stream is transferred to the transfer data signal line or not is output. That is, when the divided data at the head of a data stream is transferred to the transfer data signal line, the head signal indicating that the divided data being transferred is the head of the data stream is output. On the other hand, when divided data which is not at the head of the data stream is transferred to the transfer data signal line, a head signal indicating that the divided data being transferred is not at the head of a data stream is output to the data stream head signal line.

To the data stream end signal line, an end signal indicating whether divided data at the end of a data stream is transferred to the transfer data signal line is output. That is, when divided data at the end of a data stream divided is transferred to the transfer data signal line, the end signal indicating that the divided data being transferred is at the end of the data stream is output. On the other hand, when divided data which is not at the end of the data stream is output to the transfer data signal line, the end signal indicating that the divided data being transferred is not at the end of the data stream is output to the data stream end signal line.

The asynchronous arbitration module 101 in the embodiment performs an operation of preventing a change in an arbitration result during transfer of a data stream to continuously output divided data constructing a unit data stream without dividing the divided data. An asynchronous arbitration module performing such an operation is described in, for example, Japanese Patent Application No. 2008-246187 (arbitration circuit, arbitration method used for the arbitration circuit, and semiconductor circuit and digital system each including the arbitration circuit).

The asynchronous arbitration module 101 has an arbitration result storage for storing an arbitration result indicating a merge source whose transfer data is output from the asynchronous arbitration module 101 with respect to outputs from the output of the head divided data of a unit data stream to the output of termination divided data. When the arbitration result storage stores a result indicating that transfer data from a single merge source is output, the asynchronous arbitration module 101 waits for output of transfer data from another merge source.

The congestion avoiding path calculation module 112 in the embodiment performs operations of selecting a branch destination for the head divided data and, for divided data subsequent to the head divided data, selecting the branch destination selected in last transfer of the divided data. That is, when the transfer data is the head divided data of a unit data stream, the congestion avoiding path calculation module 112 determines a transfer branch destination of the asynchronous branching module 102 on the basis of destination information included in the head divided data. When the transfer data is non-head divided data which is not at the head of a unit data stream, the congestion avoiding path calculation module 112 determines a transfer branch destination determined for the head divided data as a transfer branch destination of the asynchronous branching module 102.

Figure 19:
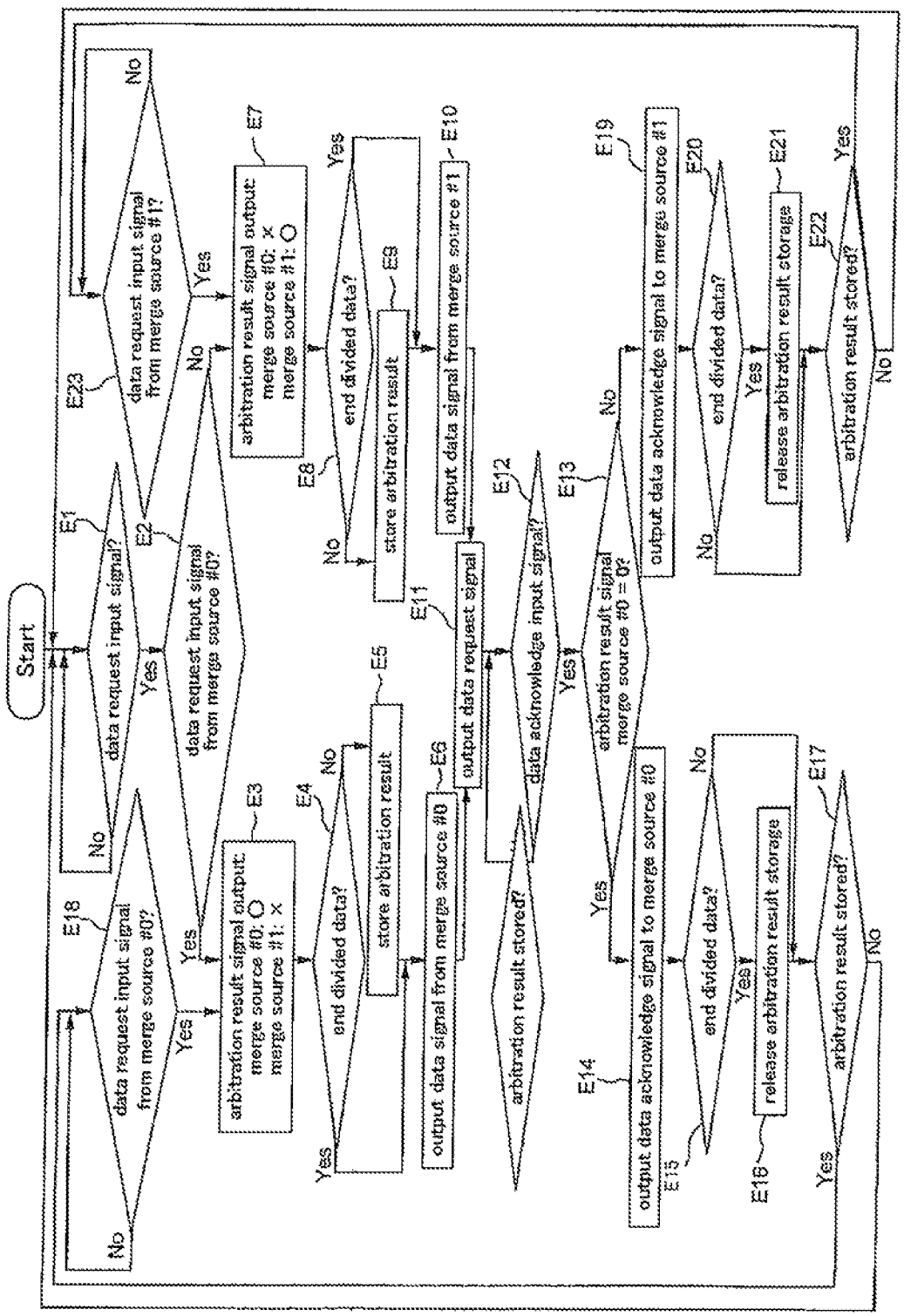
FIG. 19 is a flowchart showing the operation procedure of an asynchronous arbitration module in an asynchronous logic circuit of a second embodiment of the invention.

FIG. 19 illustrates the procedure of operation of the asynchronous arbitration module 101 performing operation of unchanging an arbitration result during transfer of a data stream. First, the asynchronous arbitration module 101 is in the initial state. The asynchronous arbitration module 101 determines whether the data request signal is received by the data request input terminal or not (step E1). When no data request signal is received, the asynchronous arbitration module 101 repeatedly executes step E1 and waits until the data request signal is received.

When the data request signal is received, the asynchronous arbitration module 101 determines whether the data request input terminal which received the data request signal is a data request input terminal on the merge source No. 0 side or not (step E2). On the basis of the determination in step E2, the asynchronous arbitration module 101 outputs an arbitration result signal from an arbitration result output terminal to the congestion detection module 111. When it is determined that the data request input terminal which received the data request signal is the data request input terminal on the merge source No. 0 side, an arbitration result signal indicating that the transfer data from the merge source No. 0 is being output from a data output terminal is output (step E3).

The asynchronous arbitration module 101 determines whether the input divided data is at the termination end of the data stream or not on the basis of an end signal output to the data stream end signal together with the divided data (step E4). When it is determined that the input divided data is not data at the termination end of the data stream, the asynchronous arbitration module 101 stores the arbitration result in step S3, that is, the arbitration result indicating that data transfer of the merge source No. 0 is performed (step E5). The asynchronous arbitration module 101 outputs the transfer data received from the data input terminal of the merge source No. 0 from the data output terminal to the merge destination (step E6). When it is determined in step E4 that the input divided data is data at the termination end of the data stream, the asynchronous arbitration module 101 advances from step E4 to step E6 and outputs the transfer data.

As described above, on the basis of the determination in step E2, the asynchronous arbitration module 101 outputs the arbitration result signal from the arbitration result output terminal to the congestion detection module 111. When it is determined in step E2 that the data request input terminal which received the data request signal is the data request input terminal of the merge source No. 1, the asynchronous arbitration module 101 outputs the arbitration result signal indicating that the transfer data from the merge source No. 1 is being output from the data output terminal (step E7).

The asynchronous arbitration module 101 determines whether the input divided data is at the termination end of the data stream or not on the basis of an end signal output to the data stream end signal together with the divided data (step E8). When it is determined in step E8 that the input divided data is not data at the termination end of the data stream, the asynchronous arbitration module 101 stores the arbitration result in step S7 (step E9). The asynchronous arbitration module 101 outputs the transfer data received from the data input terminal of the merge source No. 1 from the data output terminal to the merge destination (step E10). When it is determined in step E8 that the input divided data is data at the termination end of the data stream, the asynchronous arbitration module 101 advances from step E8 to step E10 and outputs the transfer data.

When the data request signals from both of the merge source No. 0 and the merge source No. 1 are received, the asynchronous arbitration module 101 selects one of the signals. The asynchronous arbitration module 101 selects, for example, the data request signal which arrives first in the two data request signals. When the data request signal from the merge source No. 0 is selected, the asynchronous arbitration module 101 advances from step E2 to step E3 and outputs the arbitration result and the transfer data from the merge source No. 0. On the other hand, when the data request signal from the merge source No. 1 is selected, the asynchronous arbitration module 101 advances from step E2 to step S7 and outputs the arbitration result and the transfer data from the merge source No. 1. The asynchronous arbitration module 101 holds the data request signal which is not selected until transfer of all of the divided data in the selected data stream is completed.

The asynchronous arbitration module 101 outputs the arbitration result in step E3 or E7 and, after that, outputs the data request signal from the data request output terminal to the congestion detection module 111 (step E11). The asynchronous arbitration module 101 determines whether or not a data acknowledge signal is supplied to the data acknowledge input terminal after outputting the data request signal (step E12). When the data acknowledge signal is not received, the asynchronous arbitration module 101 repeatedly performs the step E12 and waits until the data acknowledge signal is received.

When the data acknowledge signal is received, the asynchronous arbitration module 101 determines whether or not the arbitration result signal output in step E3 or E7 indicates that the transfer data from the merge source No. 0 is being output from the data output terminal (step E13). When the arbitration result signal indicates that the transfer data from the merge source No. 0 is being output from the data output terminal, the asynchronous arbitration module 101 outputs the data acknowledge signal from the data acknowledge output terminal corresponding to the merge source No. 0 (step E14).

On the basis of the end signal transferred together with the divided data, the asynchronous arbitration module 101 determines whether or not the transferred divided data is data at the termination end of the data stream (step E15). When the transferred divided data is data at the termination end of the data stream, the asynchronous arbitration module 101 releases the arbitration result stored in step E5 and indicating that data from the merge source No. 0 is being transferred (step E16). When the transferred divided data is data at the head or some midpoint of the data stream, the arbitration result is not released.

The asynchronous arbitration module 101 determines whether or not the arbitration result is stored or not after withdrawal of the data request signal which is received and withdrawal of the data acknowledge signal which is output after outputting the data acknowledge signal (step E17). When the arbitration result storage is released in step E16, the asynchronous arbitration module 101 determines that the arbitration result is not stored in step E17. When it is determined in step E17 that the arbitration result is not stored in step E17, the asynchronous arbitration module 101 returns to step E1 (initial state).

When it is determined that the arbitration result is stored, the asynchronous arbitration module 101 determines whether the data request input signal is supplied to the data request input terminal of the merge source No. 0 or not (step E18). When the data request input signal is not supplied to the data request input terminal of the merge source No. 0, the asynchronous arbitration module 101 repeatedly executes the step E18 and waits until the data request input signal is received from the merge source No. 0. When it is determined in step E18 that the data request input signal is received from the merge source No. 0, the asynchronous arbitration module 101 advances to step E3 and outputs the arbitration result.

When it is determined in step E13 that the arbitration result signal indicates that the transfer data from the merge source No. 1 is being output from the data output terminal, the asynchronous arbitration module 101 outputs the data acknowledge signal from the data acknowledge output terminal corresponding to the merge source No. 1 (step E19). On the basis of the end signal transferred together with the divided data, the asynchronous arbitration module 101 determines whether the transferred divided data is data at the termination end of the data stream or not (step E20).

When it is determined in step E20 that the transferred divided data is data at the termination end of the data stream, the asynchronous arbitration module 101 releases the arbitration result stored in step E9 and indicating that the data from the merge source No. 1 is being transferred (step E21). When it is determined in step E20 that the transferred divided data is not data at the termination end of the data stream, that is, when the transferred divided data is data at the head of the data stream or data in some midpoint, the asynchronous arbitration module 101 does not release the arbitration result.

The asynchronous arbitration module 101 determines whether or not the arbitration result is stored or not after withdrawal of the data request signal which is received and withdrawal of the data acknowledge signal which is output after outputting the data acknowledge signal (step E22). When the arbitration result storage is released in step E21, the asynchronous arbitration module 101 determines that the arbitration result is not stored in step E22. When it is determined in step E22 that the arbitration result is not stored in step E22, the asynchronous arbitration module 101 returns to step E1 (initial state).

When it is determined in step E22 that the arbitration result is stored, the asynchronous arbitration module 101 determines whether the data request input signal is supplied to the data request terminal input terminal of the merge source No. 1 or not (step E23). When the data request input signal is not supplied to the data request terminal input terminal of the merge source No. 1, the asynchronous arbitration module 101 repeatedly executes the step E23 and waits until the data request input signal is received from the merge source No. 1. When it is determined in step E23 that the data request input signal is received from the merge source No. 1, the asynchronous arbitration module 101 advances to step E7 and outputs the transfer data from the merge source No. 1 from the data output terminal to the merge destination.

In the beginning of transfer of the head divided data of a data stream, after the steps E1 and E2 in FIG. 19, the asynchronous arbitration module 101 stores an arbitration result. During transfer of divided data which is not the divided data at the termination end of the data stream, in the case of the data stream transfer from the merge source No. 0, the asynchronous arbitration module 101 repeatedly executes the steps E3 to E6 and steps E11 to E18 to continuously transfer the same data stream. In the case of the data stream transfer from the merge source No. 1, the asynchronous arbitration module 101 repeatedly executes steps E7 to E13 and steps E19 to 23 and continuously transfer the same data stream.

When the transferred data is termination-end divided data, the asynchronous arbitration module 101 outputs the divided data at the termination end of the data stream in step E6 or E10 and releases the arbitration result in step E16 or E21. In the releases the arbitration result stored in step E9 and indicating that the data from the merge source No. 1 is being transferred (step E21). In the case of transfer of the data stream from the merge source No. 0, the asynchronous arbitration module 101 releases the arbitration result in step E16, after that, completes the transfer of the termination-end divided data, returns from step E17 to the initial state of step E1, and starts preparing for transfer of the next data. In the case of transfer of the data stream from the merge source No. 1, the asynchronous arbitration module 101 releases the arbitration result in step E21, completes transfer of the termination-end divided data, returns from step E21 to the initial state of step E1, and starts preparing for transfer of the next data.

The asynchronous arbitration module 101 stores the arbitration result at the time of transfer of the head divided data and, when the arbitration result is stored, does not return to the initial state, waits for the data request signal from the merge source from which the head divided data is received, and transfers the divided data from the merge source. In such a manner, for example, even when the data transfer request is received from the merge source No. 1 after the head divided data from the merge source No. 0 is transferred, the asynchronous arbitration module 101 can continue transferring the divided data stream received from the merge source No. 0. That is, the asynchronous arbitration module 101 can merge data transfers of data streams without interrupting the unit data stream.

The execution order of the determination of whether the divided data being transferred is data at the termination end or not (steps E4, E8, E15, and E20), storage of the result of arbitration performed on the basis of the determination (steps E5 and E9), and release of the arbitration result storage (steps E16 and E21) is not limited to that shown in FIG. 19. The steps may be executed in any order as long as they are not executed just before step E1 and just before step E2.

Figure 20:
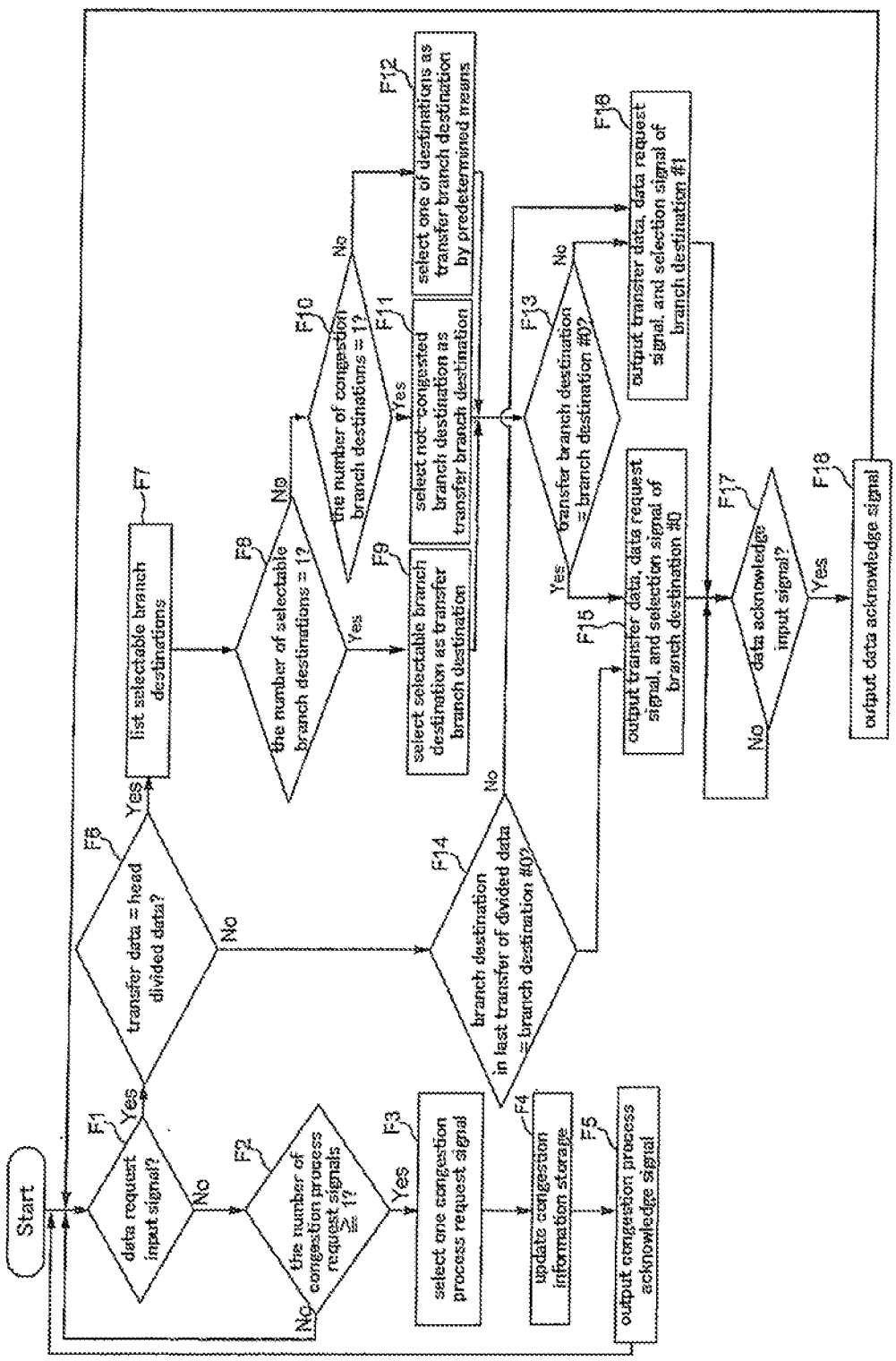
FIG. 20 is a flowchart showing the operation procedure of a congestion avoiding path calculation module in the asynchronous logic circuit of the second embodiment.

FIG. 20 illustrates the procedure of operation of the congestion avoiding path calculation module 112 used in the embodiment. First, the congestion avoiding path calculation module 112 is in the initial state. The congestion avoiding path calculation module 112 determines whether the data request signal is received by the data request input terminal or not (step F1). When the data request signal is not received, the congestion avoiding path calculation module 112 determines whether one or more congestion process request signals are supplied to the congestion process request input terminal or not (step F2). When the congestion process request signal is not received, the congestion avoiding path calculation module 112 returns to step F1 and waits until the data request signal or the congestion process request signal is received.

When the data request signal is not received and the congestion process request signals are supplied to one or more congestion process request input terminals, the congestion avoiding path calculation module 112 selects one of the signals (step F3). The congestion avoiding path calculation module 112 updates congestion information of a branch destination corresponding to a congestion process request input terminal to which the congestion process request signal is supplied in the congestion information stored in the congestion information storage memory to the value of a congestion information signal supplied to a congestion information input terminal in the same set as the congestion process request input terminal (step F4).

After updating the congestion information, the congestion avoiding path calculation module 112 outputs the congestion process acknowledge signal from the congestion process acknowledge output terminal in the same set as the congestion process request input terminal (step FS). After that, the congestion avoiding path calculation module 112 withdraws the congestion process request signal which is received and the congestion process acknowledge signal which is output and returns to step F1 (initial state).

When it is determined in step F1 that the data request signal is received, the congestion avoiding path calculation module 112 determines whether transfer data is head divided data of a data stream or not (step F6). When it is determined in step F6 that the transfer data is the head divided data, the congestion avoiding path calculation module 112 extracts destination information from transfer data received by the data input terminal and determines destination reachability on each of branch destinations of the asynchronous branching module 102 connected. The congestion avoiding path calculation module 112 lists branch destinations having destination reachability as selectable branch destinations (step F7).

The congestion avoiding path calculation module 112 determines whether the number of selectable branch destinations is one or not (step F8). That is, the congestion avoiding path calculation module 112 determines whether or not only one of two branch destinations of the asynchronous branching module leads to the destination. When the number of selectable branch destinations is one, the congestion avoiding path calculation module 112 selects the selectable branch destination as the transfer branch destination (step F9).

When the number of selectable branch destinations is not one, the congestion avoiding path calculation module 112 refers to the congestion information to check the presence/absence of congestion of the selectable branch destinations. The congestion avoiding path calculation module 112 determines whether the number of branch destinations is one or not (step F10). That is, the congestion avoiding path calculation module 112 determines whether or not one of two selectable branch destinations is congested and the other is not congested. When the number of congested branch destination is one, the congestion avoiding path calculation module 112 selects the branch destination which is not congested (non-congested branch destination) as a transfer branch destination (step F11). In the case where the number of congested branch destinations is not one, that is, in the case where both of two selectable branch destinations are congested or not congested, the congestion avoiding path calculation module 112 selects one of the branch destinations as the transfer branch destination by a predetermined method (step F12).

After selecting the transfer destination in step F9, F11, or F12, the congestion avoiding path calculation module 112 determines whether or not the branch destination selected as the transfer branch destination is the branch destination No. 0 (step F13). When it is determined in step F13 that the transfer branch destination is the branch destination No. 0, the congestion avoiding path calculation module 112 sends a selection signal indicative of the branch destination No. 0 to the asynchronous branching module 102. The congestion avoiding path calculation module 112 outputs the transfer data supplied to the data input terminal and the data request signal supplied to the data request input terminal from the data output terminal and the data request output terminal, respectively, to the asynchronous branching module 102 (step F15).

When it is determined in step F13 that the transfer branch destination is not the branch destination No. 0, that is, when it is determined that the transfer branch destination is the branch destination No. 1, the congestion avoiding path calculation module 112 sends a selection signal indicative of the branch destination No. 1 to the asynchronous branching module 102. The congestion avoiding path calculation module 112 outputs transfer data supplied to the data input terminal and the data request signal supplied to the data request input terminal from the data output terminal and the data request output terminal, respectively, to the asynchronous branching module 102 (step F16).

After outputting the data request signal in step F15 or F16, the congestion avoiding path calculation module 112 determines whether the data acknowledge signal to the output data request signal is supplied to the data acknowledge input terminal or not (step F17). When the data acknowledge signal is not received, the congestion avoiding path calculation module 112 repeatedly executes step F17 and waits until the data acknowledge signal is received. When the data acknowledge signal is supplied to the data acknowledge input terminal, the congestion avoiding path calculation module 112 outputs the data acknowledge signal from the data acknowledge output terminal (step F18). After that, the congestion avoiding path calculation module 112 withdraws the data request signal which is supplied and the data acknowledge signal which is output and returns to step F1 (initial state).

When it is determined in step F6 that the transfer data is not the head divided data, the congestion avoiding path calculation module 112 determines whether or not the branch destination selected as the transfer branch destination of the immediately preceding transfer data is of the branch destination No. 0 (step F14). When it is determined that the transfer branch destination of the immediately preceding transfer data is of the branch destination No. 0, the congestion avoiding path calculation module 112 advances to step F15, sends a selection signal indicative of the branch destination No. 0 to the asynchronous branching module 102 and outputs the transfer data and the data request signal to the asynchronous branching module 102. When it is determined that the transfer branch destination of the immediately preceding transfer data is of the transfer destination No. 1, the congestion avoiding path calculation module 112 advances to step F16, sends a selection signal indicative of the branch destination No. 1 to the asynchronous branching module 102, and outputs the transfer data and the data request signal to the asynchronous branching module 102.

The operation of the asynchronous branching module 102 is similar to that (FIG. 5) of the first embodiment. Specifically, according to the flowchart shown in FIG. 5, the asynchronous branching module 102 outputs the transfer data and the data request signal to the branch destination No. 0 or 1 in accordance with the selection signal received from the congestion avoiding path calculation module 112 performing the above-described operation.

When the transfer data is the head divided data, the congestion avoiding path calculation module 112 selects a transfer branch destination on the basis of destination information and transfer head divided data by operations similar to those of the congestion avoiding path calculation module used in the first embodiment. When the transfer data is divided data which is not the head divided data, the congestion avoiding path calculation module 112 transfers the divided data to the transfer branch destination selected by the preceding divided data. By performing such operations, also by the second data transfer method in which destination information is included only in the head divided data, all of divided data in a unit data stream can be transferred via the same path.

A second example will now be described. A connection form of circuits in the asynchronous inter-core connection circuit included in the semiconductor circuit of the example is similar to that of the circuits in the asynchronous inter-core connection circuit 600 shown in FIG. 6. As the asynchronous branching module 611, like in the first example, the asynchronous branching circuit 700 having the circuit configuration shown in FIG. 7 can be used. As the congestion detection modules 632 and 642, like in the first example, the congestion detection circuit 1200 having the circuit configuration shown in FIG. 12 can be used.

In the example, as the asynchronous arbitration modules 612, 614, and 622, an asynchronous arbitration circuit performing operation of unchanging an arbitration result during transfer of a data stream is used in place of the asynchronous arbitration circuit 900 illustrated in FIG. 9. In the example, as the congestion avoiding path calculation module 631, in place of the congestion avoiding path calculation circuit 1300 shown in FIG. 13, a congestion avoiding path calculation circuit is used, which performs operations of selecting a branch destination for head divided data and selecting the branch destination selected in last transfer of the divided data, for divided data subsequent to the head divided data.

Figure 21:
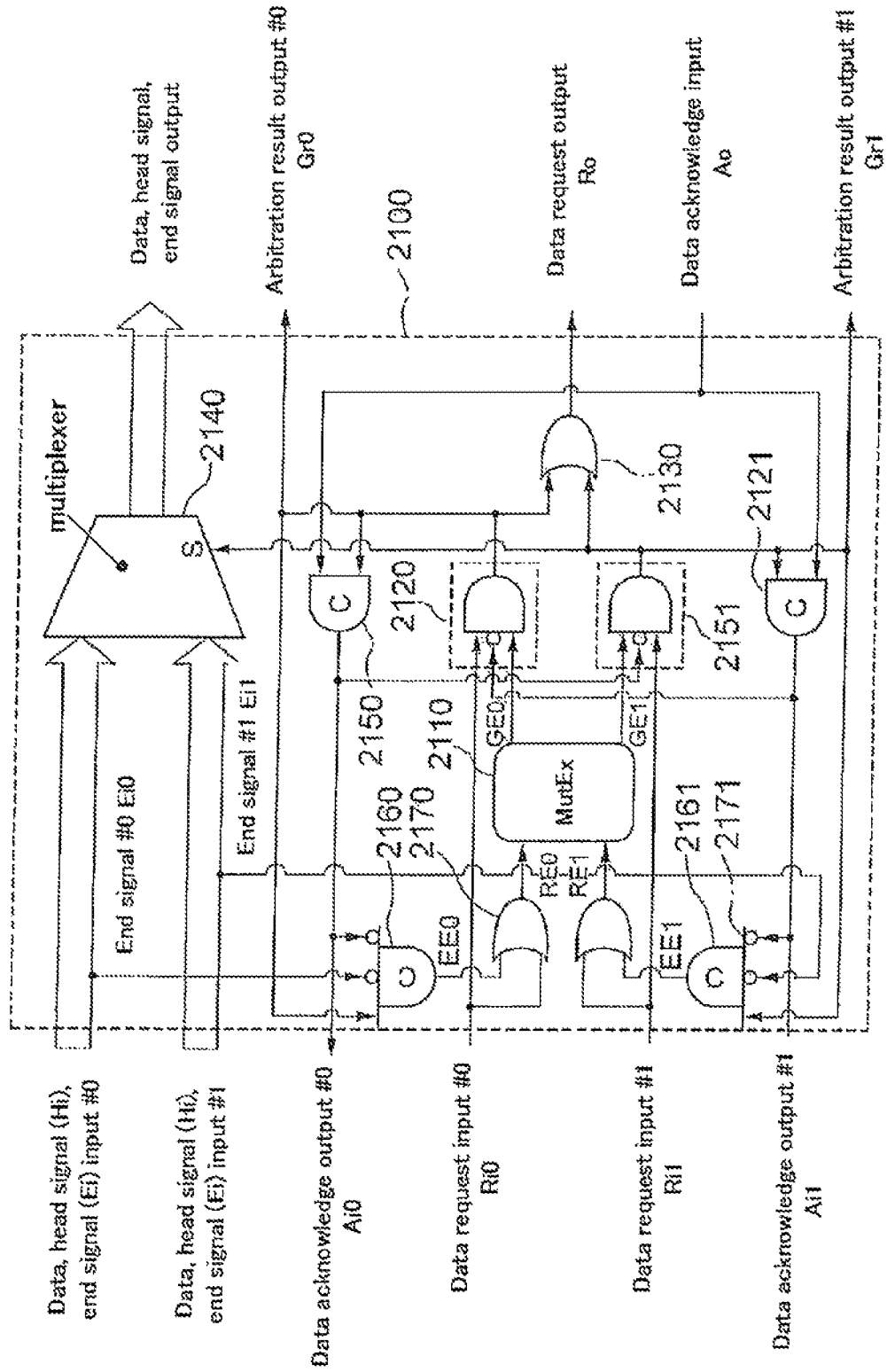
FIG. 21 is a block diagram showing an example of the circuit configuration of the asynchronous arbitration module.

FIG. 21 illustrates an example of the circuit configuration of an asynchronous arbitration module used in the second example. Each of the asynchronous arbitration modules 612, 614, and 622 in FIG. 6 can be constructed by an asynchronous arbitration circuit (asynchronous arbitration circuit for data stream continuous transfer) 2100 illustrated in FIG. 21. The asynchronous arbitration circuit 2100 has a mutually-exclusive circuit (MutEx) 2110, handshaking recognizing circuits 2120 and 2121, OR elements 2130, 2170, and 2171, a multiplexer 2140, symmetric 2-input C elements 2150 and 2151, and asymmetric 3-input C elements 2160 and 2161. As the mutually-exclusive circuit 2110, the logic circuit having the configuration shown in FIG. 10 can be used. As the symmetric 2-input C elements 2150 and 2151, the logic circuit having the configuration shown in FIG. 11 can be used.

To the asynchronous arbitration circuit 2100, transfer data from two merge sources (merge source No. 0 and merge source No. 1), and the data request signals Ri0 and Ri1 from the two merge sources are supplied. The transfer data includes a head signal Hi indicating whether transfer data is head divided data or not, and an end signal Ei indicating whether transfer data is end divided data or not. To the asynchronous arbitration circuit 2100, the data acknowledge signal Ao from the merge dentition is supplied. The asynchronous arbitration circuit 2100 outputs the transfer data including the head signal and the end signal, the data request signal Ro, the data acknowledge signals Ai0 and Ai1 for the two merge sources, and the arbitration result signals Gr0 and Gr1 to the congestion detection modules.

Figure 22:
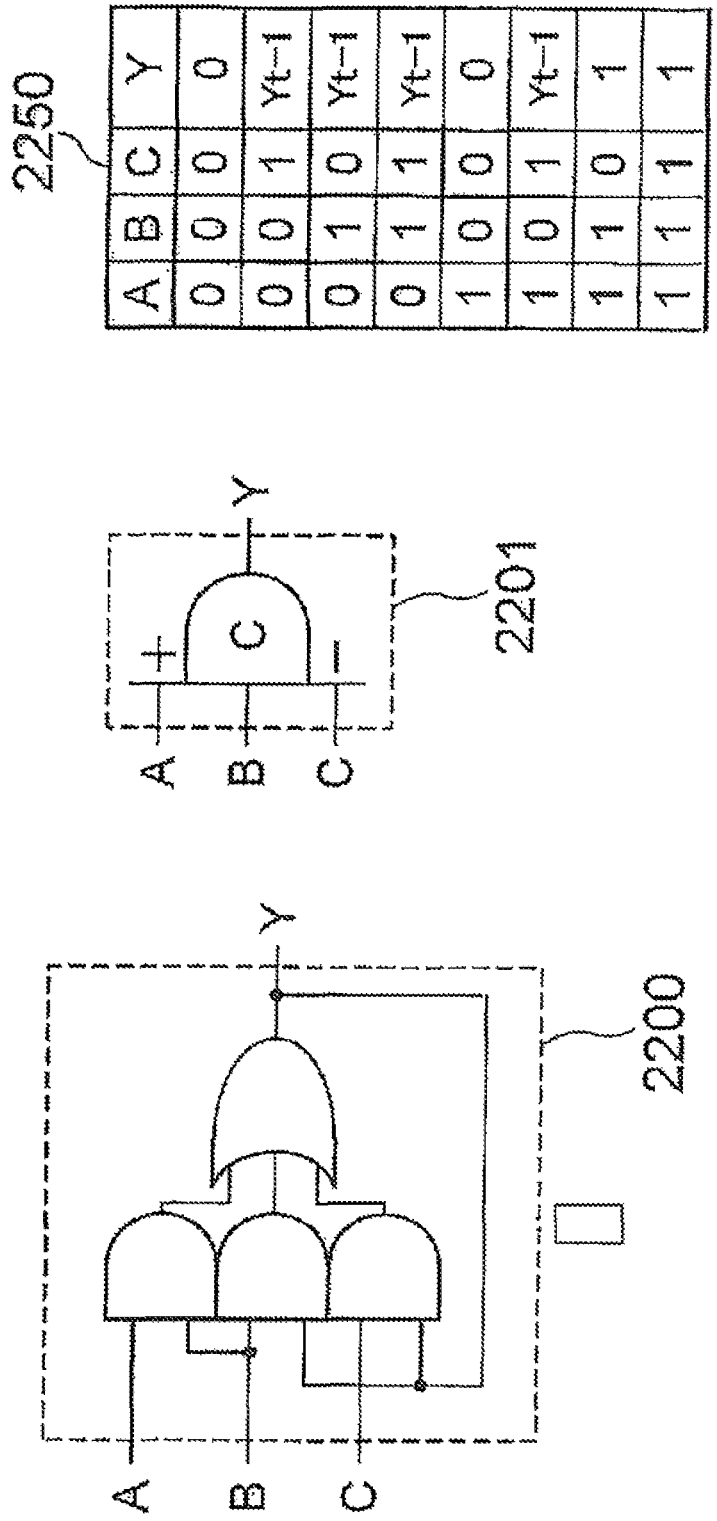
FIG. 22 is a block diagram illustrating an asynchronous 3-input C element.

The asymmetric 3-input C elements 2160 and 2161 correspond to an arbitration result storage. FIG. 22 illustrates a logic circuit of the asymmetric 3-input C element. The asymmetric 3-input C elements 2160 and 2161 can be constructed by a logic circuit (asymmetric 3-input C element) 2200 shown in FIG. 22. The asymmetric 3-input C element 2200 includes three AND elements and one OR element. The asymmetric 3-input C element 2200 will be expressed by reference numeral 2201.

The relations among the inputs A, B, and C of the asymmetric 3-input C element 2200 and the output Y are as shown by a truth table 2250. Specifically, when inputs (A, B, C)=(1, 1, 0) or (1, 1, 1), the asymmetric 3-input C element 2200 outputs Y=1. When the inputs (A, B, C)=(0, 0, 0) or (1, 0, 0), the asymmetric 3-input C element 2200 outputs Y=0. When the inputs (A, B, C) are in combinations of the other values, the asymmetric 3-input C element 2200 maintains the value of the immediately preceding output Y.

Referring again to FIG. 21, to the asymmetric 3-input C element 2160, the arbitration result signal Gr0, an inversion signal of an end signal Ei0 of transfer data from the merge source No. 0, and an inversion signal of a data acknowledge signal Ai0 which is output to the merge source No. 0 are supplied. The arbitration result signal Gr0 corresponds to the signal A in FIG. 22, the inversion signal of the end signal Ei0 corresponds to the signal B, and the inversion signal of the data acknowledge signal Ai0 corresponds to the signal C. An output signal EE0 of the asymmetric 3-input C element 2160 indicates whether the merge source No. 0 is transferring divided data which is not the end divided data (not-end divided data) or not.

To the asymmetric 3-input C element 2161, the arbitration result signal Gr1, an inversion signal of an end signal E11 of transfer data from the merge source No. 1, and negation of a data acknowledge signal Ai1 which is output to the merge source No. 1 are supplied. The arbitration result signal Gr1 corresponds to the signal A in FIG. 22, the inversion signal of the end signal Ei1 corresponds to the signal B, and negation of the data acknowledge signal Ai1 corresponds to the signal C. An output signal EE1 of the asymmetric 3-input C element 2161 indicates whether the merge source No. 1 is transferring non-end divided data of a data stream or not.

The OR element 2170 outputs the OR between the data request signal Ri0 from the merge source No. 0 and the signal EE0 indicating whether the merge source No. 0 is transferring the non-end data in the data stream or not. The OR element 2171 outputs the OR between the data request signal Ri1 from the merge source No. 1 and the signal EE1 indicating whether the merge source No. 1 is transferring the non-end data in the data stream or not. The mutually-exclusive circuit 2110 receives an output RE0 of the OR element 2170 and an output RE1 of the OR element 2171 and outputs the signals GE0 and GE1.

The mutually-exclusive circuit 2110 makes the data request signal supplied via the OR element 2170 or 2171 pass. When the data request signal on the OR element 2170 side, that is, on the merge source No. 0 side is passed, the mutually-exclusive circuit 2110 outputs (GE0, GE1)=(1, 0). When the data request signal on the OR element 2171 side, that is, on the merge source No. 1 side is passed, the mutually-exclusive circuit 2110 outputs (GE0, GE1)=(0, 1).

Each of the handshake recognizing circuits 2120 and 2121 includes an AND element having three inputs and one output. One of the inputs of each of the handshake recognizing circuits 2120 and 2121 is connected to a data request signal passed through the mutually-exclusive circuit 2110. Another one is connected to the data request signals Ri0 and R11 from the merge source No. 0 or 1. The remaining one is connected to the data acknowledge signals Ai1 and Ai0 output to the merge source No. 1 or 0 via an inverter.

The handshake recognizing circuit 2120 obtains the AND among the output signal GE0 of the mutually-exclusive circuit 2110, the data request signal Ri0 from the merge source No. 0, and the inversion signal of the data acknowledge signal Ai1 which is output to the merge source No. 1. The handshake recognizing circuit 2121 obtains the AND among the output signal GE1 of the mutually-exclusive circuit 2110, the data request signal R11 from the merge source No. 1, and the inversion signal of the data acknowledge signal Ai0 which is output to the merge source No. 0. The OR element 2130 obtains the OR between the output of the handshake recognizing circuit 2120 and the output of the handshake recognizing circuit 2121. The asynchronous arbitration circuit 2100 outputs outputs of the handshake recognizing circuits 2120 and 2121 as the arbitration result signals (Gr0, Gr1). The asynchronous arbitration circuit 2100 outputs the output of the OR element 2130 as the data request signal Ro to the merge source.

To the symmetric 2-input C element 2150, the data acknowledge signal Ao from the merge source and the output Gr0 of the handshake recognizing circuit 2120 are supplied. To the symmetric 2-input C element 2151, the data acknowledge signal Ao and the output Gr1 of the handshake recognizing circuit 2121 are supplied. The asynchronous arbitration circuit 2100 outputs the output of the symmetric 2-input C element 2150 as the data acknowledge signal Ai0 to the merge source No. 0. The asynchronous arbitration circuit 2100 outputs the output of the symmetric 2-input C element 2151 as the data acknowledge signal Ai1 to the merge source No. 1.

Each of the symmetric 2-input C elements 2150 and 2151 corresponds to a waiting module for waiting the data request signal passed through the handshake recognizing circuits 2120 and 2121 and the data acknowledge signal to the data request signal. The waiting module outputs the data acknowledge signal to the merge source to which the data request signal passed through the handshake recognizing circuits 2120 and 2121 is supplied. The symmetric 2-input C element 2150 waits until the data acknowledge signal Ao becomes 1 after the data request signal from the merge source No. 0 passes and the output Gr0 of the handshake recognizing circuit 2120 becomes 1 and, when Ao becomes 1, outputs the data acknowledge signal Ao0=1 to the merge source No. 0. The symmetric 2-input C element 2151 waits until the data acknowledge signal Ao becomes 1 after the data request signal from the merge source No. 1 passes and the output Gr1 of the handshake recognizing circuit 2121 becomes 1 and, when Ao becomes 1, outputs the data acknowledge signal Ao1=1 to the merge source No. 1.

The multiplexer 2140 receives transfer data, a head signal Hi0, and an end signal Ei0 from the merge source No. 0 and transfer data, a head signal Hi1, and an end signal Ei1 from the merge source No. 1. To a selection signal terminal S of the multiplexer 2140, the output Gr1 of the handshake recognizing circuit 2121 is supplied. When the output Gr1 of the handshake recognizing circuit 2121 is 1, that is, when the handshake recognizing circuit 2121 makes the data request signal from the merge source No. 1 pass, the multiplexer 2140 outputs the transfer data from the merge source No. 1. When the output Gr1 of the handshake recognizing circuit 2121 is 0, that is, when the handshake recognizing circuit 2120 makes the data request signal from the merge source No. 0 pass, the multiplexer 2140 outputs the transfer data from the merge source No. 0.

The case where the output Gr0 of the handshake recognizing circuit 2120 is 1 and the end signal Ei0 is 0 corresponds to the case where the merge source No. 0 is selected as the data transfer source, and divided data to be transferred is not end divided data. In this case, the asymmetric 3-input C element 2160 outputs EE0=1 and stores an arbitration result indicating that a data stream from the merge source No. 0 is being transferred. When the end signal Ei0 is 1 and the output of the symmetric 2-input C element 2150 is Ai0=1, divided data to be transferred is end divided data and the data acknowledge signal Ai0 to be output to the merge source No. 0 is 1. In this case, the asymmetric 3-input C element 2160 outputs EE0=0 and releases the storage of the arbitration result.

The case where the output Gr1 of the handshake recognizing circuit 2121 is 1 and the end signal Ei1 is 0 corresponds to the case where the merge source No. 1 is selected as the data transfer source, and divided data to be transferred is not end divided data. In this case, the asymmetric 3-input C element 2161 outputs EE1=1 and stores an arbitration result indicating that a data stream from the merge source No. 1 is being transferred. When the end signal Ei1 is 1 and the output of the symmetric 2-input C element 2150 is Ai1=1, divided data to be transferred is end divided data and the data acknowledge signal Ai1 to be output to the merge source No. 1 is 1. In this case, the asymmetric 3-input C element 2161 outputs EE1=0 and releases the storage of the arbitration result.

The operations of the parts in the asynchronous arbitration circuit 2100 in FIG. 21 will be described in correspondence with the flowchart of FIG. 19. In the initial state, inputs/outputs and internal signals of the asynchronous arbitration circuit 2100 are Ri0=Ai0=Ei0=Ri1=Ai1=Ei1=Ro=Ao=Gr0=Gr1=0, and RE0=RE1=GE0=GE1=EE0=EE1=0. It is assumed that a data stream made by two pieces of divided data is supplied to the asynchronous arbitration circuit 2100 from the merge source No. 0 on the outside of the circuit. To the asynchronous arbitration circuit 2100, the data request input signal Ri0=1 is supplied (step E1 in FIG. 19).

When Ri0=1 is supplied, the OR element 2170 changes the output RE0 to 1. On the other hand, since the data request signal Ri1 supplied from the merge source No. 1 is 0, the merge source No. 1 does not transfer a data stream, and EE1=0, the OR element 2171 outputs RE1=0. The mutually-exclusive circuit 2110 makes the data request signal of the merge source No. 1 pass and outputs (GE0, GE1)=(1, 0).

Since there is no handshaking (Ai1=0) between the merge source No. 1 and the merge destination, when the data request signal Ri0 from the merge source No. 0 supplied from the outside becomes 1 and the output GE0 of the mutually-exclusive circuit 2110 becomes 1, the handshake recognizing circuit 2120 outputs Gr0=1. Since the output GE1 of the mutually-exclusive circuit 2110 is 0 and the data request signal R11 from the merge source No. 1 supplied from the outside is also 0, the handshake recognizing circuit 2121 outputs Gr1=0. Since the data request signal indicates that the signal is from the merge source No. 0 (step E2), the asynchronous arbitration circuit 2100 outputs the arbitration result signals (Gr0, Gr1)=(1, 0) (step E3).

Since the divided data supplied from the merge source No. 0 is head divided data and is not end divided data, so that the end signal Ei0=0 (step E4). The input signals of the asymmetric 3-input C element 2160 are expressed also using signs used in FIG. 22 as (A, B, C)=(Gr0,⁻Ei0,⁻Ai0)=(1, 1, 1) (⁻ denotes logical negation). Therefore, the asymmetric 3-input C element 2160 stores an arbitration result that the merge source No. 0 is transferring data and outputs Y=EE0=1 (step E5).

Since the arbitration result is (Gr0, Gr1)=(1, 0), the multiplexer 2140 selects the merge source No. 0 and outputs the divided data from the merge source No. 0, the head signal Hi0), and the end signal (E10) to the merge destination (step E6). When the output Gr of the handshake recognizing circuit 2120 becomes 1, the OR element 2130 outputs the data request signal Ro=1 to the merge destination (step E11).

The asynchronous arbitration circuit 2100 waits for a data acknowledge signal from the merge destination (step E12). When the data acknowledge signal Ao=1 to the data request signal is received from the merge destination, since Gr0=1 and the merge source No. 0 is transferring data (step E13), the symmetric 2-input C element 2150 outputs the data acknowledge signal Ai0=1 to the merge source No. 0 (step E14). Since Ei0=0, that is, divided data being transferred is not the end divided data (step E15), the inputs of the asymmetric 3-input C element 2160 are (A, B, C)=(Gr0,⁻Ei0,⁻Ai0)=(1, 1, 0). The storage of the arbitration result is not released, and the output of the asymmetric 3-input C element 2160 remains as Y=EE0=1.

After the asynchronous arbitration circuit 2100 outputs the data acknowledge signal Ai0=1 to the merge source No. 0, the merge source No. 0 withdraws the data request signal, and the data request signal from the merge source No. 0 supplied to the asynchronous arbitration circuit 2100 becomes Ri0=0. The asynchronous 3-input C element 2160 continues outputting EE0=1 also after the merge source No. 0 withdraws the data request signal. On the other hand, the asymmetric 3-input C element 2161 corresponding to the merge source No. 1 does not store an arbitration result to the merge source No. 1, and the output EE1 remains 0.

Since the asymmetric 3-input C element 2160 outputs EE0=1, also during the period since the merge source No. 0 withdraws the data request signal until Ri0=1 is received for the following divided data, the OR element 2170 outputs the RE0=1 to the mutually-exclusive circuit 2110. On the other hand, when the merge source No. 1 changes the data request signal Ri1 to 1, the OR element 2171 outputs RE1=1. Therefore, the combination of inputs of the mutually-exclusive circuit 2110 is determined depending on the data request signal Ri1 from the merge source No. 1 and (RE0, RE1)=(1, 0) or (1, 1).

Referring to the truth table 1050 in FIG. 10, when the combination of the input signals is (RE0, RE1)=(1, 0), the mutually-exclusive circuit 2110 outputs (GE0, GE1)=(1, 0). When the combination of the input signals is (RE0, RE1)=(1, 1), the mutually-exclusive circuit 2110 maintains the preceding output state. Therefore, even if the data request Ri1=1 is received from the merge source No. 1 after the data request signal Ri0=1 is received from the merge source No. 0, before the data request signal is withdrawn, or even when the data request signal Ri1=1 is received from the merge source No. 1 during a period in which the data request signal is withdrawn, the mutually-exclusive circuit 2110 continues outputting (GE0, GE0=(1, 0).

When the data request signal Ri0 from the merge source No. 0 becomes 0, the handshake recognizing circuit 2120 changes the output Gr0 to 0. When the output of the handshake recognizing circuit 2120 becomes 0, the OR element 2130 set the data request signal Ro to be output to the merge destination to 0, and withdraws the data request signal. When the asynchronous arbitration circuit 2100 withdraws the data request signal, the merge destination withdraws the data acknowledge signal, and the data acknowledge signal Ao=0 is supplied to the asynchronous arbitration circuit 2100. When the input signals (Gr0, Ao) become (0, 0), the symmetric 2-input C element 2150 changes the output Ai0 to 0, and the asynchronous arbitration circuit 2100 withdraws the data acknowledge signal to be output to the merge source No. 0.

When the asynchronous arbitration circuit 2100 withdraws the data acknowledge signal to be output to the merge source No. 0, the inputs of the asymmetric 3-input C element 2160 become as follows.

$$(A,B,C)=(Gr0,{}^{-}Ei0,{}^{-}Ai0)=(0,1,0)$$

Referring to the truth table 2250 in FIG. 22, when (A, B, C)=(0, 1, 0), the asymmetric 3-input C element 2160 maintains the preceding output state. Therefore, the output of the asymmetric 3-input C element 2160 remains as Y=EE0=1, and storage of the arbitration result of the asymmetric 3-input C element 2160 is maintained.

Since the storage of the arbitration result is maintained in the asynchronous arbitration circuit 2100 (step E17), even if the data request signal Ri1=1 is received from the merge source No. 0, the outputs (GE0, GE1) of the mutually-exclusive circuit 2110 remain (1, 0) and there is no change. When the next divided data and the data request signal Ri1=1 are received from the merge source No. 0 (step E18), the handshake recognizing circuit 2120 outputs the arbitration result Gr0=1 (step E3).

Since the divided data from the merge source No. 0 is the second data of the data stream made by two pieces of divided data, that is, the end divided data, the end signal Ei0 is 1 (step E4). The asynchronous arbitration circuit 2100 does not store the arbitration result and outputs the divided data from the merge source No. 0, the head signal, and the end signal of the merge destination (step E6). When the output Gr of the handshake recognizing circuit 2120 becomes 1, the OR element 2130 outputs the data request signal Ro=1 (step E11).

The asynchronous arbitration circuit 2100 waits for the data acknowledge signal from the merge destination (step E12). When the data acknowledge signal Ao=1 to the data request signal output is received from the merge destination, since Gr0=1 and the merge source No. 0 is transferring data (step E13), the symmetric 2-input C element 2150 outputs the data acknowledge signal Ai0=1 (step E14). At this time, since Ei0=1, that is, the divided data being transferred is the end divided data (step E15), the inputs of the asymmetric 3-input C element 2160 become as follows.

$$(A,B,C)=(Gr0,{}^{-}Ei0,{}^{-}Ai0)=(1,0,0)$$

Therefore, storage of the arbitration result is released, and the output of the asymmetric 3-input C element 2160 becomes Y=EE0=0.

After the asynchronous arbitration circuit 2100 outputs the data acknowledge signal Ai0=1 to the merge source No. 0, the merge source No. 0 withdraws the data request signal, and the data request signal from the merge source No. 0 supplied to the asynchronous arbitration circuit 2100 becomes Ri0=0. At this time, the asymmetric 3-input C element 2160 releases storage of the arbitration result and outputs EE0=0. The asymmetric 3-input C element 2161 corresponding to the merge source No. 1 does not store the arbitration result for the merge source No. 1 and the output is EE1=0.

If the data request signal from the merge source No. 1 becomes Ri1=1, the OR element 211 changes the output RE1 to 1. Since the merge source No. 0 withdraws the data request signal, the inputs of the mutually-exclusive circuit 2110 become (RE0, RE1)=(0, 1), and the mutually-exclusive circuit 2110 outputs (GE0, GE1)=(0, 1). In the case where the data request signal is not received from the merge source No. 1 (Ri1=0), the inputs of the mutually-exclusive circuit 2110 (RE0, RE1)=(0, 0), and the mutually-exclusive circuit 2110 outputs (GE0, GE0=(0, 0).

When it is assumed that the data request signal from the merge source No. 1 is received (Ri1=1), the outputs of the mutually-exclusive circuit 2110 become (GE0, GE1)=(0, 1) as described above. However, since handshaking in the merge source No. 0 is not completed and Ai0=1, even when Ri1 becomes 1 and GE1 become 1, the handshake recognizing circuit 2121 continues outputting Gr1=0. On the other hand, if the data request signal is not received from the merge source No. 1 (Ri1=0), the handshake recognizing circuit 2121 continues outputting Gr1=0.

When the data request signal Ri received becomes 0, the handshake recognizing circuit 2120 outputs Gr0=0. When the outputs of the handshake recognizing circuits 2120 and 2121 become (Gr0, Gr1)=(0, 0), the OR element 2130 withdraws the data request signal which is output to the merge destination, and Ro=0 is output. When the asynchronous arbitration circuit 2100 withdraws the data request signal, the merge destination withdraws the data acknowledge signal, and the data acknowledge signal Ao=0 is supplied to the asynchronous arbitration circuit 2100. When the inputs (Gr0, Ao) become (0, 0), the symmetric 2-input C element 2150 changes the output Ai0 to 0, and the asynchronous arbitration circuit 2100 withdraws the data acknowledge signal to be output to the merge source No. 0.

When the asynchronous arbitration circuit 2100 withdraws the data acknowledge signal to be output to the merge source No. 0, the inputs of the asymmetric 3-input C element 2160 become as follows.

$$(A,B,C)=(Gr0, \overline{Ei0}, \overline{Ai0})=(0,0,1)$$

The output of the asymmetric 3-input C element 2160 remains Y=EE0=0. That is, the storage of the arbitration result is left released. Since the storage of the arbitration result is released (step E17), the asynchronous arbitration circuit 2100 returns to the step E1 (initial state).

Figure 23:
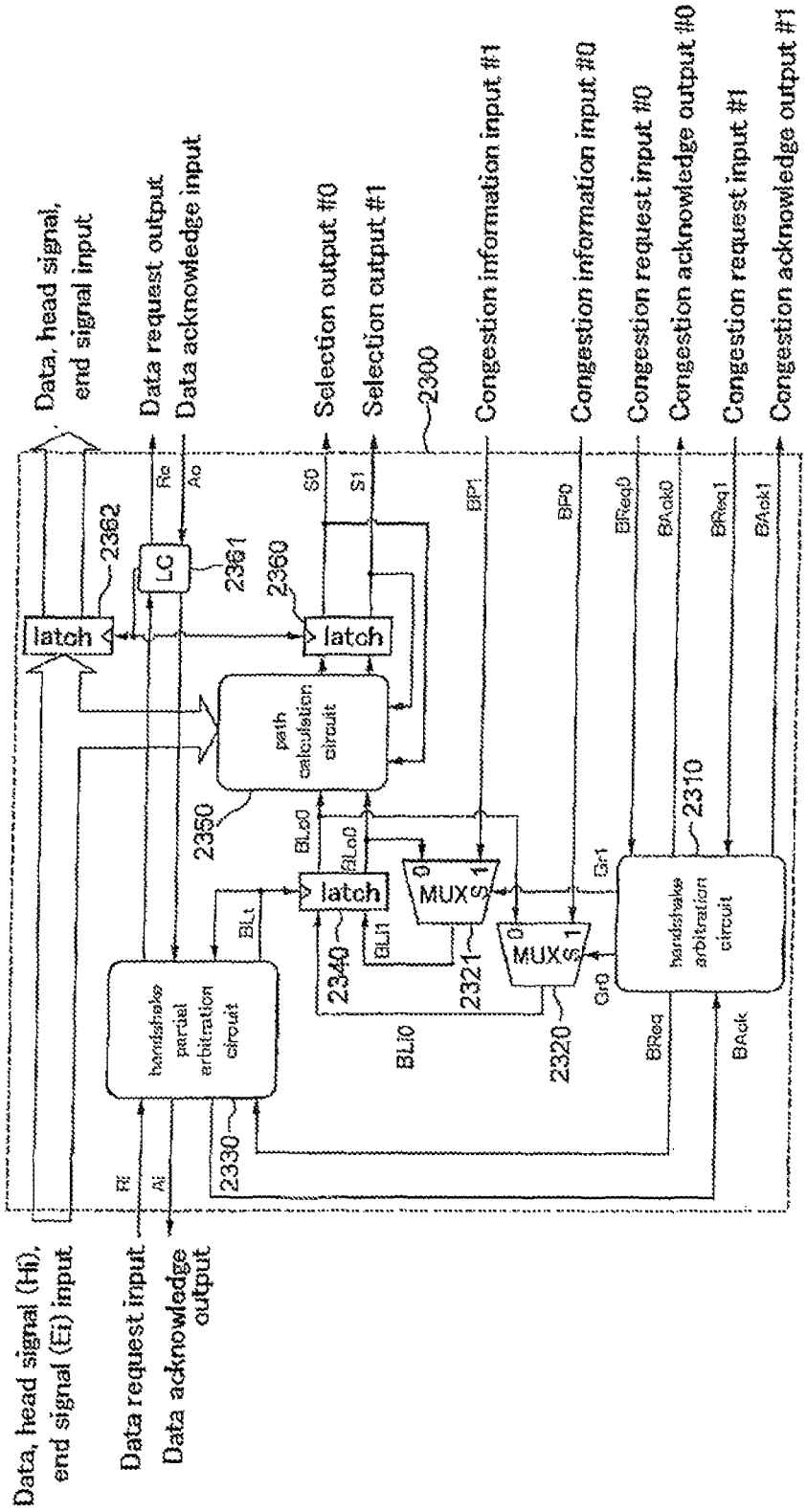
FIG. 23 is a block diagram illustrating an example of the circuit configuration of the congestion avoiding path calculation module.

FIG. 23 illustrates an example of the circuit configuration of the congestion avoiding path calculation module. The congestion avoiding path calculation module 631 in FIG. 6 can be constructed by a congestion avoiding path calculation module 2300 illustrated in FIG. 23. The congestion avoiding path calculation module 2300 has a handshake arbitration circuit 2310, multiplexers 2320 and 2321, a handshake partial arbitration circuit 2330, a congestion information storage latch 2340, a path calculation circuit 2350, a transfer branch destination storage latch 2360, a storage control circuit 2361, and a data/head signal/end signal storage latch 2362.

The handshake arbitration circuit 2310, the multiplexers 2320 and 2321, the handshake partial arbitration circuit 2330, and the congestion information storage latch 2340 included in the congestion avoiding path calculation circuit 2300 are the same as the handshake arbitration circuit 1310, the multiplexers 1320 and 1321, the handshake partial arbitration circuit 1330, and the congestion information storage latch 1340 included in the congestion avoiding path calculation circuit 1300 shown in FIG. 13, respectively. The handshake partial arbitration circuit 2330 in FIG. 23 can be constructed by the handshake partial arbitration circuit 1400 shown in FIG. 14.

The path calculation circuit 2350 determines as an output destination of transfer data a branch destination leading to a core of a transfer destination of the transfer data among the branch destinations of the asynchronous branching module. Different from the path calculation circuit 1350 used in the first example, the path calculation circuit 2350 used in the example outputs a selection branch destination signal of divided data being transferred by using not only the transfer data and the congestion information stored in the congestion information storage latch 2340 but also the head signal Hi transferred in parallel with the data and the branch destination information stored in the transfer branch destination storage latch 2360.

When the transfer data is the head divided data in a unit data stream, the path calculation circuit 2350 determines the transfer branch destination on the basis of the destination information and the congestion information. The path calculation circuit 2350 stores the determined transfer branch destination in the transfer branch destination storage latch (branch destination information storage memory) 2360. When the transfer data is not-head divided data which is not the head data in the unit data stream, the path calculation circuit 2350 determines the transfer branch destination stored in the transfer branch destination storage latch 2360 as a transfer branch destination to be selected by the asynchronous branch module.

Since the transfer branch destination signal stored in the transfer branch destination storage latch 2360 is a signal indicative of the transfer branch destination of the divided data supplied to the path calculation circuit 2350, the data/head signal/end signal storage latch 2362 is provided together with the transfer branch destination storage latch 2360. The storage control circuit 2361 performs handshaking in data transfer. The storage control circuit 2361 controls the transfer branch destination storage latch 2360 and the data/head signal/end signal storage latch 2362.

The operations of the parts in the congestion avoiding path calculation circuit 2300 in FIG. 23 will be described in correspondence with the flowchart of FIG. 20. When there is no data transfer request, the congestion avoiding path calculation circuit 2300 performs the operations in steps F1 to F5 in FIG. 20 and stores congestion information. The operations of storing congestion information is similar to that (steps C1 to C5 in FIG. 4) of the congestion avoiding path calculation circuit 1300 in FIG. 13.

When the data transfer request is received, the congestion avoiding path calculation circuit 2300 advances from step F1 to step F6, receives the divided data transferred in parallel with the data transfer request and the head signal Hi, and checks whether the divided data is the head divided data or not from the head signal. When it is determined that the data being transferred is head divided data, the congestion avoiding path calculation circuit 2300 performs the operations in step F7 to F13 and, on the basis of congestion information, selects the transfer branch destination of the head divided data for avoiding congestion. The operations of selecting a transfer branch destination of the head divided data are similar to those (step C6 to C12 in FIG. 4) of the congestion avoiding path calculation circuit 1300 in FIG. 13.

When the data request signal is received via the handshake partial arbitration circuit 2330, the storage control circuit 2361 sends the storage control signal to the transfer branch destination storage latch 2360 and the data/head signal/end signal storage latch 2362. When the storage control signal is received, the transfer branch destination storage latch 2360 stores the transfer branch destination determined by the path calculation circuit 2350, and the data/head signal/end signal storage latch 2362 stores the divided data, the head signal Hi, and the end signal Ei supplied together with the data request signal.

When the transfer branch destination determined by the path calculation circuit 2350 is the branch destination No. 0 of the asynchronous branching module (step F13) as a result of selection of the transfer branch destination, the congestion avoiding path calculation circuit 2300 advances to step F15. In step F15, the divided data, the head signal Hi, and the end signal Ei stored in the data/head signal end signal storage latch 2362 and the transfer branch destination signal indicative of the branch destination No. 0 stored in the transfer branch destination storage latch 2360 are output. The congestion avoiding path calculation circuit 2300 outputs the data request signal from the storage control circuit 2361 (step F15).

When the transfer branch destination determined by the path calculation circuit 2350 is the branch destination No. 1 of the asynchronous branching module (step F13) as a result of selection of the transfer branch destination, the congestion avoiding path calculation circuit 2300 advances to step F16. In step F16, the divided data, the head signal, and the end signal stored in the data/head signal/end signal storage latch 2362 and the transfer branch destination signal indicative of the branch destination No. 1 stored in the transfer branch destination storage latch 2360 are output. The congestion avoiding path calculation circuit 2300 outputs the data request signal from the storage control circuit 2361 (step F16).

When a data acknowledge signal to the output data request signal is received (step F17), the congestion avoiding path calculation circuit 2300 outputs the data acknowledge signal (step F18). After that, the congestion avoiding path calculation circuit 2300 returns to step F1 (initial state).

When the data transfer request is received (step F1) and the head signal Hi supplied in parallel with the data transfer request does not indicate that the divided data being transferred is not the head of a data stream (step F6), the congestion avoiding path calculation circuit 2300 advances to step F14. The path calculation circuit 2350 determines the same transfer branch destination as that of the transfer branch destination signal stored in the transfer branch destination storage latch 2360 in the immediately preceding data transfer as the transfer branch destination (step F14).

When the data request signal is received via the handshake partial arbitration circuit 2330, the storage control circuit 2361 sends a storage control signal to the transfer branch destination storage latch 2360 and the data/head signal/end signal storage latch 2362. When the storage control signal is received, the transfer branch destination storage latch 2360 stores the transfer branch destination determined by the path calculation circuit 2350, and the data/head signal/end signal storage latch 2362 stores the divided data, the head signal Hi, and the end signal Ei supplied together with the data request signal.

When the transfer branch destination determined by the path calculation circuit 2350 is the branch destination No. 0 of the asynchronous branching module (step F14), the congestion avoiding path calculation circuit 2300 advances to step F15. In step F15 the divided data, the head signal Hi, and the end signal Ei stored in the data/head signal/end signal storage latch 2362 and the transfer branch destination signal indicative of the branch destination No. 0 stored in the transfer branch destination storage latch 2360 are output. The congestion avoiding path calculation circuit 2300 outputs the data request signal from the storage control circuit 2361 (step F15).

When the transfer branch destination determined by the path calculation circuit 2350 is the branch destination No. 1 of the asynchronous branching module (step F14), the congestion avoiding path calculation circuit 2300 advances to step F16. In step F16, the divided data, the head signal Hi, and the end signal Ei stored in the data/head signal/end signal storage latch 2362 and the transfer branch destination signal indicative of the branch destination No. 1 stored in the transfer branch destination storage latch 2360 are output. The congestion avoiding path calculation circuit 2300 outputs the data request signal from the storage control circuit 2361 (step F16).

When the data acknowledge signal to the data request signal which is output is received (step F17), the congestion avoiding path calculation circuit 2300 outputs the data acknowledge signal (step F18). After that, the congestion avoiding path calculation circuit 2300 returns to step F1 (initial state).

The case where the asynchronous inter-core connection circuit 600 transfers a data stream including the data 681 to 683 from the master B 603 to the slave B 604 in FIG. 6 will now be considered. It is assumed that the data stream includes data preceding to the data 681 and data subsequent to the data 683 and that, in the asynchronous inter-core connection circuit 600, the asynchronous arbitration circuit 612 is occupied and data is transferred from the master B 603 to the slave B 604. The case where the asynchronous inter-core connection circuit 600 transfers a data stream made by data 691 to 694 from the master A 601 to the slave A 602 in such a state will be considered.

The congestion avoiding path calculation circuit 631 receives the congestion information from the congestion detection modules 632 and 642. With transfer of the data 681 to 683, the congestion avoiding path calculation module 631 receives information indicative of the presence of congestion from the congestion detection module 632. The congestion avoiding path calculation module 631 receives, since there is no data transfer, information indicative of the absence of congestion from the congestion detection module 642. The congestion avoiding path calculation circuit 631 stores the received congestion information (steps F1 to F5 in FIG. 20).

When the head divided data 691 is received (step F6), the congestion avoiding path calculation module 31 determines a branch destination toward the asynchronous arbitration circuit 622 as a transfer branch destination (steps F7 to F13) by operations similar to those described in the first example. The congestion avoiding path calculation module 631 stores the determined transfer branch destination to the inside and outputs the stored transfer branch destination to the asynchronous branching module 611 (step F15 or F16). When the data acknowledge signal is received from the asynchronous branching module 611 (step F17), the congestion avoiding path calculation module 631 outputs the data acknowledge signal to the latch and the storage control circuit existing between the module and the master A (step F18).

The congestion avoiding path calculation module 631 receives the intermediate divided data 692 subsequent to the head divided data 691 (step F6). The congestion avoiding path calculation module 631 refers to the head signal. Since the head signal indicates that the divided data to be transferred is not the head divided data, the congestion avoiding path calculation module 631 advances from step F6 to step F14. The congestion avoiding path calculation module 631 determines the transfer branch destination of the immediately preceding data transfer stored internally as the transfer branch destination of the divided data 692 and outputs it to the asynchronous branching module (step F14 and step F15 or 16). When a data acknowledge signal is received from the asynchronous branching module 611 (step F17), the congestion avoiding path calculation module 631 outputs the data acknowledge signal to the latch and the storage control circuit existing between the module and the master A (step F18).

Also in the case where intermediate of end divided data 693 or 694 is received, the congestion avoiding path calculation module 631 determines the transfer branch destination of the immediately preceding data transfer by operations similar to the above. The congestion avoiding path calculation module 631 outputs a transfer branch destination to the asynchronous branching module 611 and, when the data acknowledge signal is received from the asynchronous branching module 611, outputs a data acknowledge signal to the latch and the storage control circuit existing between the module and the master A.

In the example, the asynchronous arbitration circuit 2100 stores the arbitration result by using the asynchronous 3-input C elements 2160 and 2161. The asymmetric 3-input C elements 2160 and 2161 maintain the arbitration result, thereby enabling an output of the mutually-exclusive circuit 2110 to be maintained at the time of transfer of divided data which is not the end data of the data stream. By maintaining the output of the mutually-exclusive circuit 2110, the data transfer request from the merge source which is transferring data can be continuously processed, and waiting for the data transfer request from the merge source waiting for transfer can be continued. Therefore, a unit data stream made by data to the same destination can be continuously transferred from a merge source to a merge destination without being interrupted by other data transfer in a place where transfer data pieces from a plurality of merge sources merge.

In contrast to the above, the asynchronous arbitration circuit 900 used in the first example shown in FIG. 9 does not have the part storing the arbitration result and does not have the function of changing the arbitration result during transfer of a data stream. During transfer of divided data which is not at end divided data from one of merge sources, when a data transfer request is received from another merge source, after completion of the transfer of the divided data which is not end divided data from the one of merge sources, the asynchronous arbitration circuit 900 starts transferring data from the another merge source. Consequently, the asynchronous arbitration circuit 900 used in the first example cannot transfer a unit data stream without interrupted by another data transfer. In the second example, the asynchronous arbitration circuit 2100 illustrated in FIG. 21 is used as the asynchronous arbitration module, so that a unit data stream can be transferred without being interrupted by another data transfer.

In the example, the congestion avoiding path calculation circuit 2300 determines a transfer branch destination at the time of transferring head divided data and stores it in the transfer branch destination storage latch 2360. In transfer of divided data subsequent to the head divided data, the congestion avoiding path calculation circuit 2300 determines a transfer branch destination stored in the transfer branch destination storage latch 2360 as a transfer destination of the divided data. In such a manner, the subsequent intermediate/end divided data can be branched and transferred to the same branch destination as the transfer branch destination of the head divided data of a data stream. Therefore, a unit data stream made by data to the same destination can be continuously transferred from a branch source to a branch destination without being interrupted by another data stream transfer in a branch place.

In contrast to the above, the congestion avoiding path calculation circuit 1300 used in the first example shown in FIG. 13 does not have the function of storing a transfer branch destination of head divided data. In the second data transfer method, the head divided data has destination information and the other divided data does not have destination information. Since the congestion avoiding path calculation circuit 1300 does not have the mechanism of storing a transfer branch destination determined for the head divided data, subsequent intermediate/end divided data cannot be branched and transferred to the same branch destination as the transfer branch destination of the head divided data of the data stream.

In the case of obtaining destination information by referring to a part in which the destination information is written in the head divided data, in the divided data having no destination information, there is the possibility that the destination information is erroneously recognized, and divided data subsequent to the head divided data to be branched to the same transfer destination is output to a different branch destination.

In FIG. 23, the congestion avoiding path calculation circuit 2300 has the transfer branch destination storage latch 2360, the storage control circuit 2361, and the data/head signal/end signal storage latch 2362. However, the components may not be provided. For example, the storage control circuit 2361 may not be used. A data request/data acknowledge signal which is supplied/output to/from the handshake partial arbitration circuit 2330 may be used as input/output signals of the congestion avoiding path calculation circuit 2300. The data/head signal/end signal storage latch 2362 may not be provided. The data/head signal/end signal supplied to the congestion avoiding path calculation circuit 2300 may be used as output signals of the congestion avoiding path calculation circuit 2300. Further, the transfer branch destination storage latch 2360 may not be provided. A selection output of the path calculation circuit 2350 may be used as an output signal of the congestion avoiding path calculation circuit 2300 and the output signal may be returned to the path calculation circuit 2350. In such a simplified configuration, a selected branch destination of head divided data can be stored, and the effect of the congestion avoiding path calculation circuit 2300 can be realized.

A third embodiment of the present invention will be described. The asynchronous logic circuit in the second embodiment transfers data to the same destination by a second data transfer method of combining destination information and transfer data, dividing the combined data in accordance with the data transfer path width, and transferring head divided data including destination information and non-head divided data as a unit data stream. In the case of employing the second data transfer method, a transfer branch destination is determined at the time of transferring head divided data, and divided data subsequent to the head divided data is transferred to the same transfer branch destination. Consequently, only at the time of transferring the head divided data, it is originally sufficient to transmit congestion information from the congestion detection module.

However, the asynchronous logic circuit in the second embodiment generates congestion information each time divided data in the same data stream is transmitted and sends the congestion information to an entire object of arbitration, so that power is wasted. In the congestion avoiding path calculation module, data is not transferred during updating of congestion information. Consequently, when congestion information is transmitted excessively and updating of the congestion information frequently occurs, it excessively causes temporarily stop of the data transfer. The third embodiment, therefore, provides an asynchronous logic circuit capable of suppressing occurrence of the problem by suppressing transmission of unnecessary congestion information.

The configuration of the asynchronous logic circuit of the third embodiment is similar to that of the asynchronous logic circuit of the first embodiment shown in FIG. 1. The operation of the congestion detection module 111 is different from that of the congestion detection module in the asynchronous logic circuit of the second embodiment. The other points are similar to those of the second embodiment.

Figure 24:
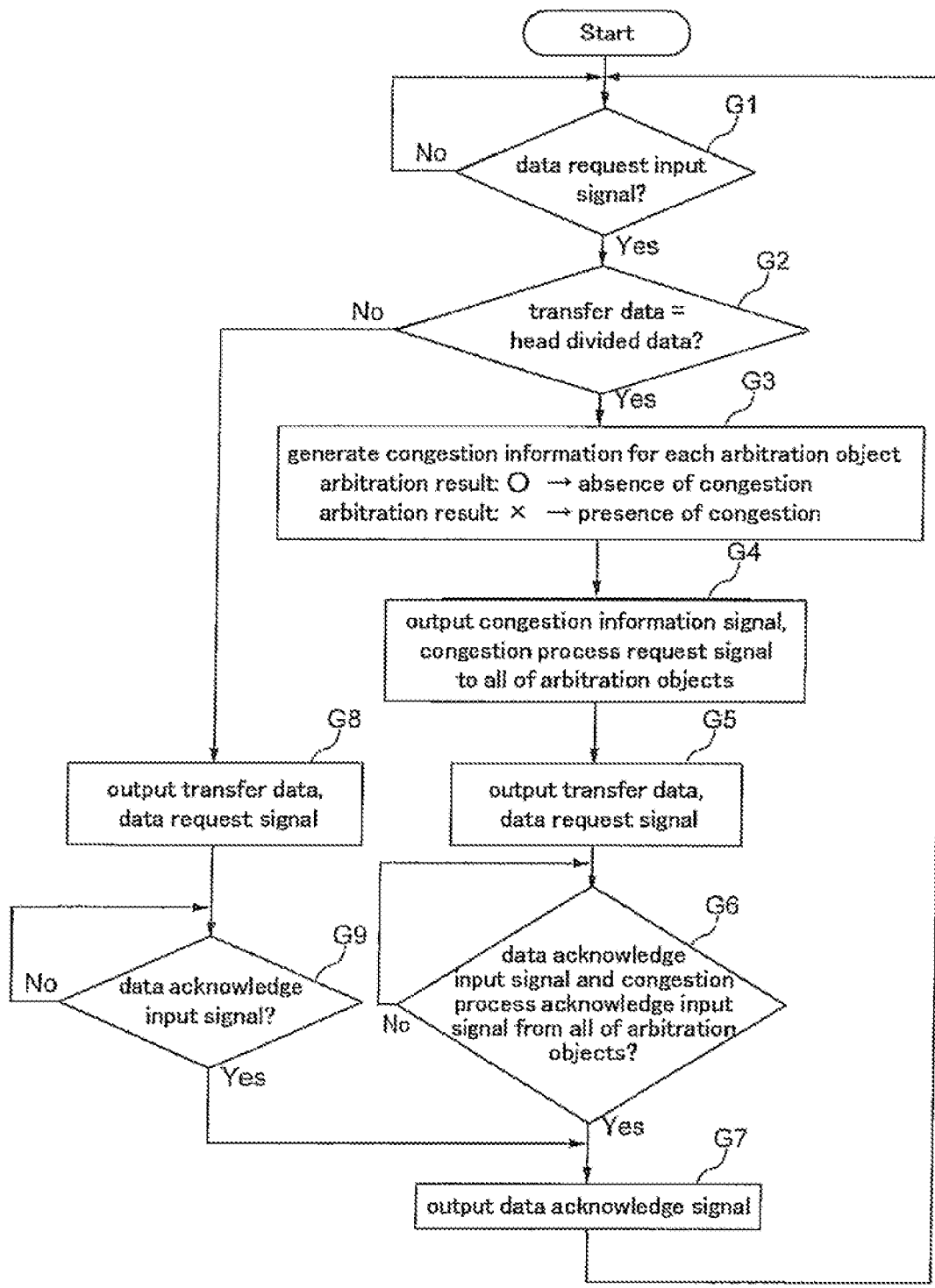
FIG. 24 is a flowchart showing the operation procedure of a congestion detection module in an asynchronous logic circuit of a third embodiment of the invention.

FIG. 24 illustrates the procedure of operation of the congestion detection module 111 in the embodiment. First, the congestion detection module 111 is in the initial state. The congestion detection module 111 determines whether the data request signal is supplied from the asynchronous arbitration module 101 to the data request input terminal or not (step G1). When the data request signal is not supplied, the congestion detection module 111 repeatedly executes step G1 and waits until the data request signal is supplied.

When the data request signal is received, the congestion detection module 111 determines whether the input divided data is the head of a unit data stream or not (step G2). In the case where the input divided, data is at the head of the unit data stream, the congestion detection module 111 generates a congestion information signal to each of arbitration objects, that is, each of merge sources of the asynchronous arbitration module 101 on the basis of an arbitration result signal supplied from the asynchronous arbitration module 101 via an arbitration result input terminal (step G3).

For example, when an arbitration result signal indicates that data of a merge source No. 0 is being output from a data output terminal, the congestion detection module 111 generates a congestion information signal indicative of "absence of congestion" to the merge source No. 0 and generates a congestion information signal indicative of "presence of congestion" to the merge source No. 1. On the contrary, when an arbitration result signal indicates that data of the merge source No. 1 is being output from the data output terminal, the congestion detection module 111 generates a congestion information signal indicative of "presence of congestion" to the merge source No. 0 and generates a congestion information signal indicative of "absence of congestion" to the merge source No. 1.

The congestion detection module 111 outputs the generated congestion information signal and a congestion process request signal to each of arbitration objects (step G4). In step G4, the congestion detection module 111 outputs the congestion information signal and the congestion process request signal corresponding to the merge source No. 0 from a congestion information output terminal and a congestion process request output terminal corresponding to the merge source No. 0, respectively. The congestion detection module 111 outputs the congestion information signal and the congestion process request signal corresponding to the merge source No. 1 from a congestion information output terminal and a congestion process request output terminal corresponding to the merge source No. 1, respectively.

The congestion detection module 111 outputs divided data received from the asynchronous arbitration module 101 via a data input terminal and a data request signal received via a data request input terminal from a data output terminal and a data request output terminal, respectively (step G5). When the asynchronous arbitration module 101 outputs transfer data from the merge source No. 0 in step E3 of FIG. 19, the congestion detection module 111 outputs the transfer data from the merge source No. 0 from the data output terminal. When the asynchronous arbitration module 101 outputs transfer data from the merge source No. 1 in step E7, the congestion detection module 111 outputs the transfer data from the merge source No. 1 from the data output terminal.

The congestion detection module 111 waits for a data acknowledge signal to the data request signal which is output in step G5 and a congestion process acknowledge signal to the congestion process request signal which is output to each of the merge sources in step G4 (step G6). The congestion detection module 111 determines whether or not the congestion process acknowledge signal to the congestion process request signal which is output in step G4 is supplied to a congestion process acknowledge input terminal corresponding to each of the merge sources. The congestion detection module 111 determines whether or not the data acknowledge signal to the data request signal which is output in step G5 is supplied to a data acknowledge input terminal.

When it is determined that the congestion process acknowledge signal is not received from all of the merge sources or that the data acknowledge signal is not received, the congestion detection module 111 repeatedly executes step G6 and waits until the congestion process acknowledge signal and the data acknowledge signal are supplied. When the congestion process acknowledge signal is received from all of the merge sources or that the data acknowledge signal is received, the congestion detection module 111 outputs the data acknowledge signal from the data acknowledge output terminal to the asynchronous arbitration module 101 (step G7). After that, the congestion detection module 111 withdraws the data request signal which is supplied and withdraws the data acknowledge signal which is output and returns to step G1 (initial state).

When it is determined in step G2 that the input divided data is not the head of a unit data stream, the congestion detection module 111 advances to step G8. In step G8, divided data which is received from the asynchronous arbitration module 101 via the data input terminal and a data request signal received via the data request input terminal are output from a data output terminal and a data request output terminal, respectively. When the asynchronous arbitration module 101 outputs transfer data from the merge source No. 0 in step E3, the congestion detection module 111 outputs transfer data from the merge source No. 0 from the data output terminal. When the asynchronous arbitration module 101 outputs transfer data from the merge source No. 1 in step E7, the congestion detection module 111 outputs transfer data from the merge source No. 1 from the data output terminal.

The congestion detection module 111 waits until a data acknowledge signal to the data request signal which is output in step G5 is received (step G9). When the data acknowledge signal is received, the congestion detection module 111 advances to step G7, and outputs a data acknowledge signal from the data acknowledge output terminal to the asynchronous arbitration module 101. After that, the congestion detection module 111 withdraws the data request signal which is input and the data acknowledge signal which is output and returns to step G1 (initial state).

When the transfer data is the head divided data, the congestion detection module 111 outputs a congestion process request to the congestion avoiding path calculation module 112 of the merge source of the asynchronous arbitration module 101. When the transfer data is divided data which is not the head divided data, the congestion detection module 111 does not output the congestion process request signal. In such a manner, an operation of updating the congestion information stored in the congestion avoiding path calculation module 112 at the time of transfer of the head divided data and leaving the congestion information at the time of transfer of the divided data which is not the head divided data can be realized. By performing such an operation, power consumption accompanying unnecessary updating of the congestion information can be reduced. In addition, temporary stop of the transfer data caused by unnecessary updating of the congestion information in the congestion avoiding path calculation module 112 can be avoided.

A third example will now be described. A connection form of circuits in the asynchronous inter-core connection circuit included in the semiconductor circuit of the example is similar to that of the circuits in the asynchronous inter-core connection circuit 600 shown in FIG. 6. As the asynchronous branching module 611, like in the first example, the asynchronous branching circuit 700 having the circuit configuration shown in FIG. 7 can be used. As the asynchronous arbitration modules 612, 614, and 622, the asynchronous arbitration module 2100 having the circuit configuration shown in FIG. 21 can be used. As the congestion avoiding p path calculation module 631, the congestion avoiding path calculation circuit 2300 illustrated in FIG. 23 can be used.

Figure 25:
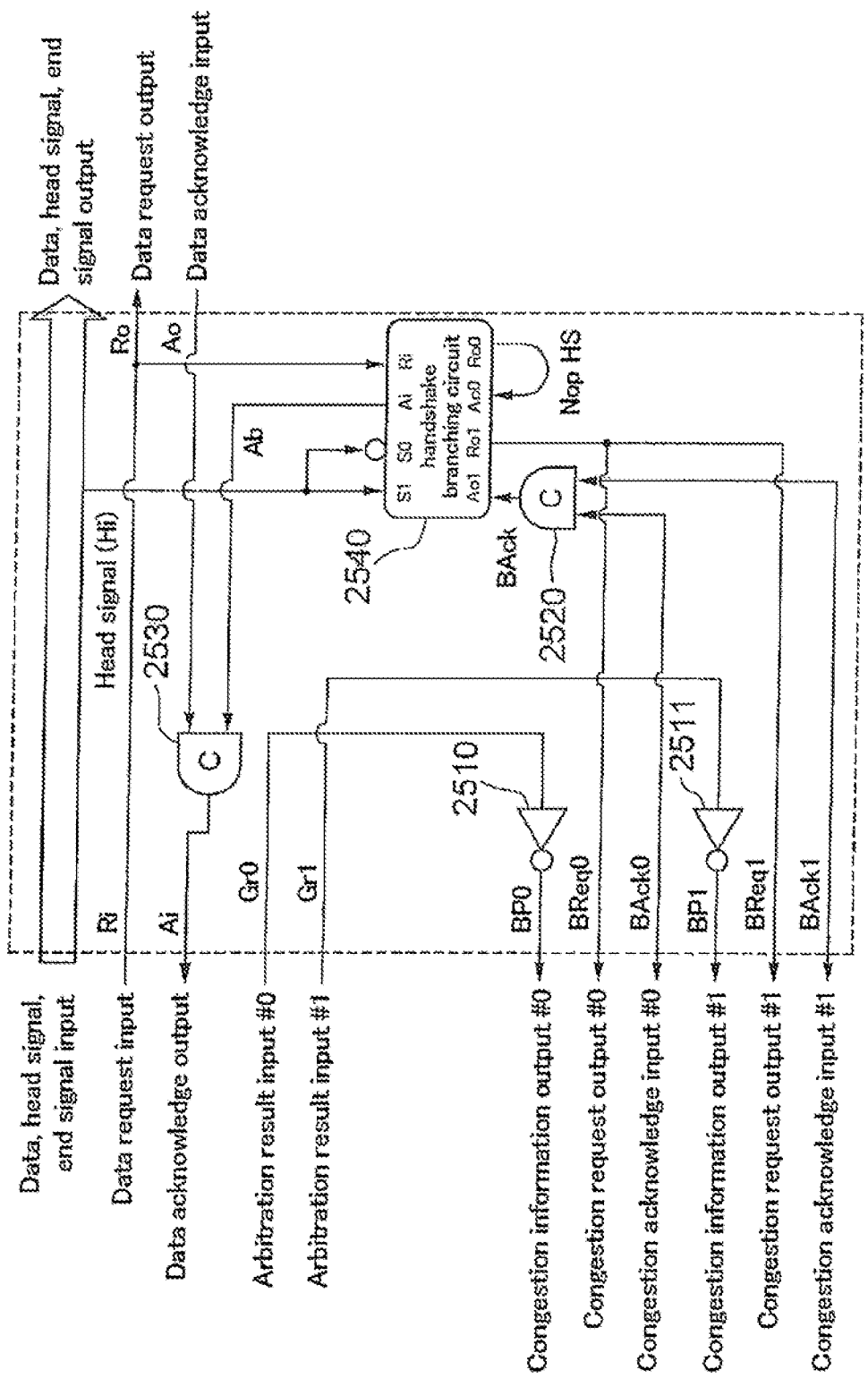
FIG. 25 is a block diagram showing an example of the circuit configuration of the congestion detection module.

In the example, as the congestion detection modules 632 and 642, in place of the congestion detection circuit 1200 having the circuit configuration shown in FIG. 12, a congestion detection circuit which does not generate and transmit congestion information to divided data which is not head divided data is used. FIG. 25 illustrates an example of the circuit configuration of the congestion detection module. Each of the congestion detection modules 632 and 634 can be constructed by a congestion detection circuit 2500 illustrated in FIG. 25. The congestion detection circuit 2500 has inverters 2510 and 2511, symmetric 2-input C elements 2520 and 2530, and a handshake branching circuit (handshake branching module) 2540.

The congestion detection circuit 2500 brunches a data request signal Ri, outputs one of the brunched signals as a data request signal Ro, and supplies the other signal to the handshake branching circuit 2540. The inverters 2510 and 2511 invert arbitration result signals Gr0 and Gr1 output from the asynchronous arbitration module and output the inverted signals as congestion information BP0 and BP1, respectively.

The handshake branching circuit 2540 is constructed by a part obtained by eliminating the data transfer path from the configuration of the asynchronous branching circuit 700 illustrated in FIG. 7. When the asynchronous arbitration module outputs the data request signal and transfer data is head divided data, the handshake branching circuit 2540 outputs a congestion process request signal to a merge source of the asynchronous arbitration module. When the transfer data is not the head divided data, the handshake branching circuit 2540 outputs a request signal which is fed back as an acknowledge signal to the circuit itself.

The handshake branching circuit 2540 has two selection signal input terminals (S0, S1). The handshake branching circuit 2540 has two branch destinations and two sets each made of a request signal output terminal and an acknowledge signal input terminal. One of the selection signals supplied to the selection signal input terminals S0 and S1 is 1, and the other is 0. The handshake branching circuit 2540 outputs a request signal to any of the two branch destinations in accordance with the input selection signals, and receives an acknowledge signal from the branch destination to which the request signal is output.

An inversion signal of a head signal Hi is supplied to the selection signal input terminal S0 in the handshake branching circuit 2540, and an inversion signal of the head signal Hi is supplied to the selection signal input terminal S1. One (Ro1) of the request output terminals of the handshake branching circuit 2540 is connected to two congestion request output terminals BRq0 and BRq1 of the congestion detection circuit 2500, and the request input terminal Ao1 is connected to the output of the symmetric 2-input C element 2520. The other request output terminal (Ro0) is connected to the request input terminal Ao0. To the request input terminal Ri of the handshake branching circuit 2540, the data request signal Ri which is supplied to the congestion detection circuit 2500 is supplied. The acknowledge output terminal Ai of the handshake branching circuit 2540 is connected to one of input terminals of the symmetric 2-input C element 2530.

In the case where transfer data supplied from the asynchronous arbitration module is head divided data, when the data request signal is supplied to the request input terminal Ri, the handshake branching circuit 2540 outputs the congestion process request signals BReq0 and BReq1 from the request output terminal Ro1 to the merge sources Nos. 0 and 1 of the asynchronous arbitration module. When the congestion process request signals are received, the congestion avoiding path calculation circuits 2300 (FIG. 23) corresponding to the merge sources Nos. 0 and 1 store the congestion information and output congestion process acknowledge signals BAck0 and BAck1, respectively.

The symmetric 2-input C element 2520 can be constructed by the logic circuit (symmetric 2-input C element) 1100 shown in FIG. 11. The relations among the inputs (A and B) of the symmetric 2-input C element 1100 and the output (Y) are as shown by the truth table 1150. One of inputs of the symmetric 2-input C element 2520 is connected to a congestion acknowledge input terminal from the merge source No. 0, and the other input is connected to a congestion acknowledge input terminal from the merge source No. 1. The symmetric 2-input C element 2520 waits for the congestion acknowledge signal BAck0 from the merge source No. 0 and the congestion acknowledge signal BAck1 from the merge source No. 1 and outputs the acknowledge signal BAck.

On the other hand, when transfer data supplied from the asynchronous arbitration module is not head divided data, the handshake branching circuit 2540 outputs a request signal NopHS which is fed back to itself from the request output terminal Ro0. The handshake branching circuit 2540 receives the output signal NopHS from the acknowledge input terminal Ao0. When NopHS is supplied to the acknowledge signal input terminal Ao0 or when the signal BAck is supplied from the symmetric 2-input C element 250 to the acknowledge signal input terminal Ao1, the handshake branching circuit 2540 outputs a signal Ab from the acknowledge signal output terminal Ai.

The symmetric 2-input C element 2530 can be constructed by the logic circuit (symmetric 2-input C element) 1100 shown in FIG. 11. The relations among the inputs (A and B) of the symmetric 2-input C element 1100 and the output (Y) are as shown by the truth table 1150. One of inputs of the symmetric 2-input C element 2530 is connected to the dam acknowledge signal Ao which is supplied to the congestion detection circuit 2500, and the other input is connected to the acknowledge output terminal Ai of the handshake branching circuit 2540. The symmetric 2-input C element 2530 waits for the data acknowledge signal Ao and the signal Ab output from the handshake branching circuit 2540. When both of the signals are detected, the congestion detection circuit 2500 outputs the data acknowledge signal Ai=1 from the symmetric 2-input C element 2530.

In the circuit configuration of the congestion detection circuit 2500, a part outputting the data request signal received from the asynchronous arbitration module to the merge destination of the asynchronous arbitration module and a part branching the data request signal to the congestion process request signals, inverting the arbitration result signals by the inverters 2510 and 2511, and outputting the inverted signals as the congestion information signals correspond to a request output module. When the asynchronous arbitration module outputs the data request signal, the parts output the data request signal to the merge destination and output the congestion information and the congestion process request signal to the congestion avoiding path calculation module existing in the merge source. After outputting the data request signal and the congestion information storage request signal, the symmetric 2-input C elements 2520 and 2530 wait both the data acknowledge signal from the merge destination and the congestion process acknowledge signal from the congestion avoiding path calculation module. When the data acknowledge signal and the congestion information storage acknowledge signal are received, the symmetric 2-input C elements 2520 and 2530 output the data acknowledge signal to the asynchronous arbitration module. That is, the symmetric 2-input C elements 2520 and 2530 correspond to the acknowledge waiting modules.

The operations of the parts in the congestion detection circuit 2500 in FIG. 25 will be described in correspondence with the flowchart of FIG. 24. In the initial state, signals supplied to the congestion detection circuit 2500 are the data request signal Ri=0, the data acknowledge signal Ao=0, and the congestion process acknowledge signals BAck0=0 and BAck1=0. Signals output from the congestion detection circuit 2500 are the data request signal Ro=0, the data acknowledge signal Ai=0, and the congestion process request signals BReq=0 and BReq1=0. The states of the arbitration result signals Gr0 and Gr1 and the congestion information signals BP0 and BP1 are arbitrary.

When the data request signal Ri is 0, the congestion detection circuit 2500 waits until the data request signal Ri=1 is received from the asynchronous arbitration module (step G1 in FIG. 24). When the data request signal Ri becomes 1, the congestion detection circuit 2500 determines whether the input transfer data is head divided data or not on the basis of the head signal Hi (step G2). When the head signal Hi is 1, that is, when the transfer data is head divided data, signals (S0, S1) supplied to the selection signal input terminals of the handshake branching circuit 2540 become (1, 0). On the other hand, when the head signal Hi is 0, the signals (S0, S1) supplied to the selection signal input terminals of the handshake branching circuit 2540 become (0, 1).

When the transfer data is the head divided data, the congestion detection circuit 2500 generates the congestion information signals BP0 and BP1 (step G3). The congestion detection circuit 2500 generates congestion information in accordance with whether the asynchronous arbitration module outputs transfer data from any of merge sources. When the asynchronous arbitration module outputs the transfer data from the merge source No. 0, the data of the merge source No. 0 is not retained but is transferred, so that the congestion detection circuit 2500 generates congestion information indicative of absence of congestion to the merge source No. 0. On the other hand, the data of the merge source No. 1 is retained, so that the congestion detection circuit 2500 generates congestion information indicative of the presence of congestion to the merge source No. 1. On the contrary, when the asynchronous arbitration module outputs the transfer data from the merge source No. 1, the congestion detection circuit 2500 generates congestion information indicative of the presence of congestion to the merge source No. 0 and generates congestion information indicative of the absence of congestion to the merge source No. 1.

The congestion detection circuit 2500 inverts the arbitration result signals Gr0 and Gr1 by the inverters 2510 and 2511 to generate the congestion information signals BP0 and BP1, respectively. When the arbitration result signals (Gr0, Gr1) are (1,0), that is, when the asynchronous arbitration module outputs the transfer data received from the merge source No. 0, the congestion detection circuit 2500 sets the signal BP0=0 (absence of congestion) obtained by inverting Gr0 by the inverter 2510 as the congestion information signal corresponding to the merge source No. 0, and sets the signal BP1=1 (presence of congestion) obtained by inverting Gr1 by the inverter 2511 as the congestion information signal corresponding to the merge source No. 1. When the asynchronous arbitration module outputs the transfer data received from the merge source No. 1, that is, when the arbitration result signals (Gr0, Gr1)=(0, 1), the congestion detection circuit 2500 sets the signal BP0=1 (presence of congestion) obtained by inverting Gr0 by the inverter 2510 as the congestion information signal corresponding to the merge source No. 0, and sets the signal BP1=0 (absence of congestion) obtained by inverting Gr1 by the inverter 2511 as the congestion information signal corresponding to the merge source No. 1.

The congestion detection circuit 2500 outputs the congestion information signals BP0 and BP1 to the merge sources Nos. 0 and 1, respectively. The congestion detection circuit 2500 branches the data request signal Ri=1 and outputs branched signals to the handshake branching circuit 2540. Since the head signal Hi is 1, when the data request signal Ri=1 is received, the handshake branching circuit 2540 outputs the congestion process request signals BReq0=1 and BReq1=1 from the request output terminal Ro1 to the merge sources Nos. 0 and 1, respectively (step G4). At this time, the handshake branching circuit 2540 outputs NopHS=0 from the request output terminal Ro0 and receives NopHS=0 from the acknowledge input terminal Ao0.

In parallel with outputting of the congestion information signal and the congestion process request signal, the congestion detection circuit 2500 outputs the transfer data and the data request signal Ro=1 to the merge destination of the asynchronous arbitration module (step G5). The merge destination of the asynchronous arbitration module receives the data request signal Ro=1 and, after that, outputs the data acknowledge signal Ai=1 to the congestion detection circuit 2500. After outputting the data request signal Ro=1 and the congestion process request signals BReq0=1 and BReq1=1, the congestion detection circuit 2500 waits for the data acknowledge signal and the congestion process acknowledge signal. The congestion detection circuit 2500 waits until the data acknowledge signal Ao=1 and the congestion process acknowledge signals BAck0=1 and BAck1=1 are received (step G6).

The symmetric 2-input C element 2520 of the congestion detection circuit 2500 waits for both the congestion process acknowledge signals from the merge sources Nos. 0 and 1 and, when BAck0=1 and BAck1=1 are received, outputs the signal BAck=1. When BAck=1 is received from the data acknowledge input terminal Ao1, the handshake branching circuit 2540 outputs a signal Ab=1 from the acknowledge output terminal Ai. The symmetric 2-input C element 2530 waits for both the data acknowledge signal Ao=1 and the signal Ab=1. When the data acknowledge signal Ao=1 and the signal Ab=1 are supplied to the symmetric 2-input C element 2530, the congestion detection circuit 2500 outputs the data acknowledge signal Ai=1 (step G7).

When the congestion detection circuit 2500 outputs the data acknowledge signal Ai=1 to the asynchronous arbitration module, the data request signal Ri received from the asynchronous arbitration module is withdrawn and becomes 0. When the data request signal Ri is withdrawn and becomes 0, the congestion detection circuit 2500 withdraws the data request signal Ro which is output to the branch destination of the asynchronous arbitration module and sets Ro=0. The congestion detection circuit 2500 branches the data request signal and supplies Ri=0 to the handshake branching circuit 2540.

When the data request input signal supplied from the request input terminal Ri is withdrawn, the handshake branching circuit 2540 withdraws the congestion process request signal which is output from the request output terminal Ro1 to the merge sources Nos. 0 and 1 to set Brek0=0 and BReq1=0. After withdrawal of the congestion process request signal, the symmetric 2-input C element 2520 waits for both the congestion process acknowledge signals BAck=0 and BAck1=0 from the merge sources Nos. 0 and 1 and outputs BAck=0. When BAck=0 is obtained, the handshake branching circuit 2540 outputs the signal Ab=0.

After the data request signal is withdrawn, the merge destination of the asynchronous arbitration module withdraws the data acknowledge signal, and supplies Ai=0 to the congestion detection circuit 2500. The symmetric 2-input C element 2530 waits for both the data acknowledge signal Ao=0 and the signal Ab=0 from the merge destination of the asynchronous arbitration module and outputs the data acknowledge signal Ai=0 to the asynchronous arbitration module. After that, the congestion detection circuit 2500 returns to the initial state.

In the case where the head signal Hi=0, that is, in the case where it is determined that the input transfer data is not head divided data, when the data request signal Ri=1 is branched and supplied to the handshake branching circuit 2540, the handshake branching circuit 2540 outputs NopHS=1 from the request output terminal Ro0. The handshake branching circuit 2540 receives the returned signal NopHS=1 from the acknowledge input terminal Ao0. The congestion process request signals which are output from the handshake branching circuit 2540 from the request output terminal Ro1 to the merge sources Nos. 0 and 1 are BReq=0 and BReq1=0. That is, the congestion detection circuit 2500 does not require the congestion avoiding path calculation module in the merge source to store congestion information.

When the head signal Hi is 0, without outputting the congestion process request signal, the congestion detection circuit 2500 outputs the transfer data and the data request signal Ro=1 to the merge destination of the asynchronous arbitration module (step G8). After outputting the data request signal Ro=1, the congestion detection circuit 2500 waits until the data acknowledge signal Ao=1 is received (step G9). The handshake branching circuit 2540 sends NopHS=1 back from the acknowledge input terminal Ao0 and receives it. After reception of NopHS=1, the handshake branching circuit 2540 outputs Ab=1 to the symmetric 2-input C element 2530. Immediately after receipt of the data request signal Ri=1, one of the inputs of the symmetric 2-input C element 2530 becomes Ab=1. Consequently, in practice, it is sufficient for the congestion detection circuit 2500 to wait for the data acknowledge signal Ao=1 from the merge destination of the asynchronous arbitration module.

When the data acknowledge signal Ao=1 is received from the merge destination of the asynchronous arbitration module, the congestion detection circuit 2500 outputs the data acknowledge signal Ai=1 from the symmetric 2-input C element 2530 to the asynchronous arbitration module (step G7). After the congestion detection circuit 2500 outputs the data acknowledge signal Ai=1, the data request signal supplied from the asynchronous arbitration module is withdrawn (Ri=0). When the data request signal is withdrawn (Ri=0), the congestion detection circuit 2500 withdraws the data request signal to be output to the branch destination of the asynchronous arbitration module (Ro=0). The congestion detection circuit 2500 branches the data request signal and supplies Ri=0 to the handshake branching circuit 2540.

When the data request input signal received from the request input terminal Ri is withdrawn, the handshake branching circuit 2540 outputs NopHS=0 from the request output terminal Ro0 and returns it to the request input terminal Ao0. After NopHS=0 is returned and received by the request input terminal Ao0, the handshake branching circuit 2540 outputs Ab=0 from the acknowledge output terminal Ai.

After the data request signal is withdrawn, the merge destination of the asynchronous arbitration module withdraws the data acknowledge signal, and Ai=0 is supplied to the congestion detection circuit 2500. The symmetric 2-input C element 2530 waits for both the data acknowledge signal Ao=0 and the signal Ab=0 from the merge destination of the asynchronous arbitration module and outputs the data acknowledge signal Ai=0 to the asynchronous arbitration module. In this case as well, the signal Ab output from the handshake branching circuit 2540 becomes 0 without delay after withdrawal of the data request signal, so that the symmetric 2-input C element 2530 practically waits for the data acknowledge signal Ao=0. After outputting Ai=0, the congestion detection circuit 2500 returns to the initial state.

In the example, when the transfer data is head divided data, the handshake branching circuit 2540 transmits a congestion process request signal to the merge source of the asynchronous arbitration module to which the congestion detection circuit 2500 is connected. The symmetric 2-input C element 2520 waits for the congestion process acknowledge signal from the merge source of the asynchronous arbitration module and, when the congestion process acknowledge signals are received from two merge sources, outputs the acknowledge signal BAck=1 to the handshake branching circuit 2540. When the acknowledge signal BAck=1 is received, the handshake branching circuit 2540 outputs the signal Ab=1 to the symmetric 2-input C element 2530. On the other hand, when transfer data is divided data which is not the head divided data, the handshake branching circuit 2540 outputs the signal Ab=1 to the symmetric 2-input C element 2530 without transmitting the congestion process request signal.

By performing the above-described operation by the handshake branching circuit 2540, at the time of transferring the head divided data, the congestion detection circuit 2500 transfers data to a merge destination of the asynchronous arbitration module in accordance with the procedure determined by the handshake protocol while sending the congestion process request signal to the merge source of the asynchronous arbitration module. At the time of transferring divided data other than the head divided data, the congestion detection circuit 2500 transfers data in accordance with the procedure determined by the handshake protocol without outputting the congestion process request signal. At the time of transferring divided data other than the head divided data, the congestion detection circuit 2500 does not transmit the congestion process request signal to the merge source of the asynchronous arbitration module, so that useless updating of congestion information in the congestion avoiding path calculation module in the merge source can be avoided, and power consumption for updating the congestion information can be reduced. In addition, in the congestion avoiding path calculation module, as the number of times of updating the congestion information is reduced, the number of times of temporarily stopping data transfer is reduced, and decrease in data transfer speed accompanying updating the congestion information can be suppressed.

A fourth embodiment of the present invention will be described. In the asynchronous logic circuit in the third embodiment, the congestion information request signal is output at the time of transferring head divided data in a unit data stream but is not output at the time of transferring data other than the head divided data, thereby reducing power consumption and suppressing decrease in transfer speed. The asynchronous logic circuit in the third embodiment, however, has a problem such that also in a state where the transfer of the data stream is finished and data is not transferred in the asynchronous arbitration module, congestion information stored in the congestion avoiding path calculation module is not updated.

In the congestion detection module of the asynchronous logic circuit in the third embodiment, when data is transferred from a merge source of an asynchronous arbitration module, congestion information indicative of absence of congestion is transmitted to the merge source which is transferring data, and congestion information indicative of presence of congestion is transmitted to a merge source which is not transferring data. A situation that transfer of a data stream is completed, there is no transfer request for next data, and data transfer is not performed by the asynchronous arbitration module will be considered. At this time, since data is not head divided data, the congestion detection module does not output the congestion process request signal and, in spite of the fact that all of merge sources of the asynchronous arbitration module are not congested, does not require the merge source of the asynchronous arbitration module to change the congestion information. As a result, the congestion avoiding path calculation module calculates a path avoiding congestion which does not exist in reality.

For example, it is assumed that when a plurality of paths to a destination exist and there is no congestion in an asynchronous arbitration module, a path including the asynchronous arbitration module is an optimum path (path to be determined by the congestion avoiding path calculation module). However, although the asynchronous arbitration module is not congested in reality, if it indicates the presence of congestion since the congestion information is not updated, the congestion avoiding path calculation module cannot select a path including the asynchronous arbitration module. In this case, the congestion avoiding path calculation module cannot select an optimum path and has to select a path different from the optimum path. Consequently, decrease in the data transfer speed of the asynchronous logic circuit or the like occurs.

The above-described problem is caused in the case where the congestion avoiding path arbitration module sends a congestion process request signal only at the time of start of transfer of a data stream of the asynchronous arbitration module and does not send the congestion process request signal when the transfer of the data stream is finished and the congestion is over. Consequently, the fourth embodiment provides a congestion detection module which request updating of congestion information also on completion of transfer of a unit data stream.

The configuration of the asynchronous logic circuit of the fourth embodiment is similar to that of the asynchronous, logic circuit of the first embodiment illustrated in FIG. 1. However, the operation of the congestion detection module 111 is different from that of the congestion detection module 111 in the asynchronous logic circuit of the first embodiment. The other points are similar to those of the second embodiment.

Figure 26:
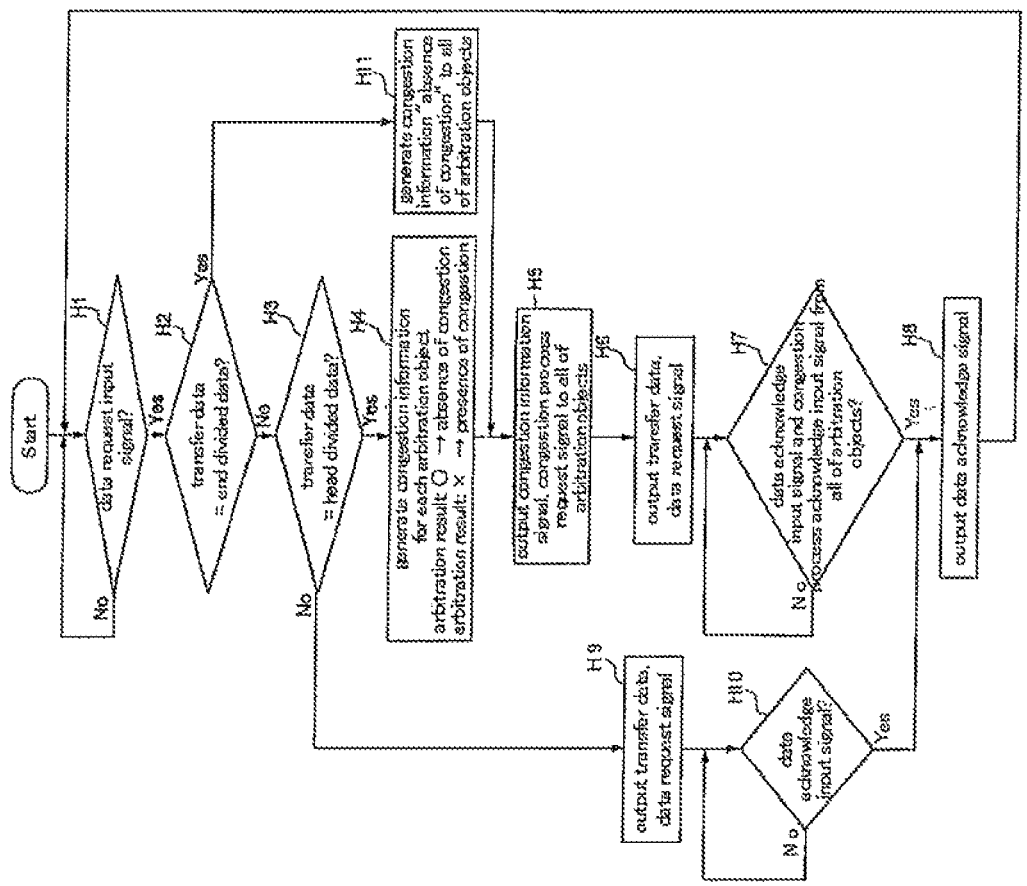
FIG. 26 is a flowchart showing the operation procedure of a congestion detection module in an asynchronous logic circuit of a fourth embodiment of the invention.

FIG. 26 illustrates the procedure of operations of the congestion detection module 111. First, the congestion detection module 111 is in the initial state. The congestion detection module 111 determines whether the data request signal is supplied from the asynchronous arbitration module 101 to the data request input terminal or not (step H1). When no data request signal is received, the congestion detection module 111 repeatedly executes step H1 and waits until the data request signal is received.

When the data request signal is received, the congestion detection module 111 determines whether the input divided data is at the end of a unit data stream or not (step H2). Operations (steps H3 to H10) performed when the congestion detection module 111 determines that the input divided data is not end divided data of the unit data stream are similar to those of the congestion detection module 111 in the third embodiment. That is, the steps H3 to H10 are similar to steps G2 to G9 in the flowchart shown in FIG. 24.

When it is determined in step H2 that the transfer data is end divided data, the congestion detection module 111 generates congestion information indicative of "absence of congestion" to all of merge sources of the asynchronous arbitration module 101 (step H11). After that, the congestion detection module 111 advances to step H5 and outputs the generated congestion information signal and a congestion process request signal to each of objects of arbitration. In step H5, the congestion detection module 111 outputs the congestion information signal indicative of absence of congestion and the congestion process request signal from a congestion information output terminal and a congestion process request output terminal corresponding to the merge source No. 0. The congestion detection module 111 outputs the congestion information signal indicative of absence of congestion and the congestion process request signal from the congestion information output terminal and the congestion process request output terminal corresponding to the merge source No. 1.

Operations after generation of congestion information indicative of absence of congestion to each of the merge sources in step H11 and output of the congestion information and the congestion process request signal in step H5 are similar to those in the case where the transfer data is head divided data. That is, the congestion detection module 111 outputs divided data and a data request signal to the asynchronous arbitration module 101 in step H6. In step H7, the congestion detection module 111 waits for a data acknowledge signal to the data request signal which is output in step H6 and a congestion process acknowledge signal to the data request signal which is output in step H6. When the data acknowledge signal is received and the congestion process acknowledge signals are received from all of the merge sources, in step H8, the congestion detection module 111 outputs the data acknowledge signal to the asynchronous arbitration module 101. After that, the congestion detection module 111 withdraws the data request signal which is received and the data acknowledge signal which is output and returns to step H1 (initial state).

When the transfer data is end divided data, the congestion detection module 111 generates a congestion signal indicative of absence of congestion to each of the merge sources of the asynchronous arbitration module 101, outputs the congestion process request signal to each of the merge sources, and updates congestion information stored in the congestion avoiding path calculation module 112 in the merge source to information indicative of absence of congestion. By such an operation, after transfer of the unit data stream, the congestion information becomes absence of congestion so that the asynchronous arbitration module 101 transmitting the congestion information indicative of absence of congestion can be used for other data transfer.

Next, a fourth example will be described. A connection form of circuits in the asynchronous inter-core connection circuit included in the semiconductor circuit of the example is similar to that of the circuits in the asynchronous inter-core connection circuit 600 shown in FIG. 6. As the asynchronous branching module 611, like in the first example, the asynchronous branching circuit 700 having the circuit configuration shown in FIG. 7 can be used. As the asynchronous arbitration modules 612, 614, and 622, the asynchronous arbitration circuit 2100 having the circuit configuration illustrated in FIG. 21 can be used. As the congestion avoiding path calculation module 631, the congestion avoiding path calculation circuit 2300 having the circuit configuration shown in FIG. 23 can be used.

Figure 27:
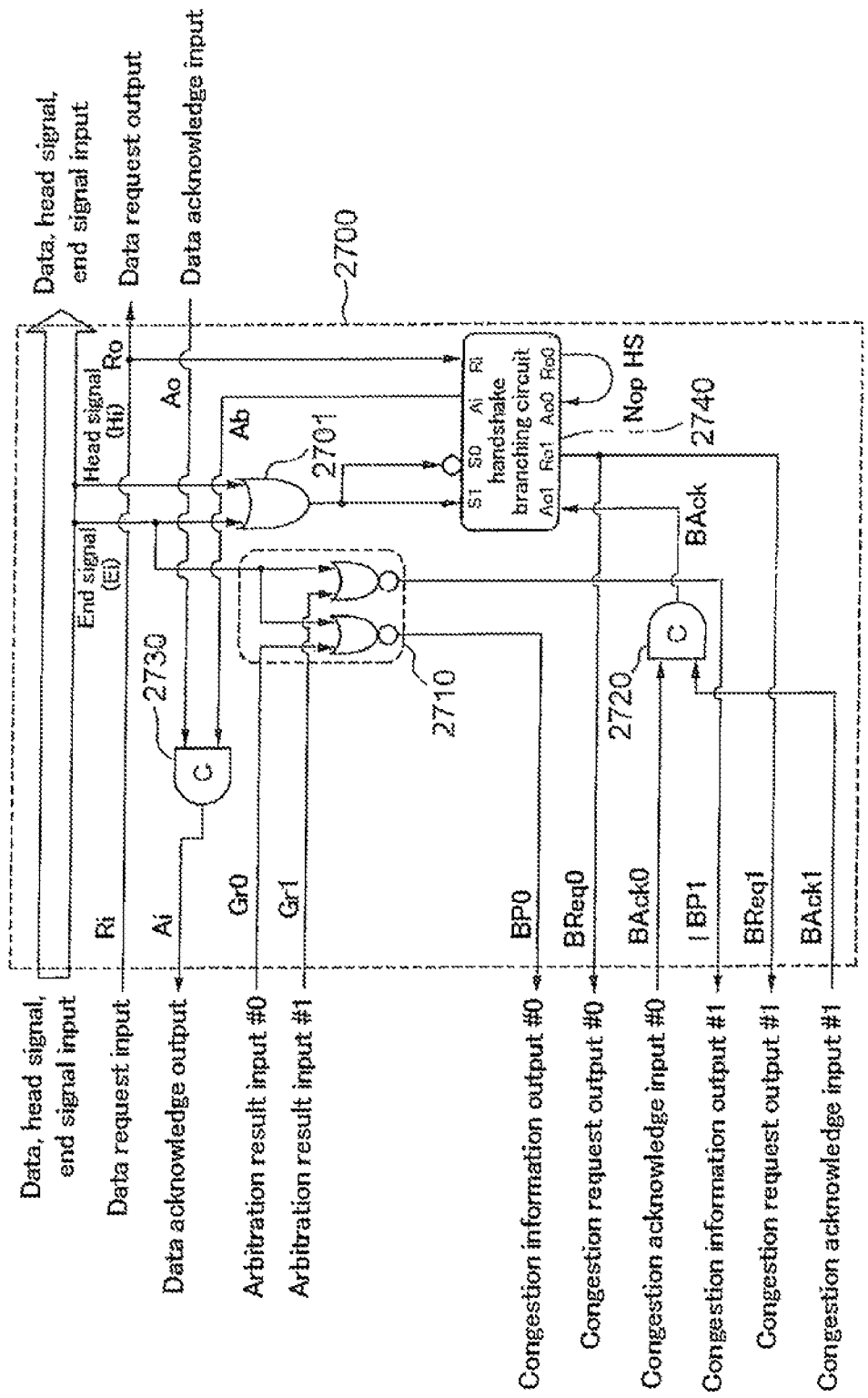
FIG. 27 is a block diagram illustrating an example of the circuit configuration of the congestion detection module.

In the example, as the congestion detection modules 632 and 642, in place of the congestion detection circuit 2500 having the circuit configuration illustrated in FIG. 25, a congestion detection circuit generating congestion information indicative of absence of congestion at the time of transferring end divided data is used. FIG. 27 illustrates an example of the circuit configuration of a congestion detection module. Each of the congestion detection modules 632 and 642 can be constructed by a congestion detection circuit 2700 illustrated in FIG. 27. The congestion detection circuit 2700 has an OR element 2701, a congestion information generation circuit (congestion information generation module) 2710, symmetric 2-input C elements 2720 and 2730, and a handshake branching circuit 2740. The symmetric 2-input C elements 2720 and 2730 and the handshake branching circuit 2740 are the same as the symmetric 2-input C elements 2520 and 2530 and the handshake branching circuit 2540, respectively, in the congestion detection circuit 2500 (FIG. 25) used in the third example.

In the example, in addition to the time of transfer of head divided data, also when transfer data is end divided data, the congestion detection circuit 2700 outputs a congestion process request signal to each of the merge sources of the asynchronous arbitration module. The OR element 2701 to calculate the OR between the head signal Hi and the end signal Ei, and an output signal of the OR element 2701 is supplied as a branch destination selection signal to the handshake branching circuit 2740. When the output of the OR element 2701 is 1, that is, when the transfer data is head divided data or end divided data, the handshake branching circuit 2740 outputs a congestion information storage request signal. When the output of the OR element 2701 is 0, that is, when the transfer data is intermediate divided data, the handshake branching circuit 2740 outputs a request signal which is fed back as an acknowledge signal to itself.

The congestion information generation circuit 2710 generates the congestion information signals BP0 and BP1 on the basis of the arbitration result signals (Gr0, Gr1) and the end signal Ei. When the end signal Ei is 0, that is, when divided data being transferred is head divided data or intermediate divided data, the congestion information generation circuit 2710 generates congestion information to each of merge sources of the asynchronous arbitration module. The congestion information generated is congestion information indicative of "absence of congestion" to a merge source transferring data on the basis of the arbitration result signals (Gr0, Gr1) and is congestion information indicative of "presence of congestion" to a merge source waiting for data transfer. When the end signal Ei is 1, that is, when the transfer data is end divided data, the congestion information generation circuit 2710 generates congestion information indicative of "absence of congestion) to all of merge sources of the asynchronous arbitration module.

When the transfer data is head divided data or intermediate divided data, if the arbitration result signals (Gr0, Gr1)=(1, 0), the congestion information generation circuit 2710 inverts the arbitration result signals and generates the congestion information signals (BP0, BP1)=(0, 1). When the transfer data is head divided data or intermediate divided data, if the arbitration result signals (Gr0, Gr1)=(0, 1), the congestion information generation circuit 2710 generates the congestion information signals (BP0, BP1)=(1, 0). When the transfer data is end divided data, also in the case where the asynchronous arbitration module transfers data from any of the merge sources, the congestion information generation circuit 2710 generates the congestion information signals (BP0, BP1)=(0, 0).

The operations of the parts in the congestion detection circuit 2700 in FIG. 27 will be described in correspondence with the flowchart of FIG. 26. In the initial state, signals supplied to the congestion detection circuit 2700 are the data request signal Ri=0, the data acknowledge signal. Ao=0, and the congestion process acknowledge signals BAck0=0 and BAck1=0. Signals output from the congestion detection circuit 2700 are the data request signal Ro=0, the data acknowledge signal Ai=0, and the congestion process request signals BReq=0 and BReq1=0. The states of the arbitration result signals Gr0 and Gr1 and the congestion information signal BP0 are arbitrary. When the data request signal Ri is 0, the congestion detection circuit 2700 waits until the data request signal Ri=1 is received from the asynchronous arbitration module (step H1 in FIG. 26).

When the data request signal Ri becomes 1, the congestion detection circuit 2700 determines whether the input transfer data is end divided data or not on the basis of the end signal Ei (step H2). When the end signal Ei is 0, the congestion detection circuit 2700 determines that input transfer data is not end divided data and, on the basis of the head signal Hi, determines whether the input transfer data is head dived data or not (step H3). When the head signal Hi is 1, the congestion detection circuit 2700 determines that input transfer data is head divided data. When the head signal Hi=1 is received, the OR element 2701 changes the output to 1. When the output signal of the OR element 2701 becomes 1, the signals (S0, S1) supplied to the selection signal input terminals of the handshake branching circuit 2740 become (1, 0).

When the head signal Hi is 1, the end signal Ei is 0, so that the congestion information generation circuit 2710 generates the congestion information signals BP0 and BP1 on the basis of the arbitration result signals (Gr0, Gr1) received from the asynchronous arbitration module (step H4). In step H4, the congestion detection circuit 2700 determines a merge source from which transfer data is output by the asynchronous arbitration module from the arbitration result signals (Gr0, Gr1). When the asynchronous arbitration module outputs the transfer data from the merge source No. 0, the data of the merge source No. 0 is not retained but is transferred, so that the congestion information generation circuit 2710 generates congestion information indicative of absence of congestion to the merge source No. 0. On the other hand, the data of the merge source No. 1 is retained, so that congestion information indicative of the presence of congestion is generated to the merge source No. 1. On the contrary, when the asynchronous arbitration module outputs the transfer data from the merge source No. 1, the congestion information generation circuit 2710 generates congestion information indicative of the presence of congestion to the merge source No. 0 and generates congestion information indicative of the absence of congestion to the merge source No. 1.

When the arbitration result signals (Gr0. Gr1) are (1,0), that is, when the asynchronous arbitration module outputs the transfer data received from the merge source No. 0, the end signal Ei is 0. Consequently, the congestion information generation circuit 2710 generates the signal BP0=0 (absence of congestion) as the congestion information signal corresponding to the merge source No. 0, and generates the signal BP1=1 (presence of congestion) as the congestion information signal corresponding to the merge source No. 1. When the arbitration result signals (Gr0, Gr1)=(0, 1), that is, when the asynchronous arbitration module outputs the transfer data received from the merge source No. 0, the end signal Ei is 0. Consequently, the congestion information generation circuit 2710 generates the signal BP0=1 (presence of congestion) as the congestion information signal corresponding to the merge source No. 0, and generates the signal BP1=0 (absence of congestion) as the congestion information signal corresponding to the merge source No. 1.

The congestion detection circuit 2700 outputs the congestion information signals BP0 and BP1 generated by the congestion information generation circuit 2710 to the merge sources Nos. 0 and 1, respectively of the asynchronous arbitration module. The congestion detection circuit 2700 branches the data request signal Ri=1 and supplies branched signals to the handshake branching circuit 2740. Since the signals (S0, S1) supplied to the selection signal input terminals of the handshake branching circuit 2740 are (1, 0), the handshake branching circuit 2740 outputs the congestion process request signals BReq=1 and BReq1=1 from the request output terminal Ro1 to the merge sources Nos. 0 and 1, respectively (step H5). In parallel with outputting of the congestion information signal and the congestion process request signal, the congestion detection circuit 2700 outputs the transfer data and the data request signal Ro=1 to the merge destination of the asynchronous arbitration module (step H6).

After outputting the data request signal Ro=1 and the congestion process request signals BReq=1 and BReq1=1, the congestion detection circuit 2700 waits until the data acknowledge signal Ao=1 and the congestion process acknowledge signals BAck0=1 and BAck1=1 are received (step H7). When the congestion process acknowledge signals BAck0=1 and BAck1=1 are received from the merge sources Nos. 0 and 1, the symmetric 2-input C element 2720 outputs the signal BAck=1 to the acknowledge input terminal Ao1 of the handshake branching circuit 2740. When BAck=1 in a state where the output of the OR element 2701 is 1, the handshake branching circuit 2740 outputs the signal Ab=1. The symmetric 2-input C element 2730 waits for both the data acknowledge signal Ao=1 and the signal Ab=1 and outputs the data acknowledge signal Ai=1 (step H8).

When the congestion detection circuit 2700 outputs the data acknowledge signal Ai=1 to the asynchronous arbitration module, the data request signal Ri received from the asynchronous arbitration module becomes 0. When the data request signal Ri is withdrawn and becomes 0, the handshake branching circuit 2740 withdraws the congestion process request signals which are output to the merge sources Nos. 0 and 1 and outputs BReq=0 and BReq=0. After withdrawal of the congestion process request signal, the symmetric 2-input C element 2720 waits for both the congestion process acknowledge signals BAck=0 and BAck1=0 from the merge sources Nos. 0 and 1 and outputs BAck=0.

When BAck=0 is received from the symmetric 2-input C element 2720, the handshake branching circuit 2740 outputs the signal Ab=0. The symmetric 2-input C element 2730 waits for both the data acknowledge signal Ao=0 and the signal Ab=0 from the merge destination of the asynchronous arbitration module and outputs the data acknowledge signal Ai=0 to the asynchronous arbitration module. The congestion detection circuit 2700 outputs the data acknowledge signal Ai=0 and returns to the initial state.

In the case where the end signal Ei=0 and the head signal Hi=0, that is, in the case where the input transfer data is not end divided data or head divided data, the OR element 2701 outputs 0, and the signals (S0, S1) supplied to the selection signal input terminals of the handshake branching circuit 2740 become (0, 1). In this case, when the data request signal Ri=1 is branched and supplied to the request input terminal Ri, the handshake branching circuit 2740 outputs NopHS=1 from the request output terminal Ro0. NopHS=1 which is output from the request output, terminal Ro0 is returned to the acknowledge input terminal Ao0. When NopHS=1 is received by the acknowledge input terminal Ao0, the handshake branching circuit 2740 outputs the signal Ab=1.

In the case where input transfer data is not end divided data or head divided data, since the signal supplied to the selection signal terminal S0 is 0, even if the data request signal Ri=1 is received, the handshake branching circuit 2740 does not output BReq=1 and BReq1=1 from the request output terminal Ro1. In parallel with output of NopHS=1 by the handshake branching circuit 2740, the congestion detection circuit 2700 outputs the transfer data and the data request signal Ro=1 to the merge destination of the asynchronous arbitration module (step H9). In other words, when it is determined in step H2 that transfer data is not end divided data and it is determined in step H3 that transfer data is not head divided data, the congestion detection circuit 2700 outputs the transfer data and the data request signal Ro=1 to the merge destinations of the asynchronous arbitration module without outputting the congestion information signal and the congestion process request signal.

After outputting the data request signal Ro=1, the congestion detection circuit 2700 waits until the data acknowledge signal Ao=1 is received (step H10). The symmetric 2-input C element 2730 waits for the data acknowledge signal Ao=1 and the signal Ab=1 from the handshake branching circuit 2740 and outputs the data acknowledge signal Ai=1 (step H8).

When the congestion detection circuit 2700 outputs the data acknowledge signal Ai=1 to the asynchronous arbitration module, the data request signal supplied from the asynchronous arbitration module is withdrawn (Ri=0). When the data request signal Ri becomes 0, the handshake branching circuit 2740 outputs the signal NopHS=0 from the request output terminal Ro0 and returns it to the request input terminal Ao1. By returning NopHS=0, the handshake branching circuit 2740 outputs the signal Ab=0. The symmetric 2-input C element 2730 waits for both the data acknowledge signal Ao=0 and the signal Ab=0 from the merge destination of the asynchronous arbitration module and outputs the data acknowledge signal Ai=0 to the asynchronous arbitration module. The congestion detection circuit 2700 outputs the data acknowledge signal Ai=0 and returns to the initial state.

In the case where the end signal Ei is 1 and the head signal Hi=0, that is, in the case where the input transfer data is end divided data, the OR element 2701 outputs 1, and the signals (S0, S1) supplied to the selection signal input terminals of the handshake branching circuit 2740 become (1, 0). When Ei=1, the congestion information generation circuit 2710 generates the congestion information signals BP0 and BP1 indicative of absence of congestion (step H11). In the case where the input transfer data is end divided data, the congestion information generation circuit 2710 generates congestion information indicative of absence of congestion to all of the merge sources of the asynchronous arbitration module regardless of the value of the arbitration result signal from the asynchronous arbitration module. That is, the congestion information generation circuit 2710 generates BP0=0 (absence of congestion) as a congestion information signal corresponding to the merge source No. 0 and generates BP1=0 (absence of congestion) as a congestion information signal corresponding to the merge source No. 1.

After steps H5 to H8, the congestion detection circuit 2700 outputs the data acknowledge signal Ai=1. When the congestion detection circuit 2700 outputs the data acknowledge signal Ai=1 to the asynchronous arbitration module, the data request signal Ri received from the asynchronous arbitration module becomes 0. When the data request signal Ri becomes 0, the handshake branching circuit 2740 sets the congestion process request signals which are output from the request output terminal Ro1 to the merge sources Nos. 0 and 1 to BReq=0 and BReq1=0. The symmetric 2-input C element 2720 waits for the congestion process acknowledge signals BAck=0 and BAck1=0 from the merge sources Nos. 0 and 1 and outputs BAck=0. When BAck=0 is received, the handshake branching circuit 2740 outputs the signal Ab=0.

The symmetric 2-input C element 2730 waits for the data acknowledge signal Ao=0 from the merge destination of the asynchronous arbitration module and the signal Ab=0 and outputs the data acknowledge signal Ai=0. After that, the congestion detection circuit 2700 outputs the data acknowledge signal Ai=0 and returns to the initial state.

In the example, when the transfer data is the end divided data, the congestion information generation circuit 2710 generates congestion information indicative of absence of congestion to each of the merge sources of the asynchronous arbitration module, and the handshake branching circuit 2740 transmits the congestion process request signal to each of the merge sources. By performing the above operations by the congestion information generation circuit 2710 and the handshake branching circuit 2740, at the time of transferring the end divided data, the congestion detection circuit 2700 can update congestion information stored in the congestion avoiding path calculation module of each of the merge sources of the asynchronous arbitration module to information indicative of absence of congestion. In such a manner, information indicating that congestion is solved is transmitted to the merge source of the asynchronous arbitration module at the time of transfer of end divided data of a data stream, to update the congestion information stored in the congestion avoiding path calculation module. Therefore, the congestion avoiding path calculation module can calculate a congestion avoiding path on the basis of accurate congestion information.

In the embodiment and the example, the congestion detection module (congestion detection circuit) determines whether data is head divided data or not in step H3, at the time of transferring the head divided data, advances to step H4, and generates congestion information indicative of the presence or absence of congestion. Alternatively, at the time of transferring data other than the head divided data and the end divided data, in step H4, the congestion information indicative of the presence or absence of congestion can be generated. That is, a configuration in which transmission of congestion information indicative of the presence or absence of congestion is not limited to the time of transfer of the head divided data of a unit data stream can be also employed.

Concretely, the operations can be realized by changing the operation procedure as follows. First, the steps H3 to H10 in FIG. 26 are replaced with the steps B2 to B6 in FIG. 3. Next, the operation procedure is moved after completion of step H11 to step B3 and, after completion of step B6, returned to step H1. By changing the operation procedure in such a manner, the congestion detection module can generate congestion information indicative of the presence or absence of congestion not only at the time of transfer of head divided data of a data stream but also at the time of transfer of divided data before the end divided data. Further, the congestion detection module can realize the operation of transmitting the congestion process request signal to the congestion avoiding path calculation module and also transmitting congestion information indicating that congestion is solved at the time of transmitting end divided data of a data stream. A concrete configuration example of the congestion detection module performing such operations can be obtained by eliminating the OR element 2701 and the handshake branching circuit 2740 from the congestion detection circuit 2700 illustrated in FIG. 27, branching the data request signal Ri, outputting the branched signals as the congestion process request signals BReq0 and BReq1, and supplying the output signal BAck of the symmetric 2-input C element 2720 to the symmetric 2-input C element 2730 in place of supplying the output signal Ab of the handshake branching circuit 2740 to the symmetric 2-input C element 2730.

A fifth embodiment of the present invention will be described. The asynchronous logic circuits of the third and fourth embodiments update congestion information at the time of transferring head divided data of a unit data stream, thereby obtaining effects of reducing power consumption and suppressing decrease in data transfer speed. However, the congestion detection module used in the asynchronous logic circuits of the third and fourth embodiments outputs a congestion process request signal to the merge source of the asynchronous arbitration module also when the congestion information does not change. When the congestion information does not change, even if the congestion information is updated by the congestion avoiding path calculation module of the merge source, the congestion information does not change due to the updating. Therefore, by employing the configuration of outputting no congestion process request signal when there is no change in congestion information, further reduction in power consumption and suppression of decrease in data transfer speed can be achieved.

For example, the case where the congestion detection circuit 2700 illustrated in FIG. 27 transfers one data stream from a state where there is no data stream transfer and returns again to a state where there is no data stream transfer will be considered. At the time of transferring head divided data of a data stream transfer, the congestion detection circuit 2700 sends congestion information indicative of the absence of congestion to a merge source transferring a data stream and sends congestion information indicative of the presence of congestion to a merge source transferring no data. After that, at the time of finishing the data stream transfer, the congestion detection circuit 2700 sends congestion information indicative of the absence of congestion to all of the merge sources of the asynchronous arbitration module.

As described above, the congestion detection circuit 2700 transmits congestion information indicative of the absence of congestion to the merge sources of the asynchronous arbitration module performing no data stream transfer twice: at the time of transfer of the head divided data and at the time of transfer of the end divided data. That is, the congestion detection circuit 2700 continuously sends the congestion information indicative of absence of congestion of the merge source performing no data stream transfer. If output of the congestion process request signal can be stopped when there is no change in the congestion information, the congestion process request signal is transmitted to the merge source and power consumption at the time of storing the congestion information by the congestion avoiding path calculation module in the merge source can be reduced. If output of the congestion process request signal can be stopped when there is no change in the congestion information, useless decrease in data transfer speed can be avoided in the congestion avoiding path calculation module. Therefore, the embodiment provides the congestion detection module of outputting the congestion process request signal to the merge source of the asynchronous arbitration module in which a change occurs in the congestion information and outputting no congestion process request signal to the merge source where there is no change in congestion information.

The configuration of the asynchronous logic circuit of the embodiment is similar to that of the asynchronous logic circuit of the first embodiment illustrated in FIG. 1. The operation of the congestion detection module 111 is different from that of the congestion detection module 111 in the asynchronous logic circuit of the first embodiment. The other points are similar to those of the third and fourth embodiments.

Figure 28:
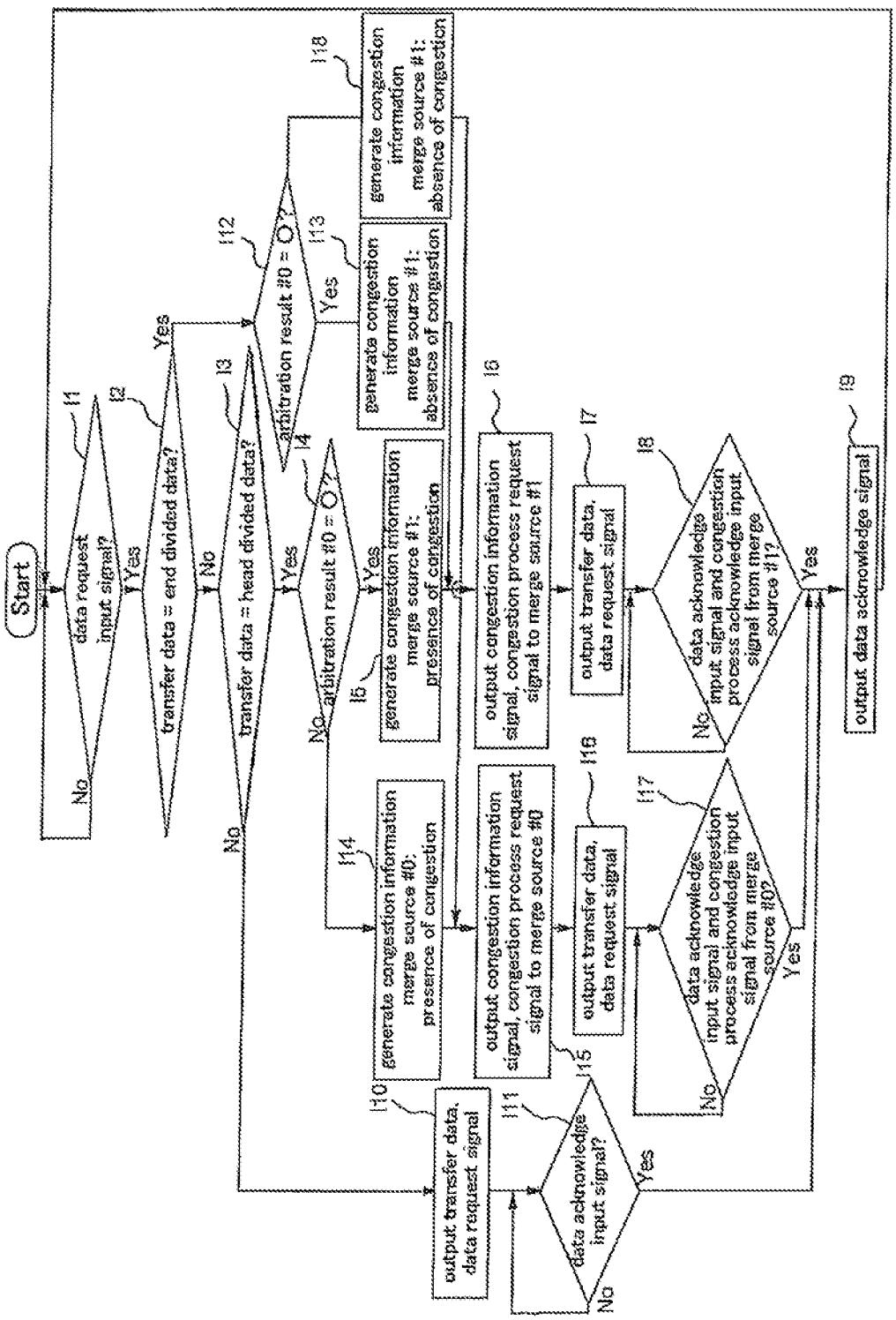
FIG. 28 is a flowchart showing the operation procedure of a congestion detection module in an asynchronous logic circuit of a fifth embodiment of the invention.

FIG. 28 illustrates the procedure of operations of the congestion detection module 111. First, the congestion detection module 111 is in the initial state. The congestion detection module 111 determines whether the data request signal is supplied from the asynchronous arbitration module 101 to the data request input terminal or not (step I1). When no data request signal is received, the congestion detection module 111 repeatedly executes step I1 and waits until the data request signal is received.

When the data request signal is received, the congestion detection module 111 determines whether the input divided data is end divided data of a unit data stream or not (step I2). In the case where the input divided data is not at the end of the unit data stream, the congestion detection module 111 determines whether the input divided data is head divided data of the unit data stream or not (step I3). In the case where the input divided data is at the head of a unit data stream, the congestion detection module 111 determines whether the arbitration result of the asynchronous arbitration module is the merge source No. 0 or not (step I4).

In the case where the arbitration result of the asynchronous arbitration module is the merge source No. 0, the congestion detection module 111 generates congestion information indicative of "presence of congestion" to the merge source No. 1 (step I5) and outputs the congestion information signal and the congestion process request signal to the merge source No. 1 (step I6). At this time, in the state before the head divided data is received, that is, in the state where a data stream is not transferred, the congestion avoiding path calculation modules 112 of both merge sources of the asynchronous arbitration module store the congestion information indicative of the absence of congestion. Therefore, the congestion detection module 111 does not output the congestion process request signal to the merge source No. 0.

The congestion detection module 111 outputs divided data received via the data input terminal from the asynchronous arbitration module 101 and the data request signal received via the data request input terminal from the data output terminal and the data request output terminal, respectively (step I7). Since the arbitration result is the merge source No. 0, in step I7, the congestion detection module 111 outputs the transfer data from the merge source No. 0 which is output by the asynchronous arbitration module 101 in step E6 in FIG. 19, from the data output terminal.

The congestion detection module 111 waits for a data acknowledge signal to the data request signal which is output in step I7 and a congestion process acknowledge signal to the data request signal which is output in step I6 (step I8). The congestion detection module 111 determines whether or not the congestion process acknowledge signal to the congestion process request signal output in step I6 is supplied to the congestion process acknowledge input terminal corresponding to the merge source No. 1. The congestion detection module 111 determines whether or not the data acknowledge signal to the data request signal output in step I7 is supplied to the data acknowledge input terminal. When it is determined that the congestion process acknowledge signal is not received from the merge source No. 1, or when it is determined that no data acknowledge signal is received, the congestion detection module 111 repeatedly executes step I8 and waits until the congestion process acknowledge signal and the data acknowledge signal are received.

When the congestion process acknowledge signal is received from the merge source No. 1 and the data acknowledge signal is received, the congestion detection module 111 outputs a data acknowledge signal from the data acknowledge output terminal to the asynchronous arbitration module 101 (step I9). After that, the congestion detection module 111 withdraws the data request signal which is received and the data acknowledge signal which is output and returns to step I1 (initial state).

In the case where it is determined in step I4 that the arbitration result of the asynchronous arbitration module is the merge source No. 1, the congestion detection module 111 generates congestion information indicative of "presence of congestion" to the merge source No. 0 (step I14). After that, the congestion detection module 111 outputs the congestion information signal and the congestion process request signal to the merge source No. 0 (step I15). At this time, the congestion detection module 111 is in a state before the head divided data is received, that is, a state where there is no transfer of a data stream. Since the congestion avoiding path calculation modules 112 on both of the merge sources of the asynchronous arbitration module store congestion information indicative of absence of congestion, the congestion process request signal is not output to the merge source No. 1.

The congestion detection module 111 outputs the divided data received via the data input terminal from the asynchronous arbitration module 101 and the data request signal received via the data request input terminal, from the data output terminal and the data request output terminal, respectively (step I16). Since the arbitration result is the merge source No. 1, in step I16, the congestion detection module 111 outputs the transfer data from the merge source No. 1 which is output in step E10 in FIG. 19 from the asynchronous arbitration module 101, from the data output terminal.

The congestion detection module 111 waits for both the data acknowledge signal to the data request signal output in step I16 and the congestion process acknowledge signal to the congestion process request signal output to the merge source No. 0 in step I15 (step I17). The congestion detection module 111 determines whether or not the congestion process acknowledge signal to the congestion process request signal output in step I6 is supplied to the congestion process acknowledge input terminal corresponding to the merge source No. 0. The congestion detection module 111 also determines whether the data acknowledge signal to the data request signal output in step I7 is received by the data acknowledge input terminal or not. When it is determined that the congestion process acknowledge signal is not received from the merge source No. 0 is not received, or when it is determined that the data acknowledge signal is not received, the congestion detection module 111 repeatedly executes step I17 and waits until the congestion process acknowledge signal and the data acknowledge signal are received.

When the congestion process acknowledge signal is received from the merge source No. 0 and the data acknowledge signal is received, the congestion detection module 111 advances to step I9 and outputs the data acknowledge signal to the asynchronous arbitration module 101. After that, the congestion detection module 111 withdraws the data request signal to be received and the data acknowledge signal to be output and returns to step I1 (initial state).

When it is determined in step I2 that the input divided data is not at the end of the unit data stream and it is determined in step I3 that the input divided data is not at the head of the unit data stream, that is, when it is determined that transfer data is intermediate divided data, the congestion detection module 111 advances to step I10. The congestion detection module 111 outputs the divided data received via the data input terminal from the asynchronous arbitration module 101 and the data request signal received via the data request input terminal from the data output terminal and the data request output terminal, respectively (step I10). When the asynchronous arbitration module 101 outputs the transfer data from the merge source No. 0 in step E6, the congestion detection module 111 outputs transfer data from the merge source No. 0 from the data output terminal. When the asynchronous arbitration module 101 outputs the transfer data from the merge source No. 1 in step E10, the congestion detection module 111 outputs transfer data from the merge source No. 1 from the data output terminal.

The congestion detection module 111 waits until the data acknowledge signal to the data request signal which is output in step I10 is received (step I11). When the data acknowledge signal is received, the congestion detection module 111 advances to step I9 and outputs the data acknowledge signal from the data acknowledge output terminal to the asynchronous arbitration module 101. After that, the congestion detection module 111 withdraws the data request signal to be received and the data acknowledge signal to be output and returns to step I1 (initial state).

When it is determined in step I2 that the input divided data is end divided data of a unit data stream, the congestion detection module 111 determines whether the arbitration result of the asynchronous arbitration module is the merge source No. 0 or not (step I12). In the case where the arbitration result of the asynchronous arbitration module is the merge source No. 0, congestion is solved after the end divided data of the data stream is transferred. Consequently, the congestion detection module 111 generates congestion information indicative of "absence of congestion" to the merge source No. 1 (step I13).

After generation of the congestion information indicative of absence of congestion to the merge source No. 1 in step I13, the congestion detection module 111 advances to step I6 and outputs the congestion information signal and the congestion process request signal to the merge source No. 1. After that, the congestion detection module 111 outputs transfer data and the data request signal in step I7 and waits for the data acknowledge signal and the congestion process acknowledge signal in step I8. When the data acknowledge signal and the congestion process acknowledge signal are received, the congestion detection module 111 advances to step I9 and outputs the data acknowledge signal. After outputting the data acknowledge signal, the congestion detection module 111 withdraws the data request signal which is received and the data acknowledge signal which is output and returns to step I1 (initial state).

When it is determined in step I12 that the arbitration result is the merge source No. 1, the congestion detection module 111 generates congestion information indicative of "absence of congestion" to the merge source No. 0 (step I18). After that, the congestion detection module 111 advances to step I15 and outputs the congestion information signal and the congestion process request signal to the merge source No. 0, outputs transfer data and the data request signal in step I16, and waits for the data acknowledge signal and the congestion process acknowledge signal in step I17. When the data acknowledge signal and the congestion process acknowledge signal are received, the congestion detection module 111 advances to step I19 and outputs the data acknowledge signal. After outputting the data acknowledge signal, the congestion detection module 111 withdraws the data request signal which is received and the data acknowledge signal which is output and returns to step I1 (initial state).

At the time of transfer of head divided data of a data stream and at the time of transfer of end data, the congestion detection module 111 outputs congestion information and the congestion process request signal to a merge source in which congestion information changes. For example, when the congestion avoiding path calculation module 112 corresponding to the merge source No. 0 already stores the congestion information indicative of absence of congestion, the congestion process request signal is not output to the merge source No. 0. In such a manner, power consumption at the time of transferring the congestion process request signal to the congestion avoiding path calculation module 112 corresponding to the merge source No. 0 and storing the congestion information in the congestion avoiding path calculation module 112 can be suppressed. In the congestion avoiding path calculation module 112, the congestion process request signal for storing congestion information of the same content is not received, so that data transfer is not temporarily stopped, and decrease in data transfer speed can be also avoided.

Next, a fifth example will be described. A connection form of circuits in the asynchronous inter-core connection circuit included in the semiconductor circuit of the example is similar to that of the circuits in the asynchronous inter-core connection circuit 600 shown in FIG. 6. As the asynchronous branching module 611, like in the first example, the asynchronous branching circuit 700 having the circuit configuration shown in FIG. 7 can be used. As the asynchronous arbitration modules 612, 614, and 622, the asynchronous arbitration circuit 2100 having the circuit configuration illustrated in FIG. 21 can be used. As the congestion avoiding path calculation module 631, the congestion avoiding path calculation circuit 2300 having the circuit configuration shown in FIG. 23 can be used.

Figure 29:
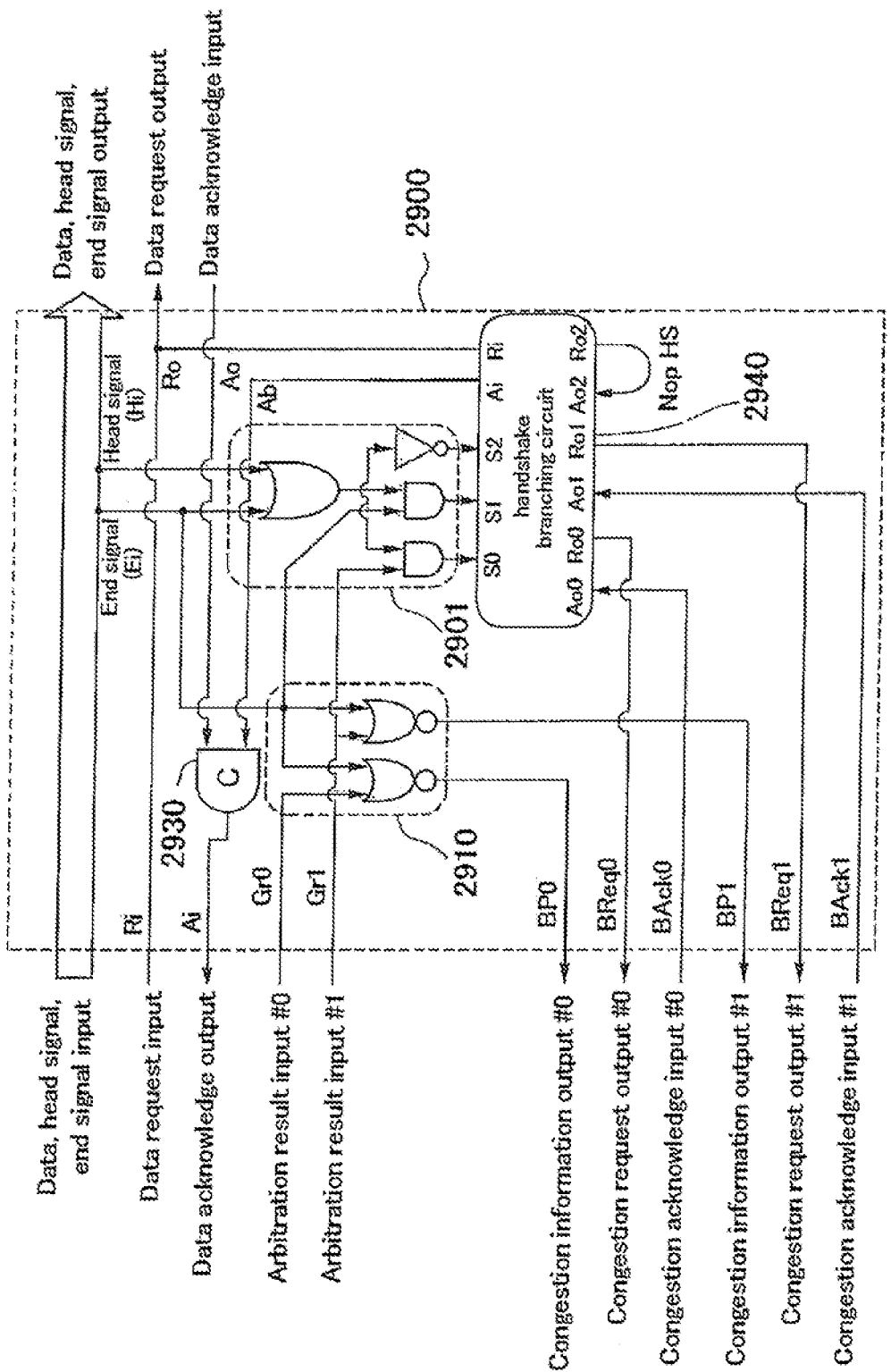
FIG. 29 is a block diagram illustrating an example of the circuit configuration of the congestion detection module.

In the example, as the congestion detection modules 632 and 642, in place of the congestion detection circuit 2700 having the circuit configuration illustrated in FIG. 27, a congestion detection circuit outputting a congestion process request signal to a merge source in which congestion information changes is used. FIG. 29 illustrates an example of the circuit configuration of a congestion detection module. Each of the congestion detection modules 632 and 642 can be constructed by a congestion detection circuit 2900 illustrated in FIG. 29. The congestion detection circuit 2900 has a congestion process request transmission destination selection circuit 2901, a congestion information generation circuit 2910, a symmetric 2-input C element 2930, and a handshake branching circuit 2940. The congestion information generation circuit 2910 and the symmetric 2-input C element 2930 are the same as the congestion information generation circuit 2710 and the symmetric 2-input C element 2730, respectively in the congestion detection circuit 2700 used in the fourth example.

The handshake branching circuit 2940 has a configuration similar to that of the handshake branching circuit 2740 in the congestion detection circuit 2700 used in the fourth example except that the handshake branching circuit 2940 has three branch destinations. The handshake branching circuit 2940 has three selection signal input terminals (S0, S1, S2) and three sets each made of a request signal output terminal and an acknowledge signal input terminal. All of selection signals supplied to the selection signal input terminals S0, S1, and S2 are 0, or one of the selection signals is 1 and the other signals are 0. The handshake branching circuit 2940 outputs a request signal to any of the three branch destinations in accordance with the input selection signal, and receives an acknowledge signal from the branch destination to which the request signal is output.

When the selection signal S0=1 and the data request signal is supplied to the request input terminal Ri, the handshake branching circuit 2940 outputs a request signal from the request output terminal Ro0. When an acknowledge signal is received by the acknowledge input terminal Ao0, the handshake branching circuit 2940 outputs the acknowledge signal from the acknowledge output terminal Ai. When the selection signal S1=1, the handshake branching circuit 2940 outputs a request signal from the request output terminal Ro1 and receives an acknowledge signal from the acknowledge input terminal Ao1. When the selection signal S2=1, the handshake branching circuit 2940 outputs a request signal from the request output terminal Ro2 and receives an acknowledge signal from the acknowledge input terminal Ao2.

Figure 30:
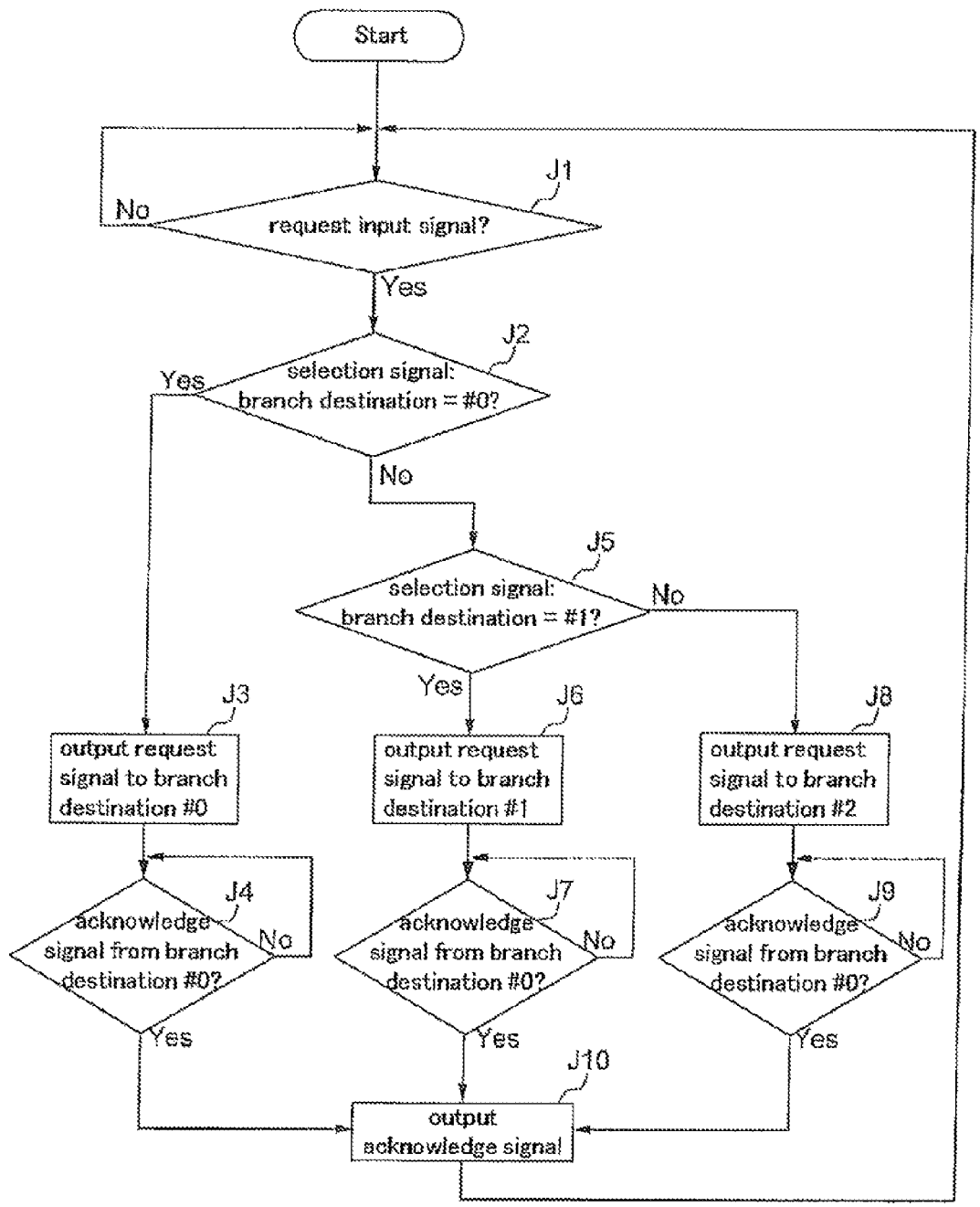
FIG. 30 is a flowchart showing the operation procedure of a handshake branching module (three branches).

FIG. 30 shows the operation procedure of the handshake branching circuit 2940. The handshake branching circuit 2940 determines whether the data request signal is supplied to the request input terminal Ri or not (step J1). When the data request signal is received, the handshake branching circuit 2490 determines whether the selection signal indicative the branch destination No. 0 or not, that is, whether the selection signal is S0=1 or not (step J2).

When the selection signal is S0=1, the handshake branching circuit 2940 selects the branch destination No. 0 and outputs a request signal from the request output terminal Ro0 (step J3). The handshake branching circuit 2490 determines whether or not the acknowledge signal is supplied to the acknowledge input terminal Ao0 after outputting the request (step J4). When an acknowledge signal is not received, the handshake branching circuit 2940 repeatedly executes the step J4 and waits until the acknowledge signal is received.

When the selection signal S0 is not 1, the handshake branching circuit 2940 determines whether or not the selection signal indicates the branch destination No. 1, that is, whether the selection signal S1 is 1 or not (step J5). When the selection signal S1 is 1, the handshake branching circuit 2940 selects the branch destination No. 1, and outputs a request signal from the request output terminal Ro1 (step J6). The handshake branching circuit 2940 determines whether or not an acknowledge signal is supplied to the acknowledge input terminal Ao1 after outputting the request signal (step J7). When the acknowledge signal is not received, the handshake branching circuit 2940 repeatedly executes the step J7 and waits until the acknowledge signal is received.

When the selection signal is not S0=1 or S1=1, that is, when the selection signal is S2=1, the handshake branching circuit 2940 selects the branch destination No. 2 and outputs a request signal from the request output terminal Ro2 (step J8). The handshake branching circuit 2490 determines whether or not the acknowledge signal is supplied to the acknowledge input terminal Ao2 after outputting the request (step I9). When an acknowledge signal is not received, the handshake branching circuit 2940 repeatedly executes the step J9 and waits until the acknowledge signal is received.

When it is determined in step J4, J7, or J0 that the acknowledge signal is received, the handshake branching circuit 2940 outputs an acknowledge signal from the acknowledge output terminal Ai. After outputting the acknowledge signal, the handshake branching circuit 2940 withdraws the request signal and the acknowledge signal and returns to step J1 (initial state).

Figure 31:
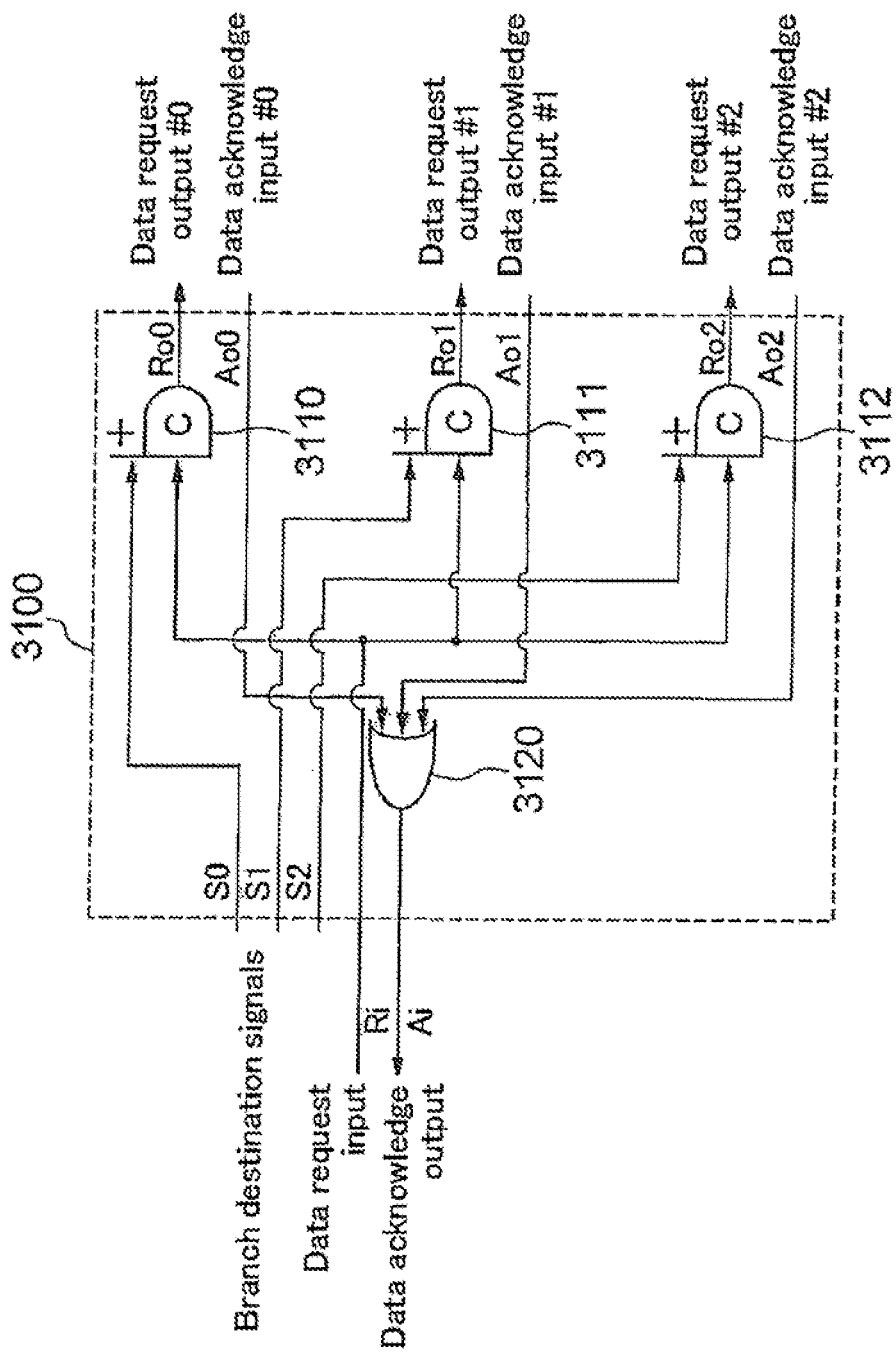
FIG. 31 is a block diagram illustrating an example of the circuit configuration of the handshake branching module (three branches).

FIG. 31 illustrates an example of the circuit configuration of the handshake branching circuit 2940. The handshake branching circuit 2940 can be constructed by a handshake branching circuit 3100 having a circuit configuration illustrated in FIG. 31. The configuration of the handshake branching circuit 3100 is similar to that of a part obtained by excluding a data transfer path from the configuration of the asynchronous branching circuit 700 shown in FIG. 7. The handshake branching circuit 3100 has three branch destinations and accordingly has three asymmetric 2-input C elements 3110, 3111, and 3112. An OR element 3120 outputs OR of acknowledge signals from the three branch destinations.

Referring again to FIG. 29, the handshake branching circuit 2940 outputs the congestion process request signal BReq0 corresponding to the merge source No. 0 of the asynchronous arbitration module from the request output terminal Ro0 of the branch destination No. 0. The handshake branching circuit 2940 supplies the congestion process acknowledge signal BAck0 from the merge source No. 0 to the acknowledge input terminal Ao0 of the branch destination No. 0. The handshake branching circuit 2940 outputs the congestion process request signal Breq1 corresponding to the merge source No. 1 from the request output terminal Ro1 of the branch destination No. 1 and supplies the congestion process acknowledge signal from the merge source No. 1 to the acknowledge input terminal Ao1 of the branch destination No. 1. The handshake branching circuit 2940 outputs the signal NopHS from the request output terminal Ro2 of the branch destination No. 2, returns it, and receives it by the acknowledge input terminal Ao2 of the branch destination No. 2.

The congestion process request transmission destination selection circuit 2901 generates a selection signal to be supplied to the selection signal input terminals (S0, S1, S2) of the handshake branching circuit 2940 on the basis of the arbitration result signals Gr0 and Gr1, the head signal Hi, and the end signal Ei. The selection signal S0=1 denotes that the handshake branching circuit 2940 selects the branch destination No. 0, and the congestion process request signal is output to the merge source No. 0 of the asynchronous arbitration module. The selection signal S1=1 denotes that the handshake branching circuit 2940 selects the branch destination No. 0, and the congestion process request signal is output to the merge source No. 1 of the asynchronous arbitration module. The selection signal S2=1 denotes that the handshake branching circuit 2940 selects the branch destination No. 2, and the congestion process request signal is not output to any of the merge sources of the asynchronous arbitration module.

When "+" denotes an OR operator and inputs are (Hi+Ei, Gr0, Gr1)=(1, 1, 0), the congestion process request transmission destination selection circuit 2901 outputs selection signals (S0, S1, S2)=(0, 1, 0). When inputs are (Hi+Ei, Gr0, Gr1)=(1, 0, 1), the congestion process request transmission destination selection circuit 2901 outputs selection signals (S0, S1, S2)=(1, 0, 0). When inputs are (Hi+Ei, Gr0, Gr1)=(0, –, –), the congestion process request transmission destination selection circuit 2901 outputs selection signals (S0, S1, S2)= (0, 0, 1). "–" expresses that the value may be any of 0 and 1.

When the transfer data is head divided data or end divided data, the handshake branching circuit 2940 outputs a congestion information storage request to a merge source on the side the asynchronous arbitration module does not output transfer data among the merge sources of the asynchronous arbitration module. Specifically, when the head signal Hi=1 or the end signal Ei=1 and the arbitration result signals (Gr0, Gr1) (1, 0), the congestion process request transmission destination selection circuit 2901 outputs the selection signals (S0, S1, S2)=(0, 1, 0). Accordingly, the handshake branching circuit 2940 outputs the congestion process request signal BP1=1 to the merge source No. 1 of the asynchronous arbitration module. When the head signal Hi=1 or the end signal Ei=1 and the arbitration result signals (Gr0, Gr1)=(0, 1), the congestion process request transmission destination selection circuit 2901 outputs the selection signals (S0, S1, S2)=(1, 0, 0). Accordingly, the handshake branching circuit 2940 outputs the congestion process request signal BP0=1 to the merge source No. 0 of the asynchronous arbitration module.

On the other hand, when the transfer data is not head divided data or end divided data, that is, when the transfer data is intermediate divided data, the handshake branching circuit 2940 does not send the congestion information storage request signal to any of the merge sources of the asynchronous arbitration module. That is, when the head signal Hi=0 and the end signal Ei=0, the congestion process request transmission destination selection circuit 2901 outputs the selection signals (S0, S1, S2)=(0, 0, 1). Accordingly, the handshake branching circuit 2940 supplies the request signal as a feedback signal to itself and does not output the congestion process request signal to the merge sources Nos. 0 and 1 of the asynchronous arbitration module.

When divided data being transferred is head divided data, the congestion information generation circuit 2910 generates congestion information indicative of "presence of congestion" to a merge source waiting for data transfer. At the time of transfer of the head divided data, the congestion detection circuit 2900 outputs the congestion information indicative of "presence of congestion" from the congestion information generation circuit 2910 and outputs the congestion process request signal from the handshake branching circuit 2940 to the merge source which is made wait for data transfer by the asynchronous arbitration module. When the congestion process request signal is received, the congestion avoiding path calculation module in the merge source updates the congestion information stored to "presence of congestion". At this time, the congestion information generation circuit 2910 generates congestion information indicative of "absence of congestion" to the merge source transferring data by the asynchronous arbitration module, but the congestion avoiding path calculation module in the merge source stores "absence of congestion" in the state before the data transfer. Consequently, the handshake branching circuit 2940 does not output the congestion process request signal to the merge source which is transferring data.

When divided data being transferred is intermediate divided data, the congestion information generation circuit 2910 generates congestion information indicative of "absence of congestion" to a merge source which is transferring data and generates congestion information indicative of "presence of congestion" to a merge source waiting for data transfer. However, the congestion avoiding path calculation module in the merge source which is transferring data by the asynchronous arbitration module continuously stores "absence of congestion" from the state of no data transfer. The congestion avoiding path calculation module in the merge source which is made wait for transfer stores "presence of congestion" at the time of transfer of the head divided data. Consequently, at the time of transfer of the intermediate divided data, the handshake branching circuit 2940 does not output the congestion process request signal to any of the merge sources of the asynchronous arbitration module.

When divided data being transferred is end divided data, the congestion information generation circuit 2910 generates congestion information indicative of "absence of congestion" to both of the merge sources. At the time of transferring the end divided data, the congestion detection circuit 2900 outputs the congestion information indicative of absence of congestion from the congestion information generation circuit 2910 to a merge source which is made wait for data transfer by the asynchronous arbitration module, and outputs the congestion process request signal from the handshake branching circuit 2940. When the congestion process request signal is received, the congestion avoiding path calculation module in the merge source updates the congestion information stored to "absence of congestion". The congestion avoiding path calculation module in the merge source which is transferring data by the asynchronous arbitration module continuously stores "absence of congestion" from the state where there is no head divided data transfer. Consequently, the handshake branching circuit 2940 does not output the congestion process request signal to the merge source which is transferring data.

The operations of the parts in the congestion detection circuit 2900 in FIG. 29 will be described in correspondence with the flowchart of FIG. 28. In the initial state, signals supplied to the congestion detection circuit 2900 are the data request signal Ri=0, the data acknowledge signal Ao=0, and the congestion process acknowledge signals BAck0=0 and BAck1=0. Signals output from the congestion detection circuit 2900 are the data request signal Ro=0, the data acknowledge signal Ai=0, and the congestion process request signals BReq=0 and BReq1=0. The states of the arbitration result signals Gr0 and Gr1 and the congestion information signal BP0 are arbitrary.

When the data request signal Ri is 0, the congestion detection circuit 2900 waits until the data request signal Ri=1 is received from the asynchronous arbitration module (step I1 in FIG. 28). When the data request signal Ri becomes 1, the congestion detection circuit 2900 determines whether the input transfer data is end divided data or not on the basis of the end signal Ei (step I2). When the end signal Ei is 1, the congestion detection circuit 2900 determines that the input transfer data is not end divided data, and determines whether the input transfer data is head divided data or not on the basis of the head signal Hi (step I3).

When the head signal Hi is 1, the congestion detection circuit 2900 determines that the input transfer data is head divided data, and determines whether the merge source No. 0 is transferring data or not on the basis of the arbitration signals (Gr0, Gr1) received from the asynchronous arbitration module (step I4). When the asynchronous arbitration module is transferring a data stream from the merge source No. 0 and the arbitration result signals (Gr0, Gr1) are (1, 0), the congestion information generation circuit 2910 generates the congestion information signals (BP0, BP1)=(0, 1) indicating that the merge source No. 1 is congested (step I5).

The congestion detection circuit 2900 branches the data request signal Ri and supplies the branched signals to the request input terminal Ri of the handshake branching circuit 2940. When the head signal Hi is 1 and the arbitration result signals (Gr0, Gr1)=(1, 0), the congestion process request transmission destination selection circuit 2901 outputs the selection signals (S0, S1, S2)=(0, 1, 0). When the data request signal Ri becomes 1, since the selection signal S1=1, the handshake branching circuit 2940 outputs BReq1=1 from the request output terminal Ro1 to the merge source No. 1 to the merge source No. 1 of the asynchronous arbitration module. The congestion detection circuit 2900 outputs the congestion information signal BP=1 to the merge source No. 1 of the asynchronous arbitration module (step I6).

In parallel with outputting of the congestion information signal and the congestion process request signal, the congestion detection circuit 2900 outputs the transfer data from the merge source No. 0 of the asynchronous arbitration module and the data request signal Ro=1 to the merge destination of the asynchronous arbitration module (step I7). After outputting the data request signal Ro=1 and the congestion process request signal BReq1=1, the congestion detection circuit 2900 waits until the data acknowledge signal Ao=1 and the congestion process acknowledge signal BAck1=1 are received (step I8).

Since the branch destination selection signals (S0, S1, S2)= (0, 1, 0), when the congestion process request signal BAck=1 is supplied from the merge source No. 1 of the asynchronous arbitration module to the acknowledge input terminal Ao1, the handshake branching circuit 2940 outputs the signal Ab=1 from the acknowledge output terminal Ai. The symmetric 2-input C element 2930 waits for both the data acknowledge signal Ao=1 and the signal Ab=1 and outputs the data acknowledge signal Ai=1 (step I9).

When the congestion detection circuit 2900 outputs the data acknowledge signal Ai=1 to the asynchronous arbitration module, the data request signal Ri received from the asynchronous arbitration module is withdrawn and becomes 0. When the data request signal Ri becomes 0, the handshake branching circuit 2940 withdraws the congestion process request signal which is output from the request output terminal Ro1, and outputs BReq1=0.

After withdrawal of the congestion process request signal, when the congestion process acknowledge signal BAck1=0 is received from the merge source No. 1, the handshake branching circuit 2940 outputs the signal Ab=0 from the acknowledge output terminal Ao. The symmetric 2-input C element 2930 waits for the data acknowledge signal. Ao=0 and the signal Ab=0 from the merge sources of the asynchronous arbitration module and outputs the data acknowledge signal Ai=0 to the asynchronous arbitration module. After that, the congestion detection circuit 2900 outputs the data acknowledge signal Ai=0 and returns to step I1 (initial state).

At the time of transferring intermediate divided data, since the end signal Ei=0 in step I2, the congestion detection circuit 2900 determines that the transfer data is not end divided data. Since the head signal Hi=0 in step I3, the congestion detection circuit 2900 determines that the transfer data is not head divided data. In this case, the congestion detection circuit 2900 outputs transfer data and the data request signal Ro=1 to the merge destination of the asynchronous arbitration module without outputting the congestion information signal and the congestion process request signal (step I10).

At the time of transferring the intermediate divided data, since the head signal Hi is 0 and the end signal Ei is 0, even in the case where the asynchronous arbitration module selects any of the merge sources, the congestion process request transmission destination selection circuit 2901 outputs (S0, S1, S2)=(0, 0, 1). When the data request signal Ri=1 is supplied to the handshake branching circuit 2940, NopHS=1 is output from the request output terminal Rot and is fed back to the acknowledge input terminal Ao2. By receiving NopHS=1 as a feedback signal, the handshake branching circuit 2940 outputs the signal Ab=1 from the acknowledge output terminal.

After outputting the data request signal Ro=1, the congestion detection circuit 2900 waits until the data acknowledge signal Ao=1 is received (step I11). After the data request signal Ri becomes 1, Ab becomes 1. Consequently, when the data acknowledge signal Ao=1 is received, the symmetric 2-input C element 2930 outputs the data acknowledge signal Ai=1 (step I9).

When the congestion detection circuit 2900 outputs the data acknowledge signal Ai=1 to the asynchronous arbitration module, the data request signal supplied from the asynchronous arbitration module is withdrawn and Ri becomes 0. When the data request signal Ri becomes 0, the handshake branching circuit 2940 outputs the signal NopHS=0 from the request output terminal Ro2 and receives the signal as a feedback signal by the acknowledge input terminal Ao2. By receiving the NopHS=0 as a feedback signal, the handshake branching circuit 2940 outputs the signal Ab=1 from the acknowledge output terminal Ai.

The symmetric 2-input C element 2930 waits for both the data acknowledge signal Ao=0 and the signal Ab=0 from the merge destination of the asynchronous arbitration module and outputs the data acknowledge signal Ai=0 to the asynchronous arbitration module. After outputting the data acknowledge signal Ai=0, the congestion detection circuit 2900 returns to step I1 (initial state).

When the transfer data is end divided data and the end signal Ei is 1 in step I2, the congestion detection circuit 2900 determines that the transfer data is the end divided data. Since the arbitration result signals (Gr0, Gr1) are (1, 0) continuously from the head divided data and the intermediate divided data, the congestion detection circuit 2900 determines in step I12 that a data stream from the merge source No. 0 of the asynchronous arbitration module is being transferred. Since the end signal Ei is 1, the congestion information generation circuit 2910 generates the congestion information signals (BP0, BP1)=(0, 0) (step I13).

The congestion detection circuit 2900 branches the data request signal Ri and supplies branched signals to the request input terminal Ri of the handshake branching circuit 2940. When the end signal Ei=1 and the arbitration result signals (Gr0, Gr1)=(1, 0), the congestion process request transmission destination selection circuit 2901 outputs the selection signals (S0, S1, S2)=(0, 1, 0). When the data request signal Ri becomes 1, since the selection signal S1=1, the handshake branching circuit 2940 outputs BReq1=1 from the request output terminal Ro1 of the branch destination No. 1 to the merge source No. 1 of the asynchronous arbitration module. The congestion detection circuit 2900 outputs the congestion information signal BP=0 for the merge source No. 1 of the asynchronous arbitration module to the merge source No. 1 (step I6).

In parallel with outputting of the congestion information signal and the congestion process request signal, the congestion detection circuit 2900 outputs the transfer data and the data request signal Ro=1 from the merge source No. 0 of the asynchronous arbitration module to the merge destination of the asynchronous arbitration module (step I7). After outputting the data request signal Ro=1 and the congestion process request signal BReq1=1, the congestion detection circuit 2900 waits until the data acknowledge signal Ao=1 and the congestion process acknowledge signal BAck1=1 are received (step I8).

Since the branch destination selection signals (S0, S1, S2) are (0, 1, 0), when the congestion process request signal BAck=1 is supplied from the merge source No. 1 of the asynchronous arbitration module to the acknowledge input terminal Ao1, the handshake branching circuit 2940 outputs the signal Ab=1 from the acknowledge output terminal Ai. The symmetric 2-input C element 2930 waits for the data acknowledge signal Ao=1 and the signal Ab=1 and outputs the data acknowledge signal Ai=1 (step I9).

When the congestion detection circuit 2900 outputs the data acknowledge signal Ai=1 to the asynchronous arbitration module, the data request signal Ri received from the asynchronous arbitration module is withdrawn and becomes 0. When the data request signal Ri becomes 0, the handshake branching circuit 2940 withdraws the congestion process request signals which are output from the request output terminal Ro1, and outputs BReq1=0.

When the congestion process acknowledge signal BAck1=0 is received from the merge source No. 1 after withdrawal of the congestion process request signal, the handshake branching circuit 2940 outputs the signal Ab=0 from the acknowledge output terminal Ao. The symmetric 2-input C element 2930 waits for the data acknowledge signal Ao=0 from the merge destination of the asynchronous arbitration module and the signal Ab=0 and outputs the data acknowledge signal Ai=0 to the asynchronous arbitration module. After that, the congestion detection circuit 2900 outputs the data acknowledge signal Ai=0 and returns to step I1 (initial state).

It is assumed that, after completion of transfer of the end divided data, the head divided data of another data stream is transferred from the merge source No. 1 of the asynchronous module. In this case, as the operation of the congestion detection circuit 2900, an operation obtained by replacing the merge source No. 0 and the merge source No. 1 with each other in the above-described operation is performed. That is, the congestion detection circuit 2900 performs an operation obtained by replacing the steps 15 to 18 in the above-described operation with I14 to I17, and replacing the step I13 with I18.

In the example, each of the congestion detection modules 632 and 642 of FIG. 6 is constructed by the congestion detection circuit 2900 illustrated in FIG. 29. The congestion detection circuit 2900 can output the congestion process request signal only to the merge source of the asynchronous arbitration module in which a change occurs in congestion information. Consequently, power used to transfer the congestion information can be reduced. Therefore, the congestion avoiding path calculation module 631 does not temporarily stop data transfer in order to store the same congestion information, so that decrease in the transfer speed caused by a process of storing congestion information can be suppressed.

The congestion detection circuit 2900 outputs the congestion process request signal only to the merge source of the asynchronous arbitration module in which a change occurs in the congestion information. Consequently, the congestion avoiding path calculation module which receives the congestion process request signal updates congestion information of the branch destination to congestion information different from the congestion information presently stored. Therefore, in place of the configuration of receiving congestion information and storing it, the congestion avoiding path calculation module can employ a configuration of inverting congestion information to be stored when the congestion process request signal is received. In this case, the congestion process request signal corresponds to an inversion request signal requesting inversion of congestion information. In the case of employing such a configuration, the congestion detection circuit 2900 does not have to output congestion information, so that the congestion information generation circuit 2910 may not be provided.

Concretely, the above-described operations can be realized by changing the configuration of the congestion avoiding path calculation circuit 2300 shown in FIG. 23 as follows. The congestion information input terminal BP0 is eliminated from the congestion avoiding path calculation circuit 2300 and a signal obtaining the logical negation of an output signal BLo0 of the congestion information storage latch 2340 is supplied to the first input of the multiplexer 2320. The congestion information input BP1 is eliminated from the congestion avoiding path calculation circuit 2300 and a signal obtaining the logical negation of an output signal BLo1 of the congestion information storage latch 2340 is supplied to the first input of the multiplexer 2321.

For example, when the congestion process request signal (inversion request signal) is received from the congestion detection module corresponding to the branch destination No. 0 of the asynchronous branching module, the multiplexer 2320 selects the first input side and outputs the logical negation of the signal BLo0. Consequently, the congestion avoiding path calculation circuit 2300 inverts congestion information stored in the congestion information storage latch 2340 from absence of congestion to presence of congestion or from presence of congestion to absence of congestion. When the congestion process request signal is received from the congestion detection module corresponding to the branch destination No. 1 of the asynchronous branching module, the multiplexer 2321 selects the first input side and outputs the logical negation of the signal BLo1. The congestion avoiding path calculation circuit 2300 inverts congestion information stored in the congestion information storage latch 2340 from absence of congestion to presence of congestion or from presence of congestion to absence of congestion.

The present invention has been described on the basis of its preferred embodiments. However, the asynchronous logic circuits and the congestion avoiding path calculation modules of the invention are not limited to the foregoing embodiments but those obtained by variously modifying and changing the configurations of the foregoing embodiments are also included in the scope of the present invention.

The minimum configurations of the present invention will be described below. An asynchronous logic circuit of the present invention has, as a minimum configuration, an asynchronous branching module, an asynchronous arbitration module, a congestion detection module, and a congestion avoiding path calculation module. The asynchronous logic circuit performs data transfer by transmitting/receiving a data request signal and a data acknowledge signal in a predetermined procedure. The asynchronous branching circuit outputs transfer data received according to a handshake protocol to any of a plurality of branch destinations. The asynchronous arbitration module merges transfer paths of the transfer data and sequentially outputs transfer data received from at least one of a plurality of merge sources, in a predetermined procedure without contradicting the procedure. The congestion detection module is disposed corresponding to the asynchronous arbitration module. The congestion detection module receives an arbitration result signal indicating whether transfer data from any of merge sources is being transferred or not from the asynchronous arbitration module, and outputting congestion information indicative of presence or absence of congestion to the plurality of merge sources of the asynchronous arbitration module. The congestion avoiding path calculation module is disposed corresponding to the asynchronous branching module. The congestion avoiding path calculation module receives the congestion information from a congestion detection module existing in a branch destination of the asynchronous branching module, and exclusively performs a process of storing congestion information on the plurality of branch destinations of the asynchronous branching module into a congestion information storage memory. The congestion avoiding path calculation module also performs a process of making the asynchronous branching module preferentially select, as a transfer branch destination, a branch destination which does not generate congestion information indicative of the presence of congestion among branch destinations leading to a destination on the basis of the congestion information and destination information of the transfer data. The congestion avoiding path calculation module exclusively performs the process of recording congestion information and the process of determining a transfer branch destination of the asynchronous branching module.

In the asynchronous logic circuit of the invention, the process of recording congestion information and the process of determining a transfer branch destination of the asynchronous branching module are performed exclusively. In such manner, the congestion information can be updated avoiding a data transfer period. In the asynchronous logic circuit in which the congestion information storage request signal and the data request signal are generated at independent timings, a branch destination to which transfer data is output from the asynchronous branching module can be prevented from changing during data transfer handshaking. In the present invention, path setting calculation for avoiding a congestion place can be performed accurately by using congestion information. Consequently, when the asynchronous branching module has a plurality of branching destinations leading to a destination, a branch destination which is not congested can be preferentially selected as a transfer branch destination. As a result, even when there is a congested part, the communication capacity of a data transfer path can be suppressed from being wasted.

A congestion avoiding path calculation module of the present invention has, as a minimum configuration, a data configuration information arbitration circuit, a memory storage control circuit, and a path calculation circuit. The data congestion information arbitration module performs arbitration between a data request signal and a congestion information storage request signal. The data request signal is for an asynchronous branching module which outputs transfer data received in accordance with a handshake protocol of transferring data by transmitting/receiving a data request signal and a data acknowledge signal by a predetermined procedure to any of a plurality of branch destinations. The congestion information storage request signal is received from a branch destination of the asynchronous branching module. According to an arbitration result, one of the signals is passed to mediate handshaking, and the other signal is made wait until completion of a process according to the passed signal. When the data congestion information arbitration circuit allows passage of the congestion information storage request signal, the memory storage control circuit stores the congestion information received from a branch destination of the asynchronous branching module into a congestion information storage memory storing congestion information on the branch destination. When the data congestion information arbitration circuit makes the data request signal pass, the path calculation circuit makes the asynchronous branching module preferentially select, as a transfer branch destination, a branch destination generating no congestion information indicative of presence of congestion among branch destinations which can lead to a destination on the basis of the congestion information and destination information of transfer data which is supplied to the asynchronous branching module.

In the congestion avoiding path calculation module of the invention, the data congestion information arbitration circuit allows passage of one of the data request signal and the congestion information storage request signal to mediate handshaking. The data congestion information arbitration circuit makes the other signal wait until the process on the passed signal completes. Consequently, updating of congestion information using the memory storage control circuit and selection of the transfer branch destination using the path calculation circuit can be performed exclusively. By using such a congestion avoiding path calculation circuit, in the asynchronous logic circuit in which the congestion information storage request signal and the data request signal are generated at independent timings, a branch destination to which transfer data is output from the asynchronous branching module can be prevented from changing during data transfer handshaking. In the present invention, the path setting calculation for avoiding a congestion place can be performed accurately by using congestion information. Consequently, when the asynchronous branching module has a plurality of branching destinations leading to a destination, a branch destination which is not congested can be preferentially selected as a transfer branch destination. As a result, even when there is a congested part, the communication capacity of a data transfer path can be suppressed from being wasted.

A minimum configuration of a path calculation method in an asynchronous logic circuit of the invention is as follows. First, arbitration is performed between a data request signal and a congestion information storage request signal, the data request signal being for an asynchronous branching module outputting transfer data received according to a handshake protocol performing data transfer by transmitting/receiving a data request signal and a data acknowledge signal in a predetermined procedure, to any of a plurality of branch destinations, and the congestion information storage request signal which requests for storage of congestion information indicative of the presence/absence of congestion, received from a branch destination of the asynchronous branching module. According to an arbitration result, one of the signals is passed to mediate handshaking, and the other signal is made wait until completion of a process according to the passed signal. The process of storing the congestion information received from the branch destination of the asynchronous branch module when the congestion information storage request signal is passed into the congestion information storage memory storing congestion information on the branch destination is performed. The process is performed to preferentially select, as a transfer branch destination, a branch destination generating no congestion information indicative of presence of congestion among branch destinations which can lead to a destination on the asynchronous branching module, on the basis of the congestion information and destination information of transfer data which is supplied to the asynchronous branching module when the data request signal is passed.

In the path calculation method in the asynchronous logic circuit of the invention, arbitration is performed between the data request signal and the congestion information storage request signal, and one of the signals is passed to mediate handshaking. In the invention, the other signal is made wait until the process on the passed signal completes. Consequently, the process of updating congestion information and the process of selecting the transfer branch destination can be performed exclusively. In such a manner, in the asynchronous logic circuit in which the congestion information storage request signal and the data request signal are generated at independent timings, a branch destination to which transfer data is output from the asynchronous branching module can be prevented from changing during data transfer handshaking. In the present invention, the path setting calculation for avoiding a congestion place can be performed accurately by using congestion information. Consequently, when the asynchronous branching module has a plurality of branch destinations leading to a destination, a branch destination which is not congested can be preferentially selected as a transfer branch destination. As a result, even when there is a congested part, the communication capacity of a data transfer path can be suppressed from being wasted.

The present application is based on Japanese Patent Application 2009-151351 filed on Jun. 25, 2009 and Japanese Patent Application No. 2009-271516 filed on Nov. 30, 2009. The specifications, the scope of patent claims, and drawings of Japanese Patent Application Nos. 2009-151351 and 2009-271516 are incorporated herein by reference in its entirety.

DESCRIPTION OF REFERENCE NUMERALS

100: asynchronous inter-core connection circuit
101: asynchronous arbitration module
102: asynchronous branching module
111: congestion detection module
112: congestion avoiding path calculation module
600: asynchronous inter-core connection circuit
601, 603: synchronous master-side cores
602, 604: synchronous slave-side cores
611, 613, 623: asynchronous branching modules
612, 622, 614: asynchronous arbitration modules
631: congestion avoiding path calculation module
632, 642: congestion detection modules
681 to 683 and 691 to 694: transfer data
700: asynchronous branch circuit
710, 711: asymmetric 2-input C elements
720: OR element
750: path calculation circuit
800: logic circuit configuration of asymmetric 2-input C element
801: element sign and input/output terminal names of asymmetric 2-input C element
850: truth table of asymmetric 2-input C element
900: asynchronous arbitration circuit
910: mutually-exclusive circuit
920, 921: handshaking recognizing circuits
930: OR element
940: multiplexer
950, 951: symmetric 2-input C elements
1000: logic circuit configuration of mutually-exclusive circuit
1010: arbitration partial circuit
1020: metastable state filter circuit
1050: truth table of mutually-exclusive circuit
1100: logic circuit configuration of symmetric 2-input C element
1101: element sign and input/output terminal names of asymmetric 2-input C element
1150: truth table of asymmetric 2-input C element
1200: congestion detection circuit
1210, 1211: inverters
1220, 1230: symmetric 2-input C elements
1300: congestion avoiding path calculation circuit
1310: handshake arbitration circuit
1320, 1321: multiplexers
1330: handshake partial arbitration circuit
1340: congestion information storage latch
1350: path calculation circuit
1400: handshake partial arbitration circuit
1410: mutually-exclusive circuit
1420, 1421: handshake recognizing circuits
1500: integrated circuit
1501: synchronous core
1502: inter-core connecting circuit
1610, 1611, 1612: flip flops
1620, 1621, 1622: storage control circuits
1800: asynchronous inter-core connection circuit
1801, 1803: synchronous master-side cores
1802, 1804: synchronous slave-side cores
1811, 1813, 1823: asynchronous branching circuits
1812, 1822, 1824: asynchronous arbitration circuits
1881 to 1883, 1891 to 1894: transfer data
2100: asynchronous arbitration circuit for data stream continuous transfer
2110: mutually-exclusive circuit
2120, 2121: handshake recognizing circuits
2130, 2170, 2171: OR elements
2140: multiplexer
2150, 2151: symmetric 2-input C elements
2160, 2161: asymmetric 3-input C elements
2200: logic circuit configuration of asymmetric 3-input C element
2201: element sign and input/output terminal names of asymmetric 3-input C element
2250: truth table of asymmetric 3-input C element
2300: congestion avoiding path calculation circuit
2310: handshake arbitration circuit
2320, 2321: multiplexers
2330: handshake partial arbitration circuit
2340: congestion information storage latch
2350: path calculation circuit
2360: transfer branch destination storage latch
2361: storage control circuit
2361: data/head signal/end signal storage latch
2500: congestion detection circuit
2510, 2511: inverters
2520, 2530: symmetric 2-input C elements
2540: handshake branching circuit
2700: congestion detection circuit
2701: OR element
2740: handshake branching circuit
2710: congestion information generation circuit
2720, 2730: symmetric 2-input C elements
2900: congestion detection circuit
2901: congestion process request transmission destination selection circuit
2910: congestion information generation circuit
2930: symmetric 2-input C element
2940: handshake branching circuit
3100: handshake branching circuit (3 branches)
3110, 3111, 3112: asymmetric 2-input C elements
3120: OR element

The invention claimed is:

1. An asynchronous logic circuit comprising:
an asynchronous branching module outputting transfer data received according to a handshake protocol of performing data transfer by transmitting/receiving a data request signal and a data acknowledge signal in a predetermined procedure, to any of a plurality of branch destinations;
an asynchronous arbitration module merging transfer paths of the transfer data and sequentially outputting the transfer data received from at least one of a plurality of merge sources, in a predetermined procedure without contradicting the procedure;
a congestion detection module disposed corresponding to the asynchronous arbitration module, receiving an arbitration result signal indicating a merge source from which data is being transferred from the asynchronous arbitration module, and outputting congestion information indicative of presence or absence of congestion to the plurality of merge sources of the asynchronous arbitration module; and a congestion avoiding path calculation module disposed corresponding to the asynchronous branching module, and exclusively performing a process of receiving the congestion information from a congestion detection module corresponding to an asynchronous arbitration module existing in a branch destination of the asynchronous branching module and storing the congestion information on the plurality of branch destinations of the asynchronous branching module into a congestion information storage memory, and a process of making the asynchronous branching module preferentially select, as a transfer branch destination, a branch destination which does not generate congestion information indicative of the presence of congestion among branch destinations leading to a destination on the basis of the congestion information and destination information of the transfer data.

2. The asynchronous logic circuit according to claim 1, wherein the congestion detection module includes a request output module, when the asynchronous arbitration module outputs the data request signal, outputting the data request signal to the merge destination, and outputting the congestion information and a congestion information storage request signal requesting storage of the congestion information to a congestion avoiding path calculation module existing in the merge source.

3. The asynchronous logic circuit according to claim 1, wherein the congestion detection module further comprises an acknowledge waiting module, after outputting the data request signal and the congestion information storage request signal, waiting for the data acknowledge signal from the merge destination and a congestion information storage acknowledge signal to the congestion information storage request signal from the congestion avoiding path calculation module and, when the data acknowledge signal from the merge destination and the congestion information storage acknowledge signal are received, outputting a data acknowledge signal to the asynchronous arbitration module.

4. The asynchronous logic circuit according to claim 2, wherein the congestion avoiding path calculation module includes a data congestion information arbitration module performing arbitration between a data request signal to the asynchronous branching module and the congestion information storage request signal, mediating handshaking by making one of the signals pass, and making the other signal wait until completion of a process according to the passed signal.

5. The asynchronous logic circuit according to claim 4, wherein the data congestion information arbitration module, when the data request signal is received before a process of storing the congestion information into the congestion information storage memory is completed, makes an output of the data request signal to the asynchronous branching module wait until completion of storage of the congestion information and, when the asynchronous branching module responds to the data request signal and the congestion information storage request signal is received during transfer of the transfer data, makes the congestion information storage request signal wait until completion of the handshaking on the transfer data.

6. The asynchronous logic circuit according to claim 5, wherein the data congestion information arbitration module comprises:
a mutually-exclusive module receiving the congestion information storage request signal and the data request signal, making one of the received signals pass, and making the other signal wait until the passed signal is withdrawn; and a handshaking recognizing circuit, when there is no handshaking being mediated by the data congestion information arbitration module, allowing passage of the congestion information storage request signal or the data request signal passed through the mutually-exclusive module and, when there is handshaking being mediated, making the congestion information storage request signal or the data request signal passed through the mutually-exclusive module wait until completion of the handshaking being mediated.

7. The asynchronous logic circuit according to claim 6, wherein the mutually-exclusive module includes two NAND elements each having two input terminals to one of which the congestion information storage request signal or the data request signal is supplied and the other of which is connected to an output terminal of the other NAND element, and inverters connected to outputs of the two NAND elements.

8. The asynchronous logic circuit according to claim 6, wherein the handshake recognizing module comprises an AND element having two input terminals one of which is connected to a congestion information storage request signal passed through the mutually-exclusive module and the other of which is connected to the data acknowledge signal which is output from the asynchronous branching module via an inverter, and an AND element having two input terminals one of which is connected to a data request signal passed through the mutually-exclusive module and the other of which is connected to the congestion information storage acknowledge signal via an inverter.

9. The asynchronous logic circuit according to claim 4, wherein the congestion avoiding path calculation module further comprises:
an inter-branch-destination congestion information storage request arbitration module merging congestion information storage request signals supplied from a plurality of branch destinations of the asynchronous branching module, selecting one of the congestion information storage request signals from the plurality of branch destinations by performing arbitration, and mediating handshaking caused by the selected congestion information storage request signal between the data congestion information arbitration module and the congestion detection module; and
a memory storage control module, when the data congestion information arbitration module allows passage of the congestion information storage request signal output from the inter-branch-destination congestion information storage request arbitration module, updating congestion information corresponding to a branch destination of the asynchronous branching module which outputs the congestion information storage request signal selected by the inter-branch-destination congestion information storage request arbitration module in the congestion information storage memory with congestion information supplied from the branch destination, and holding congestion information corresponding to the other branch destinations as congestion information stored in the congestion information storage memory.

10. The asynchronous logic circuit according to claim 9, wherein the inter-branch-destination congestion information storage request arbitration module comprises:
a mutually-exclusive module receiving congestion information storage request signals from the plurality of branch destinations, allowing passage of one of the congestion information storage request signals, and making the other signal wait until the passed congestion information storage request signal is withdrawn;

a handshake recognizing module, when there is no handshaking being mediated by the inter-branch-destination congestion information storage request arbitration module, allowing passage of the congestion information storage request signal passed through the mutually-exclusive module and, when there is handshaking being mediated, making the congestion information storage request signal passed through the mutually-exclusive module wait until completion of the handshaking being mediated; and a waiting module waiting for a congestion information storage request signal passed through the handshake recognizing module and a congestion information storage acknowledge signal to the congestion information storage request signal, and outputting the congestion information storage acknowledge signal to a branch destination which receives the congestion information storage request signal passed through the handshake recognizing module.

11. The asynchronous logic circuit according to claim 10, wherein the mutually-exclusive module includes two NAND elements each having two input terminals to one of which the congestion information storage request signal is supplied and the other of which is connected to an output terminal of the other NAND element, and inverters connected to outputs of the two NAND elements.

12. The asynchronous logic circuit according to claim 10, wherein the handshake recognizing module comprises a plurality of AND elements disposed in correspondence with the plurality of branch destinations and each having two input terminals one of which is connected to the congestion information storage request signal passed through the mutually-exclusive module and the other of which is connected to a congestion information storage acknowledge signal for a congestion information storage request signal other than the congestion information storage request signal via an inverter.

13. The asynchronous logic circuit according to claim 12, wherein the inter-branch-destination congestion information storage request arbitration module further comprises an OR element receiving outputs of the plurality of AND elements, and the OR element outputs the congestion information storage request signal.

14. The asynchronous logic circuit according to claim 10, wherein the memory storage control module comprises a plurality of multiplexers disposed in correspondence with a plurality of branch destinations of the asynchronous branching module, each receiving the congestion information which is output from the congestion detection module of a corresponding branch destination and congestion information of a branch destination stored in the congestion information storage memory, and selecting any one of two inputs on the basis of an arbitration result in the inter-branch-destination congestion information storage request arbitration module.

15. The asynchronous logic circuit according to claim 10, wherein the waiting module includes a logic circuit realizing a 3-input majority logic function in which one of input terminals and an output terminal are connected.

16. The asynchronous logic circuit according to claim 1, wherein the transfer data is divided data obtained by dividing data generated by adding destination information to data to the same destination, and including destination information at the head of a stream of a series of unit data obtained by the division, the asynchronous arbitration module continuously outputs the divided data constructing the unit data stream without interrupting the stream, and the congestion avoiding path calculation module, when the transfer data is head divided data of the unit data stream, determines a transfer branch destination of the asynchronous branching module on the basis of the destination information included in the head divided data and, when the transfer data is non-head divided data other than the head of the unit data stream, determines a transfer branch destination determined for the head divided data as a transfer branch destination of the asynchronous branching module.

17. The asynchronous logic circuit according to claim 16, wherein the congestion avoiding path calculation module includes a branch destination information storage memory storing a transfer branch destination, when the transfer data is head divided data of the unit data stream, stores the determined transfer branch destination in the branch destination information storage memory and, when the transfer data is non-head divided data other than the head of the unit data stream, determines the transfer branch destination stored in the branch destination information memory, as a transfer branch destination of the asynchronous branching module.

18. The asynchronous logic circuit according to claim 16, wherein the congestion detection module includes a handshake branching module, when the asynchronous arbitration module outputs a data request signal and the transfer data is the head divided data, outputting a congestion information storage request signal requiring storage of the congestion information to a merge source of the asynchronous arbitration module and, when the transfer data is the non-head divided data, outputting a request signal which is fed back as an acknowledge signal to itself.

19. A semiconductor circuit comprising an asynchronous logic circuit according to claim 1.

20. A path calculation method in an asynchronous logic circuit, comprising:

a step of performing arbitration between a data request signal and a congestion information storage request signal, the data request signal being for an asynchronous branching module outputting transfer data received according to a handshake protocol performing data transfer by transmitting/receiving the data request signal and a data acknowledge signal in a predetermined procedure, to any of a plurality of branch destinations, and the congestion information storage request signal requesting for storage of congestion information indicative of the presence/absence of congestion, received from a branch destination of the asynchronous branching module;

a step of performing a process of mediating handshaking by making one of the signals pass, making the other signal wait until a process according to the passed signal is completed and, when the congestion information storage request signal passes, storing the congestion information received from a branch destination of the asynchronous branching module into a congestion information storage memory storing congestion information of the branch destination; and a step, when the data request signal is passed, of performing a process of making the asynchronous branching module preferentially select, as a transfer branch destination, a branch destination which does not generate congestion information indicative of presence of congestion among branch destinations leading to a destination on the basis of the congestion information and destination information of the transfer data supplied to the asynchronous branching module.

* * * * *